(12) United States Patent
De Jong et al.

(10) Patent No.: US 12,517,306 B2
(45) Date of Patent: Jan. 6, 2026

(54) TERMINALS HAVING A MULTI-FIBER OPTICAL CONNECTION PORT THAT INHIBITS DAMAGE FROM SINGLE-FIBER CONNECTORS

(71) Applicant: Corning Research & Development Corporation, Corning, NY (US)

(72) Inventors: Michael De Jong, Colleyville, TX (US); Ashley Wesley Jones, Denton, TX (US); Gordon Mueller-Schlomka, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 341 days.

(21) Appl. No.: 18/086,951

(22) Filed: Dec. 22, 2022

(65) Prior Publication Data

US 2023/0120660 A1 Apr. 20, 2023

Related U.S. Application Data

(63) Continuation of application No. PCT/US2021/039340, filed on Jun. 28, 2021.
(Continued)

(51) Int. Cl.
*G02B 6/38* (2006.01)
(52) U.S. Cl.
CPC ......... *G02B 6/3831* (2013.01); *G02B 6/3825* (2013.01)
(58) Field of Classification Search
CPC ....... G02B 6/38; G02B 6/3831; G02B 6/3825
See application file for complete search history.

(56) References Cited

U.S. PATENT DOCUMENTS 3,074,107 A 1/1963 Kiyoshi et al.
3,532,783 A 10/1970 Pusey et al.
(Continued)

FOREIGN PATENT DOCUMENTS

AU 2006232206 A1 10/2006
CN 1060911 A 5/1992
(Continued)

OTHER PUBLICATIONS

Brown, "What is Transmission Welding?" Laser Plasti Welding website, 6 pgs, Retrieved on Dec. 17, 2018 from: http://www.laserplasticwelding.com/what-is-transmission-welding.
(Continued)

*Primary Examiner* — Tina Wong
(74) *Attorney, Agent, or Firm* — Michael E. Carroll, Jr.

(57) ABSTRACT

Terminals are disclosed having at least one first connection port intended for mating with a first connector footprint and at least one second connection port intended for mating with a second connector footprint where the second connection port inhibits the damaging insertion of the external connector suitable for the first connection port. For instance, terminals may have at least one single-fiber connection port that can receive and optically mate with a single-fiber plug connector, and at least one multi-fiber optical connection port that can receive and optically mate with a multi-fiber plug connector and inhibits the damaging insertion of the non-compatible single-fiber connector into the multi-fiber optical connection port if mistakenly attempted by the technician. Other embodiments may include a modular adapter sub-assembly for the first connection port or the second connection port.

57 Claims, 31 Drawing Sheets

Related U.S. Application Data

(60) Provisional application No. 63/045,527, filed on Jun. 29, 2020.

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,003,297 A | 1/1977 | Mott |
| 4,077,567 A | 3/1978 | Ginn et al. |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Keith |
| 4,783,137 A | 11/1988 | Kosman et al. |
| 4,842,363 A | 6/1989 | Margolin et al. |
| 4,844,570 A | 7/1989 | Tanabe |
| 4,854,664 A | 8/1989 | Mccartney |
| 4,856,867 A | 8/1989 | Gaylin |
| 4,877,303 A | 10/1989 | Caldwell et al. |
| 4,902,238 A | 2/1990 | Iacobucci |
| 4,913,514 A | 4/1990 | Then |
| 4,921,413 A | 5/1990 | Blew |
| 4,944,568 A | 7/1990 | Danbach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A | 12/1990 | Weber et al. |
| 4,994,134 A | 2/1991 | Knecht et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,226,832 A | 7/1993 | Dejardin et al. |
| 5,231,685 A | 7/1993 | Hanzawa et al. |
| 5,245,683 A | 9/1993 | Belenkiy et al. |
| 5,263,105 A | 11/1993 | Johnson et al. |
| 5,263,239 A | 11/1993 | Ziemek |
| 5,276,750 A | 1/1994 | Manning |
| 5,313,540 A | 5/1994 | Jeda et al. |
| 5,317,663 A | 5/1994 | Beard et al. |
| 5,321,917 A | 6/1994 | Franklin et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'Donnell et al. |
| 5,390,269 A | 2/1995 | Palecek et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,682,451 A | 10/1997 | Lee et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A | 7/1998 | Castle et al. |
| 5,789,701 A | 8/1998 | Wettengel et al. |
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,867,621 A | 2/1999 | Luther et al. |
| 5,876,071 A | 3/1999 | Aldridge |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,913,001 A | 6/1999 | Nakajima et al. |
| 5,920,669 A | 7/1999 | Knecht et al. |
| 5,923,804 A | 7/1999 | Rosson |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| 5,993,070 A | 11/1999 | Tamekuni et al. |
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,079,881 A | 6/2000 | Roth |
| 6,094,517 A | 7/2000 | Yuuki |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | Mcalpine et al. |
| 6,193,421 B1 | 2/2001 | Tamekuni et al. |

(56) References Cited

U.S. PATENT DOCUMENTS

| | | |
|---|---|---|
| RE37,079 E | 3/2001 | Stephenson et al. |
| RE37,080 E | 3/2001 | Stephenson et al. |
| 6,200,040 B1 | 3/2001 | Edwards et al. |
| 6,206,579 B1 | 3/2001 | Selfridge et al. |
| 6,206,581 B1 | 3/2001 | Driscoll et al. |
| 6,220,762 B1 | 4/2001 | Kanai et al. |
| 6,224,268 B1 | 5/2001 | Manning et al. |
| 6,224,270 B1 | 5/2001 | Nakajima et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,269,214 B1 | 7/2001 | Naudin et al. |
| 6,287,016 B1 | 9/2001 | Weigel |
| 6,293,710 B1 | 9/2001 | Lampert et al. |
| 6,298,190 B2 | 10/2001 | Waldron et al. |
| 6,304,698 B1 | 10/2001 | Morris |
| 6,305,849 B1 | 10/2001 | Roehrs et al. |
| 6,321,013 B1 | 11/2001 | Hardwick et al. |
| 6,356,390 B1 | 3/2002 | Hall, Jr. |
| 6,356,690 B1 | 3/2002 | Mcalpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmorton et al. |
| 6,386,891 B1 | 5/2002 | Howard et al. |
| 6,402,388 B1 | 6/2002 | Imazu et al. |
| 6,404,962 B1 | 6/2002 | Hardwick et al. |
| 6,409,391 B1 | 6/2002 | Chang |
| D460,043 S | 7/2002 | Fan Wong |
| 6,422,764 B1 | 7/2002 | Marrs et al. |
| 6,427,035 B1 | 7/2002 | Mahony |
| 6,428,215 B1 | 8/2002 | Nault |
| 6,439,780 B1 | 8/2002 | Mudd et al. |
| 6,443,626 B1 | 9/2002 | Foster |
| 6,466,725 B2 | 10/2002 | Battey et al. |
| 6,487,344 B1 | 11/2002 | Naudin et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,533,468 B2 | 3/2003 | Nakajima et al. |
| 6,536,956 B2 | 3/2003 | Luther et al. |
| 6,539,147 B1 | 3/2003 | Mahony |
| 6,540,410 B2 | 4/2003 | Childers et al. |
| 6,542,652 B1 | 4/2003 | Mahony |
| 6,542,674 B1 | 4/2003 | Gimblet |
| 6,546,175 B1 | 4/2003 | Wagman et al. |
| 6,554,489 B2 | 4/2003 | Kent et al. |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,629,782 B2 | 10/2003 | McPhee et al. |
| 6,644,862 B1 | 11/2003 | Berto et al. |
| 6,648,520 B2 | 11/2003 | McDonald et al. |
| 6,668,127 B1 | 12/2003 | Mahony |
| 6,672,774 B2 | 1/2004 | Theuerkorn et al. |
| 6,678,442 B2 | 1/2004 | Gall et al. |
| 6,678,448 B2 | 1/2004 | Moisel et al. |
| 6,685,361 B1 | 2/2004 | Rubino et al. |
| 6,695,489 B2 | 2/2004 | Nault |
| 6,702,475 B1 | 3/2004 | Giobbio et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,146 B2 | 6/2004 | Parris |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Loder et al. |
| 6,809,265 B1 | 10/2004 | Gladd et al. |
| 6,841,729 B2 | 1/2005 | Sakabe et al. |
| 6,848,838 B2 | 2/2005 | Doss et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,899,467 B2 | 5/2005 | McDonald et al. |
| 6,908,233 B2 | 6/2005 | Nakajima et al. |
| 6,909,821 B2 | 6/2005 | Ravasio et al. |
| 6,916,120 B2 | 7/2005 | Zimmel et al. |
| 6,918,704 B2 | 7/2005 | Marrs et al. |
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,011,454 B2 | 3/2006 | Caveney et al. |
| 7,013,074 B2 | 3/2006 | Battey et al. |
| 7,025,507 B2 | 4/2006 | De Marchi |
| 7,033,191 B1 | 4/2006 | Cao |
| 7,044,650 B1 | 5/2006 | Tran et al. |
| 7,052,185 B2 | 5/2006 | Rubino et al. |
| 7,079,734 B2 | 7/2006 | Seddon et al. |
| 7,085,468 B2 | 8/2006 | Forrester |
| 7,088,899 B2 | 8/2006 | Reagan et al. |
| 7,090,406 B2 | 8/2006 | Melton et al. |
| 7,090,407 B2 | 8/2006 | Melton et al. |
| 7,090,409 B2 | 8/2006 | Nakajima et al. |
| 7,103,255 B2 | 9/2006 | Reagan et al. |
| 7,103,257 B2 | 9/2006 | Donaldson et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,118,283 B2 | 10/2006 | Nakajima et al. |
| 7,118,284 B2 | 10/2006 | Nakajima et al. |
| 7,120,347 B2 | 10/2006 | Blackwell et al. |
| 7,137,742 B2 | 11/2006 | Theuerkorn et al. |
| 7,146,089 B2 | 12/2006 | Reagan et al. |
| 7,146,090 B2 | 12/2006 | Vo et al. |
| 7,150,567 B1 | 12/2006 | Luther et al. |
| 7,165,893 B2 | 1/2007 | Schmitz |
| 7,171,102 B2 | 1/2007 | Reagan et al. |
| 7,178,990 B2 | 2/2007 | Caveney et al. |
| 7,184,634 B2 | 2/2007 | Hurley et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,204,644 B2 | 4/2007 | Barnes et al. |
| 7,213,975 B2 | 5/2007 | Khemakhem et al. |
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Lail et al. |
| 7,241,056 B1 | 7/2007 | Kuffel et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,270,487 B2 | 9/2007 | Billman et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,579 B2 | 4/2008 | Feldner |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |

(56) References Cited

U.S. PATENT DOCUMENTS

| | | |
|---|---|---|
| 7,400,815 B2 | 7/2008 | Mertesdorf et al. |
| D574,775 S | 8/2008 | Amidon |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,467,896 B2 | 12/2008 | Melton et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,497,896 B2 | 3/2009 | Bromet et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,580,607 B2 | 8/2009 | Jones et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,713,679 B2 | 5/2010 | Ishiduka et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,015 B2 | 8/2010 | Melton et al. |
| 7,785,019 B2 | 8/2010 | Lewallen et al. |
| RE41,743 E | 9/2010 | Naudin et al. |
| 7,802,926 B2 | 9/2010 | Leeman et al. |
| 7,805,044 B2 | 9/2010 | Reagan et al. |
| 7,806,599 B2 | 10/2010 | Margolin et al. |
| 7,811,006 B2 | 10/2010 | Milette et al. |
| 7,820,090 B2 | 10/2010 | Morrow et al. |
| 7,844,148 B2 | 11/2010 | Jenkins et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,942,590 B2 | 5/2011 | Lu et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,634,688 B2 | 1/2014 | Bryon et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | Mcdowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,768,133 B2 | 7/2014 | Bryon et al. |
| 8,770,861 B2 | 7/2014 | Smith et al. |
| 8,770,862 B2 | 7/2014 | Lu et al. |
| D711,320 S | 8/2014 | Yang et al. |
| 8,798,430 B2 | 8/2014 | Bryon et al. |
| 8,821,036 B2 | 9/2014 | Shigehara |
| 8,837,894 B2 | 9/2014 | Holmberg et al. |
| 8,864,390 B2 | 10/2014 | Chen et al. |

(56) References Cited

U.S. PATENT DOCUMENTS

| | | |
|---|---|---|
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,944,703 B2 | 2/2015 | Song et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,081,154 B2 | 7/2015 | Zimmel et al. |
| 9,146,364 B2 | 9/2015 | Chen et al. |
| D741,803 S | 10/2015 | Davidson, Jr. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | Mcgranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Hill et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,444 B2 | 12/2016 | Barnette et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,551,842 B2 | 1/2017 | Theuerkorn |
| 9,557,504 B2 | 1/2017 | Holmberg et al. |
| 9,581,775 B2 | 2/2017 | Kondo et al. |
| 9,588,304 B2 | 3/2017 | Durrant et al. |
| D783,618 S | 4/2017 | Wu et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,684,138 B2 | 6/2017 | Lu |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Coenegracht et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| D810,029 S | 2/2018 | Robert et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,224 B2 | 3/2018 | Liu et al. |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,288,821 B2 | 5/2019 | Isenhour |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,379,308 B2 | 8/2019 | Coate |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Pannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,578,821 B2 | 3/2020 | Ott et al. |
| 10,585,246 B2 | 3/2020 | Bretz et al. |

(56) References Cited

U.S. PATENT DOCUMENTS

| | | |
|---|---|---|
| 10,591,678 B2 | 3/2020 | Mullaney et al. |
| 10,605,998 B2 | 3/2020 | Rosson |
| 10,606,006 B2 | 3/2020 | Hill et al. |
| D880,423 S | 4/2020 | Obata et al. |
| 10,613,278 B2 | 4/2020 | Kempeneers et al. |
| 10,620,388 B2 | 4/2020 | Isenhour et al. |
| 10,656,347 B2 | 5/2020 | Kato |
| 10,677,998 B2 | 6/2020 | Van et al. |
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,290,188 B2 | 3/2022 | Tuccio et al. |
| 2001/0002220 A1 | 5/2001 | Throckmorton et al. |
| 2001/0012428 A1 | 8/2001 | Nakajima et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0122653 A1 | 9/2002 | Donaldson et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0016440 A1 | 1/2003 | Zeidan et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0080555 A1 | 5/2003 | Griffioen et al. |
| 2003/0086664 A1 | 5/2003 | Moisel et al. |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0047566 A1 | 3/2004 | McDonald et al. |
| 2004/0052474 A1 | 3/2004 | Lampert et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0206542 A1 | 10/2004 | Gladd et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0054237 A1 | 3/2005 | Gladd et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213897 A1 | 9/2005 | Palmer et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Ail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0025665 A1 | 2/2007 | Dean et al. |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0077010 A1 | 4/2007 | Melton et al. |
| 2007/0098343 A1 | 5/2007 | Miller et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Ewallen et al. |
| 2007/0189674 A1 | 8/2007 | Scheibenreif et al. |

(56) References Cited

U.S. PATENT DOCUMENTS

| | | |
|---|---|---|
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044137 A1 | 2/2008 | Luther et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0240658 A1 | 10/2008 | Leeman et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2009/0003772 A1 | 1/2009 | Lu et al. |
| 2009/0003777 A1 | 1/2009 | Feldner |
| 2009/0034923 A1 | 2/2009 | Miller et al. |
| 2009/0041411 A1 | 2/2009 | Melton et al. |
| 2009/0041412 A1 | 2/2009 | Danley et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0054680 A1 | 3/2010 | Lochkovic et al. |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303416 A1 | 12/2010 | Danley et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0033157 A1 | 2/2011 | Drouard |
| 2011/0044588 A1 | 2/2011 | Larson et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123157 A1 | 5/2011 | Belsan et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0002925 A1 | 1/2012 | Nakagawa |
| 2012/0008909 A1 | 1/2012 | Mertesdorf et al. |
| 2012/0045179 A1 | 2/2012 | Theuerkorn |
| 2012/0057830 A1 | 3/2012 | Taira et al. |
| 2012/0063724 A1 | 3/2012 | Kuffel et al. |
| 2012/0063729 A1 | 3/2012 | Fujiwara et al. |
| 2012/0106912 A1 | 5/2012 | Mcgranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0257858 A1 | 10/2012 | Nhep |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0022317 A1 | 1/2013 | Norris et al. |
| 2013/0034333 A1 | 2/2013 | Holmberg et al. |
| 2013/0051734 A1 | 2/2013 | Shen et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1 | 1/2014 | Pepe et al. |
| 2014/0044397 A1 | 2/2014 | Hikosaka et al. |
| 2014/0050446 A1 | 2/2014 | Chang |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |

(56) References Cited

U.S. PATENT DOCUMENTS

| | | |
|---|---|---|
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0144883 A1 | 5/2015 | Sendelweck |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0286011 A1 | 10/2015 | Nhep |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2015/0378112 A1* | 12/2015 | Marcouiller ......... G02B 6/3879 385/56 |
| 2016/0015885 A1 | 1/2016 | Pananen et al. |
| 2016/0018605 A1 | 1/2016 | Ott et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0154186 A1 | 6/2016 | Gimblet et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van et al. |
| 2016/0209602 A1 | 7/2016 | Theuerkorn |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2016/0349458 A1 | 12/2016 | Murray et al. |
| 2016/0356963 A1 | 12/2016 | Liu et al. |
| 2017/0023758 A1 | 1/2017 | Reagan et al. |
| 2017/0038538 A1 | 2/2017 | Isenhour et al. |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0212313 A1 | 7/2017 | Elenabaas et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0285279 A1 | 10/2017 | Daems et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0003902 A1 | 1/2018 | Rosson et al. |
| 2018/0031774 A1 | 2/2018 | Van et al. |
| 2018/0079569 A1 | 3/2018 | Simpson |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0267265 A1 | 9/2018 | Zhang et al. |
| 2018/0321448 A1 | 11/2018 | Wu et al. |
| 2018/0329149 A1 | 11/2018 | Mullaney et al. |
| 2018/0348447 A1 | 12/2018 | Nhep et al. |
| 2018/0372962 A1 | 12/2018 | Isenhour et al. |
| 2019/0004251 A1 | 1/2019 | Dannoux et al. |
| 2019/0004252 A1 | 1/2019 | Rosson |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0014987 A1 | 1/2019 | Sasaki et al. |
| 2019/0018210 A1 | 1/2019 | Coan et al. |
| 2019/0033531 A1 | 1/2019 | Taira et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1 | 6/2019 | Coenegracht et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0258010 A1 | 8/2019 | Anderson et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0339475 A1 | 11/2019 | Takano et al. |
| 2019/0361177 A1 | 11/2019 | Aoshima et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0003963 A1 | 1/2020 | Izumi et al. |
| 2020/0012051 A1 | 1/2020 | Coenegracht et al. |
| 2020/0036101 A1 | 1/2020 | Scheucher |

(56) References Cited

U.S. PATENT DOCUMENTS

| | | | |
|---|---|---|---|
| 2020/0049922 A1* | 2/2020 | Rosson | G02B 6/44765 |
| 2020/0057205 A1 | 2/2020 | Dannoux et al. | |
| 2020/0057222 A1 | 2/2020 | Dannoux et al. | |
| 2020/0057223 A1 | 2/2020 | Dannoux et al. | |
| 2020/0057224 A1 | 2/2020 | Dannoux et al. | |
| 2020/0057723 A1 | 2/2020 | Chirca et al. | |
| 2020/0096705 A1 | 3/2020 | Rosson | |
| 2020/0096709 A1 | 3/2020 | Rosson | |
| 2020/0096710 A1 | 3/2020 | Rosson | |
| 2020/0103599 A1 | 4/2020 | Rosson | |
| 2020/0103608 A1 | 4/2020 | Johnson et al. | |
| 2020/0110229 A1 | 4/2020 | Dannoux et al. | |
| 2020/0110234 A1 | 4/2020 | Holmberg et al. | |
| 2020/0116949 A1 | 4/2020 | Rosson | |
| 2020/0116952 A1 | 4/2020 | Rosson | |
| 2020/0116953 A1 | 4/2020 | Rosson | |
| 2020/0116954 A1 | 4/2020 | Rosson | |
| 2020/0116955 A1 | 4/2020 | Ho et al. | |
| 2020/0116958 A1 | 4/2020 | Dannoux et al. | |
| 2020/0116962 A1 | 4/2020 | Dannoux et al. | |
| 2020/0124805 A1 | 4/2020 | Rosson et al. | |
| 2020/0124812 A1 | 4/2020 | Dannoux et al. | |
| 2020/0132939 A1 | 4/2020 | Coenegracht et al. | |
| 2020/0132941 A1 | 4/2020 | Otsuka et al. | |
| 2020/0150356 A1 | 5/2020 | Lu | |
| 2020/0174201 A1 | 6/2020 | Cote et al. | |
| 2020/0174214 A1 | 6/2020 | Alves et al. | |
| 2020/0183097 A1 | 6/2020 | Chang et al. | |
| 2020/0192042 A1 | 6/2020 | Coan et al. | |
| 2020/0209492 A1 | 7/2020 | Rosson | |
| 2020/0218017 A1 | 7/2020 | Coenegracht | |
| 2020/0225422 A1 | 7/2020 | Van et al. | |
| 2020/0225424 A1 | 7/2020 | Coenegracht | |
| 2020/0241211 A1 | 7/2020 | Shonkwiler et al. | |
| 2020/0348476 A1 | 11/2020 | Hill et al. | |
| 2020/0371306 A1 | 11/2020 | Mosier et al. | |
| 2020/0393629 A1 | 12/2020 | Hill et al. | |
| 2021/0132302 A1 | 5/2021 | Wong et al. | |
| 2021/0149124 A1 | 5/2021 | Higley et al. | |
| 2021/0318499 A1 | 10/2021 | Cote et al. | |

FOREIGN PATENT DOCUMENTS

| | | |
|---|---|---|
| CN | 1071012 A | 4/1993 |
| CN | 1213783 A | 4/1999 |
| CN | 1231430 A | 10/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 103782209 A | 5/2014 |
| CN | 104007514 A | 8/2014 |
| CN | 104064903 A | 9/2014 |
| CN | 104280830 A | 1/2015 |
| CN | 104603656 A | 5/2015 |
| CN | 104704411 A | 6/2015 |
| CN | 105467529 A | 4/2016 |
| CN | 105492946 A | 4/2016 |
| CN | 105683795 A | 6/2016 |
| CN | 106716205 A | 5/2017 |
| CN | 106873086 A | 6/2017 |
| CN | 110608208 A | 12/2019 |
| CN | 110954996 A | 4/2020 |
| DE | 3537684 A1 | 4/1987 |
| DE | 3737842 C1 | 9/1988 |
| DE | 19805554 A1 | 8/1998 |
| EP | 0012566 A1 | 6/1980 |
| EP | 0026553 A1 | 4/1981 |
| EP | 0122566 A2 | 10/1984 |
| EP | 0130513 A2 | 1/1985 |
| EP | 0244791 A2 | 11/1987 |
| EP | 0462362 A2 | 12/1991 |
| EP | 0468671 A1 | 1/1992 |
| EP | 0469671 A1 | 2/1992 |
| EP | 0547778 A1 | 6/1993 |
| EP | 0547788 A1 | 6/1993 |
| EP | 0762171 A1 | 3/1997 |
| EP | 0782025 A1 | 7/1997 |
| EP | 0855610 A2 | 7/1998 |
| EP | 0856751 A1 | 8/1998 |
| EP | 0856761 A1 | 8/1998 |
| EP | 0940700 A2 | 9/1999 |
| EP | 0949522 A2 | 10/1999 |
| EP | 0957381 A1 | 11/1999 |
| EP | 0978746 A1 | 2/2000 |
| EP | 0997757 A2 | 5/2000 |
| EP | 1065542 A1 | 1/2001 |
| EP | 1122566 A2 | 8/2001 |
| EP | 1243957 A2 | 9/2002 |
| EP | 1258758 A2 | 11/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3207223 A1 | 8/2017 |
| EP | 3234672 A1 | 10/2017 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| ES | 1184287 U | 5/2017 |
| FR | 2485754 A1 | 12/1981 |
| GB | 2022284 A | 12/1979 |
| GB | 2154333 A | 9/1985 |
| GB | 2169094 A | 7/1986 |
| JP | 52-030447 A | 3/1977 |
| JP | 58-142308 A | 8/1983 |
| JP | 61-145509 A | 7/1986 |
| JP | 62-054204 A | 3/1987 |
| JP | 63-020111 A | 1/1988 |
| JP | 63-078908 A | 4/1988 |

(56) References Cited

FOREIGN PATENT DOCUMENTS

| | | |
|---|---|---|
| JP | 63-089421 A | 4/1988 |
| JP | 03-063615 A | 3/1991 |
| JP | 03-207223 A | 9/1991 |
| JP | 05-106765 A | 4/1993 |
| JP | 05-142439 A | 6/1993 |
| JP | 05-297246 A | 11/1993 |
| JP | 06-320111 A | 11/1994 |
| JP | 07-318758 A | 12/1995 |
| JP | 08-050211 A | 2/1996 |
| JP | 08-054522 A | 2/1996 |
| JP | 08-062432 A | 3/1996 |
| JP | 08-292331 A | 11/1996 |
| JP | 09-049942 A | 2/1997 |
| JP | 09-135526 A | 5/1997 |
| JP | 09-159867 A | 6/1997 |
| JP | 09-203831 A | 8/1997 |
| JP | 09-325223 A | 12/1997 |
| JP | 09-325249 A | 12/1997 |
| JP | 10-170781 A | 6/1998 |
| JP | 10-332953 A | 12/1998 |
| JP | 10-339826 A | 12/1998 |
| JP | 11-064682 A | 3/1999 |
| JP | 11-119064 A | 4/1999 |
| JP | 11-248979 A | 9/1999 |
| JP | 11-271582 A | 10/1999 |
| JP | 11-281861 A | 10/1999 |
| JP | 11-326693 A | 11/1999 |
| JP | 11-337768 A | 12/1999 |
| JP | 11-352368 A | 12/1999 |
| JP | 2000-002828 A | 1/2000 |
| JP | 2001-116968 A | 4/2001 |
| JP | 2001-290051 A | 10/2001 |
| JP | 2002-520987 A | 7/2002 |
| JP | 3296698 B2 | 7/2002 |
| JP | 2002-250987 A | 9/2002 |
| JP | 2003-009331 A | 1/2003 |
| JP | 2003-070143 A | 3/2003 |
| JP | 2003-121699 A | 4/2003 |
| JP | 2003-177279 A | 6/2003 |
| JP | 2003-302561 A | 10/2003 |
| JP | 2004-361521 A | 12/2004 |
| JP | 2005-024789 A | 1/2005 |
| JP | 2005-031544 A | 2/2005 |
| JP | 2005-077591 A | 3/2005 |
| JP | 2005-114860 A | 4/2005 |
| JP | 2005-520987 A | 7/2005 |
| JP | 2006-023502 A | 1/2006 |
| JP | 2006-146084 A | 6/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2008-191422 A | 8/2008 |
| JP | 2008-250360 A | 10/2008 |
| JP | 2009-265208 A | 11/2009 |
| JP | 2010-152084 A | 7/2010 |
| JP | 2010-191420 A | 9/2010 |
| JP | 2011-018003 A | 1/2011 |
| JP | 2011-033698 A | 2/2011 |
| JP | 2013-041089 A | 2/2013 |
| JP | 2013-156580 A | 8/2013 |
| JP | 2014-085474 A | 5/2014 |
| JP | 2014-095834 A | 5/2014 |
| JP | 2014-134746 A | 7/2014 |
| JP | 5537852 B2 | 7/2014 |
| JP | 5538328 B2 | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |
| JP | 2016-109819 A | 6/2016 |
| JP | 2016-156916 A | 9/2016 |
| JP | 3207223 U | 11/2016 |
| JP | 3207233 U | 11/2016 |
| KR | 10-2013-0081087 A | 7/2013 |
| RU | 2402794 C1 | 10/2010 |
| TW | 222688 B | 4/1994 |
| WO | 94/25885 A1 | 11/1994 |
| WO | 98/36304 A1 | 8/1998 |
| WO | 01/27660 A2 | 4/2001 |
| WO | 01/92927 A2 | 12/2001 |
| WO | 01/92937 A1 | 12/2001 |
| WO | 02/25340 A1 | 3/2002 |
| WO | 03/36358 A2 | 5/2003 |
| WO | 2004/061509 A1 | 7/2004 |
| WO | 2005/045494 A1 | 5/2005 |
| WO | 2005/066674 A2 | 7/2005 |
| WO | 2006/009597 A1 | 1/2006 |
| WO | 2006/052420 A1 | 5/2006 |
| WO | 2006/113726 A1 | 10/2006 |
| WO | 2006/123777 A1 | 11/2006 |
| WO | 2008/027201 A2 | 3/2008 |
| WO | 2008/029072 A1 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/126411 A1 | 10/2009 |
| WO | 2009/148797 A1 | 12/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/074688 A2 | 6/2012 |
| WO | 2012/163052 A1 | 12/2012 |
| WO | 2013/016042 A1 | 1/2013 |
| WO | 2013/055714 A1 | 4/2013 |
| WO | 2013/083729 A2 | 6/2013 |
| WO | 2013/122752 A1 | 8/2013 |
| WO | 2013/126488 A1 | 8/2013 |
| WO | 2013/177016 A1 | 11/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/047508 A1 | 4/2015 |
| WO | 2015/144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/006176 A1 | 1/2019 |

(56) References Cited

FOREIGN PATENT DOCUMENTS

| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Chinese Patent Application No. 201880056460.2, Office Action dated May 19, 2021, 12 pages (English Translation Only), Chinese Patent Office.

Clearfield, "Fieldshield Optical Fiber Protection System: Installation Manual." for part No. 016164. Last Updated Dec. 2014. 37 pgs.

Clearfield, "FieldShield SC and LC Pushable Connectors," Last Updated Jun. 1, 2018, 2 pgs.

Clearfield, "FieldShield SmarTerminal: Hardened Pushable Connectors" Last Updated Jun. 29, 2018, 2 pgs.

Coaxum, L., et al., U.S. Appl. No. 62/341,947, "Fiber Optic Multiport Having Different Types of Ports for Multi-Use," filed May 26, 2016.

CoolShirt fittings, https://www.amazon.com/Cool-Shirt-5014-0001-Release-Connectors/dp/B01LXBXYJ9, Sep. 23, 2016 (Year: 2016).

Corning Cable Systems, "SST Figure-8 Drop Cables 1-12 Fibers", Preliminary Product Specifications, 11 pgs. (2002).

Corning Cable Systems, "SST-Drop (armor) Cables 1-12 Fibers", Product Specifications, 2 pgs. (2002).

Corning Cable Systems, "SST-Drop (Dielectric) Cables 1-12 Fibers", Product Specifications, 2 pgs. (2002).

Faulkner et al. "Optical networks for local lopp applications," J. Lightwave Technol.0733-8724 7(11), 17411751 (1989).

Fiber Systems International: Fiber Optic Solutions, data, "TFOCA-11 4—Channel Fiber Optic Connector" sheet. , 2003, 2 pgs.

Infolite—Design and Data Specifications, 1 pg. Retrieved Feb. 21, 2019.

Liu et al., "Variable optical power splitters create new apps", Retrieved from: https://www.lightwaveonline.com/fttx/pon-systems/article/16648432/variable-optical-power-splitters-create-new-apps, 2005, 14 pages.

Nawata, "Multimode and Single-Mode Fiber Connectors Technology"; IEEE Journal of Quantum Electronics, vol. QE-16, No. 6 Published Jun. 1980.

Ramanitra et al. "Optical access network using a self-latching variable splitter remotely powered through an optical fiber link," Optical Engineering 46(4) p. 45007-1-9, Apr. 2007.

Ratnam et al. "Burst switching using variable optical splitter based switches with wavelength conversion," ICIIS 2017—Poeceedings Jan. 2018, pp. 1-6.

Schneier, Bruce; "Applied Cryptography: Protocols, Algorithms, and Source Code in C," Book. 1995 SEC. 10.3, 12.2, 165 Pgs.

Stratos: Lightwave., "Innovation Brought to Light", Hybrid HMA Series, Hybrid Multi Application, 2002, 2 pgs.

Wang et al. "Opto-VLSI-based dynamic optical splitter," Electron. Lett.0013-5194 10.1049/el:20046715 40(22), 14451446 (2004).

Xiao et al. "1xN wavelength selective adaptive optical power splitter for wavelength-division-multiplexed passive optical networks," Optics & Laser Technology 68, pp. 160-164, May 2015.

* cited by examiner

TERMINALS HAVING A MULTI-FIBER OPTICAL CONNECTION PORT THAT INHIBITS DAMAGE FROM SINGLE-FIBER CONNECTORS

RELATED APPLICATIONS

This application is a continuation of International Application No. PCT/US2021/039340 filed Jun. 28, 2021, which claims the benefit of priority of U.S. Provisional Application Ser. No. 63/045,527 filed on Jun. 29, 2020, the content of which is relied upon and incorporated herein by reference in its entirety.

FIELD

The disclosure is directed to terminals such as multiports or other devices comprising at least one first optical connection port and at least one second optical connection port, where the second optical connection port inhibits the damaging insertion of non-compatible external connector suitable for the first connection port from being mistakenly inserted and damaging the second optical connection port of the terminal along with methods for making the terminals or devices. By way of example, the terminals may comprise at least one multi-fiber optical connection port and at least one single-fiber connection port where the multi-fiber optical connection port inhibits the damaging insertion of the non-compatible external plug connector for the single-fiber connector port into the multi-fiber connector port if mistakenly attempted by the technician.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extended deeper into communication networks the need for making robust optical connections in outdoor applications in a quick and easy manner was apparent. To address this need for making quick, reliable, and robust optical connections in communication networks hardened fiber optic connectors such as the OptiTap® plug connector were developed.

Terminals such as multiports were also developed for making an optical connections with hardened connectors such as the OptiTap. Prior art terminals have a plurality of receptacles mounted through a wall of the housing for protecting an indoor connector inside the housing that makes an optical connection to the external hardened connector of the branch or drop cable.

Conventional fiber optic multiports have an input fiber optic cable carrying one or more optical fibers to indoor-type connectors inside a housing. The conventional multiport receives the optical fibers from the input fiber optic into housing and distributes the optical fibers to a plurality of receptacles or ports for connection with an external hardened connector. The receptacles are separate assemblies attached through a wall of housing of the multiport, and all of the receptacles typically have the same connector interface. The receptacles or ports allow mating with external hardened connectors that all have the same connector footprint. The external hardened connectors are attached to drop or branching cables such as drop cables for "fiber-to-the-home" applications for routing optical signals toward the subscriber. During use, optical signals pass through the branch cables, to and from the fiber optic cable by way of the optical connections at the receptacles or ports of conventional multiport. Conventional multiports allowed quick and easy deployment for optical networks.

Although, the housing of the conventional multiport is rugged and weatherable for outdoor deployments, the housings of multiport are relatively bulky since multiple receptacles or ports are located thru the wall of the housing, and space is needed for turning the coupling nut or bayonet for securing the hardened external connector. By way of example, the receptacles or ports of the conventional multiport allow an optical connection between the external hardened connector such as the OptiTap male plug connector on the branch cable with a non-hardened connector such as the SC connector disposed within the housing, which provides a suitable transition from an outdoor space to a protected space inside the housing for the optical connection.

Consequently, the housing of conventional multiports are excessively bulky, boxy, and inflexible to effectively operate in smaller storage spaces, such as the underground pits or vaults that may already be crowded. While pits can be widened and larger storage containers can be used, such solutions tend to be costly and time-consuming. Newer multiports or terminals have addressed some of the problems of conventional multiports by placing output ports in a linear array with one or more input ports. However, not all of the connectivity concerns for these improved multiport has been addressed.

Consequently, there exists an unresolved need for terminals that allow flexibility for the network operators to quickly and easily make optical connections in their optical network while also addressing concerns related to having different connection ports on the terminal or device.

SUMMARY

The disclosure present application is directed to terminals comprising at least one first connection port intended for optically mating with a first connector footprint (i.e., first connector interface) and at least one second connection port intended for optically mating with a second connector footprint (i.e., second connector interface different than the first connector interface), where the second connection port inhibits the damaging insertion of the external connector suitable for the first connection port. For instance, terminals may have at least one single-fiber connection port configured for receiving and optically mate with a single-fiber plug connector, and at least one multi-fiber optical connection port configured for receiving and optically mate with a multi-fiber plug connector and inhibits the damaging insertion of the non-compatible single-fiber connector into the multi-fiber optical connection port if mistakenly attempted by the technician. For the sake of simplicity and understanding, the concepts are described and illustrated with respect to a single-fiber connection port and a multi-fiber connection port to illustrate the concepts of a first connection port suitable for optically mating with a first external connector footprint and a second connection port suitable for optically mating with a second external connector footprint.

Other terminal embodiments may include a modular adapter sub-assembly for the first connection port or the second connection port. Further, the terminal may use a securing feature as disclosed herein for securing the external connector in a quick, efficient and simple manner. Terminals or devices that may use the concepts disclosed herein include closures, network interface devices, wireless devices or the like. Methods of making the terminals or devices are also disclosed. The devices may also have any suitable construction such as disclosed herein and may also further include such a connection port that is keyed for inhibiting a non-compliant connector from being inserted and potentially causing damage to the terminal as a further safe guard for inhibiting damaging insertion into a connection port.

One aspect of the disclosure is directed to terminals or devices comprising at least one single-fiber connection port and at least one multi-fiber connection port. The single-fiber connection port is disposed on the terminal and comprises an optical connector opening extending toward a cavity of the terminal and defines a single-fiber connection port passageway configured for receiving a single-fiber plug connector for optical connection. The multi-fiber connection port is disposed on the terminal and comprises an optical connector opening extending toward a cavity of the terminal and defines a multi-fiber connection port passageway configured for receiving a multi-fiber plug connector for optical connection, where the multi-fiber connection port inhibits the damaging insertion of the single-fiber plug connector intended for the single-fiber connection port into the multi-fiber connection port.

Another aspect of the disclosure is directed to terminals or devices comprising at least one single-fiber connection port and at least one multi-fiber connection port. The single-fiber connection port is disposed on the terminal and comprises an optical connector opening extending toward a cavity of the terminal and defines a single-fiber connection port passageway configured for receiving a single-fiber plug connector for optical connection. The multi-fiber connection port is disposed on the terminal and comprises an optical connector opening extending toward a cavity of the terminal and defines a multi-fiber connection port passageway configured for receiving a multi-fiber plug connector for optical connection, where the multi-fiber connection port inhibits the damaging insertion of the single-fiber plug connector intended for the single-fiber connection port into the multi-fiber connection port, and the multi-fiber connection port comprises a multi-fiber modular adapter sub-assembly comprising a multi-fiber adapter body. At least one securing feature is associated with the at least one multi-fiber connection port, and at least one securing feature resilient member biasing a portion of the at least one securing feature.

Yet another aspect of the disclosure is directed to terminals or devices comprising at least one single-fiber connection port and at least one multi-fiber connection port. The single-fiber connection port is disposed on the terminal and comprises an optical connector opening extending toward a cavity of the terminal and defines a single-fiber connection port passageway configured for receiving a single-fiber plug connector for optical connection. The single-fiber connection port comprises a single-fiber modular adapter sub-assembly comprising a single-fiber adapter body. The multi-fiber connection port is disposed on the terminal and comprises an optical connector opening extending toward a cavity of the terminal and defines a multi-fiber connection port passageway configured for receiving a multi-fiber plug connector for optical connection, where the multi-fiber connection port inhibits the damaging insertion of the single-fiber plug connector intended for the single-fiber connection port into the multi-fiber connection port. The multi-fiber connection port comprises a multi-fiber modular adapter sub-assembly comprising a multi-fiber adapter body, and the multi-fiber adapter body or an adapter comprises a single-fiber connector stop, where the single-fiber connector stop is sized for inhibiting the damaging insertion of the non-compatible single-fiber plug connector into the multi-fiber connection port. At least one securing feature is associated with the at least one multi-fiber connection port, and at least one securing feature resilient member biasing a portion of the at least one securing feature.

A further aspect of the disclosure is directed to terminals or devices comprising at least one single-fiber connection port and at least one multi-fiber connection port. The single-fiber connection port is disposed on the terminal and comprises an optical connector opening extending toward a cavity of the terminal and defines a single-fiber connection port passageway configured for receiving a single-fiber plug connector for optical connection. The single-fiber connection port comprises a single-fiber modular adapter sub-assembly comprising a single-fiber adapter body. The multi-fiber connection port is disposed on the terminal and comprises an optical connector opening extending toward a cavity of the terminal and defines a multi-fiber connection port passageway configured for receiving a multi-fiber plug connector for optical connection, where the multi-fiber connection port inhibits the damaging insertion of the single-fiber plug connector intended for the single-fiber connection port into the multi-fiber connection port. The multi-fiber connection port comprises a multi-fiber modular adapter sub-assembly comprising a multi-fiber adapter body, and the multi-fiber adapter body or an adapter comprises a single-fiber connector stop, where the single-fiber connector stop is sized for inhibiting the damaging insertion of the non-compatible single-fiber plug connector into the multi-fiber connection port. At least one securing feature is associated with the at least one multi-fiber connection port, and at least one securing feature resilient member biasing a portion of the at least one securing feature. The securing feature comprises a bore that is aligned with the multi-port connection port passageway.

A still further aspect of the disclosure is directed to terminals or devices comprising at least one single-fiber connection port and at least one multi-fiber connection port. The single-fiber connection port is disposed on the terminal and comprises an optical connector opening extending toward a cavity of the terminal and defines a single-fiber connection port passageway configured for receiving a single-fiber plug connector for optical connection. The single-fiber connection port comprises a single-fiber modular adapter sub-assembly comprising a single-fiber adapter body. The multi-fiber connection port is disposed on the terminal and comprises an optical connector opening extending toward a cavity of the terminal and defines a multi-fiber connection port passageway configured for receiving a multi-fiber plug connector for optical connection, where the multi-fiber connection port inhibits the damaging insertion of the single-fiber plug connector intended for the single-fiber connection port into the multi-fiber connection port. The multi-fiber connection port comprises a multi-fiber modular adapter sub-assembly comprising a multi-fiber adapter body, and an adapter comprising a single-fiber connector stop, where the single-fiber connector stop is sized for inhibiting the damaging insertion of the non-compatible single-fiber plug connector into the multi-fiber connection port. At least one securing feature is associated with the at least one multi-fiber connection port, and at least one securing feature resilient member biasing a portion of the at least one securing feature. The securing feature comprises a bore that is aligned with the multi-port connection port passageway, where the securing feature translates from a retain position to an open position as a suitable fiber optic connector is inserted into the multi-fiber connection port.

Another aspect of the disclosure is directed to terminals or devices comprising at least one single-fiber connection port and at least one multi-fiber connection port. The single-fiber connection port is disposed on the terminal and comprises an optical connector opening extending toward a cavity of the terminal and defines a single-fiber connection port passageway configured for receiving a single-fiber plug connector for optical connection. The single-fiber connection port comprises a single-fiber modular adapter sub-assembly comprising a single-fiber adapter body. The multi-fiber connection port is disposed on the terminal and comprises an optical connector opening extending toward a cavity of the terminal and defines a multi-fiber connection port passageway configured for receiving a multi-fiber plug connector for optical connection, where the multi-fiber connection port inhibits the damaging insertion of the single-fiber plug connector intended for the single-fiber connection port into the multi-fiber connection port. The multi-fiber connection port comprises a multi-fiber modular adapter sub-assembly comprising a multi-fiber adapter body, and an adapter comprising a single-fiber connector stop, where the single-fiber connector stop is sized for inhibiting the damaging insertion of the non-compatible single-fiber plug connector into the multi-fiber connection port. At least one securing feature is associated with the at least one multi-fiber connection port, and at least one securing feature resilient member biasing a portion of the at least one securing feature. The securing feature comprises a bore that is aligned with the multi-port connection port passageway along with a locking feature comprising a ramp with a ledge. The securing feature translates from a retain position to an open position as a suitable fiber optic connector is inserted into the multi-fiber connection port.

A yet further aspect of the disclosure is directed to terminals or devices comprising at least one first connection port and at least one second connection port. The first connection port is disposed on the terminal and comprises an optical connector opening extending toward a cavity of the terminal and defines a first connection port passageway configured for receiving a first plug connector for optical connection. The second connection port is disposed on the terminal and comprises an optical connector opening extending toward a cavity of the terminal and defines a second connection port passageway configured for receiving a second plug connector for optical connection, where the second connection port inhibits the damaging insertion of the first plug connector intended for the first connection port into the second connection port. The first and second plug connectors are different and are not compatible with other connection port.

A further aspect of the disclosure is directed to a wireless device comprising at least one single-fiber connection port and at least one multi-fiber connection port. The single-fiber connection port is disposed on the wireless device and comprises an optical connector opening extending toward a cavity of the wireless device and defines a single-fiber connection port passageway configured for receiving a single-fiber plug connector for optical connection. The multi-fiber connection port is disposed on the wireless device and comprises an optical connector opening extending toward a cavity of the wireless device and defines a multi-fiber connection port passageway configured for receiving a multi-fiber plug connector for optical connection, where the multi-fiber connection port inhibits the damaging insertion of the single-fiber plug connector intended for the single-fiber connection port into the multi-fiber connection port. Where the second plug connector comprises a different connector interface than the connector interface for the first plug connector.

Other aspects of the disclosure are directed to devices or terminals comprising a shell, at least one connection port, a securing feature passageway, at least one securing feature, and at least one modular adapter sub-assembly disposed within the shell. The at least one connection port comprising an optical connector opening extending from an outer surface of the terminal to a cavity of the terminal and defining a connection port passageway. The at least one securing feature capable of translating being associated with the connection port passageway, and the at least one securing feature comprises a locking member and an actuator, and the actuator is capable of translating within a portion of the at least one securing feature passageway, and where at least one securing feature translates from a retain position to an open position as a suitable fiber optic connector is inserted into the at least one connection port. The securing member being a part of the modular adapter sub-assembly.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Figure 1:
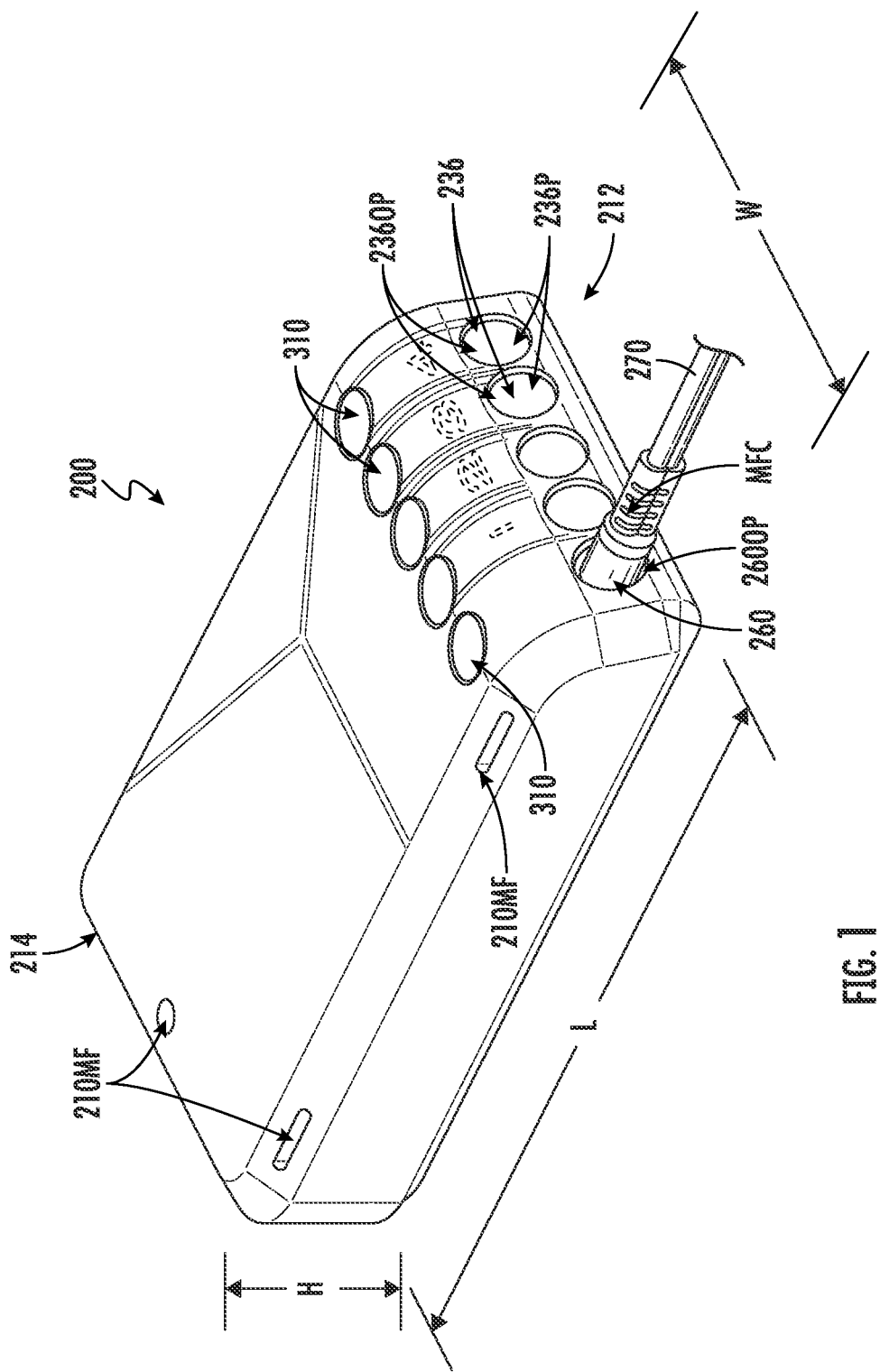
FIG. 1 is a perspective view of an explanatory terminal for making an optical connection comprising at least one single-fiber connection port and at least one multi-fiber connection port.

Reference will now be made in detail to the embodiments of the disclosure, examples of which are illustrated in the accompanying drawings. Whenever possible, like reference numbers will be used to refer to like components or parts.

The concepts for the terminals disclosed herein are suitable for providing at least one optical connection to the terminal for indoor, outdoor or other environments as desired. Generally speaking, the devices disclosed and explained in the exemplary embodiments are terminals with one or more multifiber optical connection ports, but the concepts disclosed may be used with any suitable device as appropriate.

The terminals disclosed herein are suitable for making optical connections and comprise a shell having a plurality of optical connection ports configured for removably receiving external optical connectors into the respective optical connection port(s). Specifically, the optical connection ports of the terminal may have one or more multi-fiber connection ports for receiving and making an optical connection with a suitable external multi-fiber connector. The concepts disclosed herein may also advantageously inhibit the damaging insertion of non-compatible external connectors into one or more of the multi-fiber connection ports of the terminal as disclosed.

As used in a first arrangement, the term "terminal" comprises at least one first optical connection port such as at least one single-fiber connection port for making an optical connection with a suitable single-fiber connector (e.g., a first connection port that supports a first external connector footprint) and at least second optical connection port such as at least one multi-fiber connection port for receiving and making an optical connection with a suitable multi-fiber connector (e.g., a second connection port that supports a second external connector footprint). In a second arrangement, terminal comprises at least one first optical connection port configured as a first multi-fiber connection port for making an optical connection with a second optical connection port configured as a second multi-fiber connection port for receiving and making an optical connections with suitable external multi-fiber connectors. The first and second multifiber connection ports may be configured for receiving the same external fiber optic connector or two different external fiber optic connectors.

In the first arrangement, the terminal may inhibit the damaging insertion of non-compatible external first connector intended for the first connection port (e.g., compatible with the first single-fiber external connector footprint) into the second port (e.g., compatible with the second external connector footprint for a multi-fiber connector) if mistakenly attempted by inhibiting contact with the mating portion of the at least one second connection port. By way of example, the terminal may be any suitable device having at least one single-fiber connection port and at least one multi-fiber connection port such as a passive device like a multiport, an optical closure, an active device such as a wireless device having electronics for transmitting or receiving a signal, or the like. In the second arrangement, the terminal comprises a plurality of multi-fiber optical connection ports that may use the concepts of disclosed herein for supporting one or more different external fiber optic connectors and may inhibit contact or damage if inadvertently attempting to insert and mate the wrong type of external fiber optic connector within the optical connection port.

Although the term "single-fiber connection port" is used in the application the single-fiber connection port may support more than one optical fiber with the understanding that the external connector for the "single-fiber connection port" has a different mating connector footprint that is distinguished from the external connector intended for optically mating with the multi-fiber connection port. By way of example, the ferrule for the "single-fiber connection port" may support two optical fibers in the ferrule as known in the art, but the external connector intended for mating with this connection port is distinguished and not compatible with the multi-fiber connection port. Other possible variations of this concept are possible for the "single-fiber connection port" such as having connector port intended for optically mating external connectors with two ferrules.

Thus, the broad concept for the terminals disclosed is that there is a first connection port that supports and optically mates with a first optical connector footprint and second connection port that supports and optically mates with a second optical connector footprint, and the second connection port inhibits the damaging insertion from the first external optical connector if mistakenly attempted to be inserted into the second connection port of the terminal that is configured for a different external fiber optic connector interface.

In one embodiment, the concepts disclosed advantageously allow compact and modular form-factors for terminals. For instance, the terminal may comprise a multi-fiber modular adapter sub-assembly associated with the at least one multi-fiber connection port and a securing feature associated with the connection port if desired. The multi-fiber modular adapter sub-assembly may have different constructions as disclosed herein while still employing the disclosed concepts Likewise, the terminals may comprising a single-fiber modular adapter sub-assembly associated with the at least one single-fiber connection port and a securing feature associated with the connection port if desired. However, the concepts disclosed herein may be used with terminals that do not use modular adapter sub-assemblies if desired. The concepts are also scalable to any suitable count of single-fiber or multi-fiber connection ports on a terminal in a variety of arrangements or constructions. The securing features disclosed herein for terminals engage directly with a portion of the external connector inserted into the connection port without conventional structures like prior art terminals that require the turning of a coupling nut, bayonet or the like for securing the external connector. As used herein, "securing feature" excludes threads and features that cooperate with bayonets on a connector. Moreover, the securing feature may comprise one or more components such a securing member or a securing member and actuator. Thus, the terminals disclosed may allow connection ports to be closely spaced together and may result in relatively small terminals since the room needed for turning a threaded coupling nut or bayonet is not necessary. The compact form-factors may allow the placement of the terminals in tight spaces in indoor, outdoor, buried, aerial, industrial or other applications while providing at least one multi-fiber connection port and at least one single-fiber connection port that is advantageous for a robust and reliable optical connections in a removable and replaceable manner. The disclosed terminals may also be aesthetically pleasing and provide organization for the optical connections in manner that the prior art terminals cannot provide.

The terminals disclosed are simple and elegant in their designs. The terminals disclosed comprise at least one second connection port such as a multi-fiber connection port comprising an optical connector opening extending toward a cavity of the terminal and defining a multi-fiber connection port passageway that may receive a multi-fiber plug connector for optical connection. The multi-fiber connection port inhibits the damaging insertion of the external connector suitable for optically mating with the first connection port of the terminal such as a single-fiber plug connector intended for the at least one single-fiber connection port if mistakenly attempted to be inserted into the second connection port. As used herein, the first connection port and the second connection port support different external optical connectors for mating and making and optical connection.

Further, the connection port(s) of the terminal may also include a keying portion that cooperates with a key on a complimentary external fiber optic connector to inhibit damage to the connection port by inhibiting the insertion of a non-compliant connector or not. The keying portion may also aid the user during blind insertion of the connector into the connection port of the device to determine the correct rotational orientation with respect to the connection port when a line of sight is not possible or practical for alignment.

Unlike prior art terminals, the concepts disclosed advantageously allow the quick and easy connection and retention by inserting the external fiber optic connectors directly into the connection port of the device without the need or space considerations for turning a threaded coupling nut or bayonet for retaining the external fiber optic connector. Generally speaking, the securing features disclosed for use with devices herein may comprise one or more components with at least one component translating for releasing or securing the external fiber optic connector to the terminal. As used herein, the term "securing feature" excludes threaded portions or features for securing a bayonet disposed on a connector.

Since the connector footprint used with the explanatory terminals disclosed does not require the bulkiness of a coupling nut or bayonet, the fiber optic connectors used with the terminals disclosed herein may be significantly smaller than conventional connectors used with prior art terminals. Moreover, the present concepts for connection ports on terminals allows an increased density of connection ports per volume of the shell or increased port width density since there is no need for accessing and turning the coupling nut or bayonets by hand for securing a fiber optic connector like the prior art terminals.

The terminals disclosed comprise a securing feature for directly engaging with a suitable portion of a connector housing of the external fiber optic connector or the like for securing an optical connection with the suitable port. Different variations of the concepts are discussed in further detail below. The structure for securing the fiber optic connectors in the devices disclosed allows much smaller footprints for both the terminals and the external fiber optic connectors along with a quick-connect feature. Terminals may also have a dense spacing of connection ports if desired. The terminals disclosed advantageously allow a relatively dense and organized array of connection ports in a relatively small form-factor while still being rugged for demanding environments. As optical networks increase densifications and space is at a premium, the robust and small-form factors for terminals such as multiports, closures, wireless devices or the like become increasingly desirable for network operators.

The concepts disclosed herein are suitable for optical distribution networks such as for Fiber-to-the-Home and 5G applications, but are equally applicable to other optical applications as well including indoor, automotive, industrial, wireless, or other suitable applications. Additionally, the concepts disclosed may be used with any suitable fiber optic connector footprint that cooperates with the securing feature of the terminal. Various designs, constructions, or features for terminals are disclosed in more detail as discussed herein and may be modified or varied as desired.

The terminals disclosed may locate the at least one multi-fiber connection port or at least one single-fiber connection port in different portions or locations of the device as desired using the disclosed concepts. The concepts are shown and described with a terminal having four single-fiber connection ports that are optically connected to a multi-fiber connection port with the ports arranged in an array on one end of the terminal, but other configurations are possible such as connection ports on both ends, an express port, a pass-through port or the like. Although, these concepts are described with respect to terminals the concepts may be used with any other suitable terminals or devices such as wireless devices, closures or other suitable devices.

Figure 2:
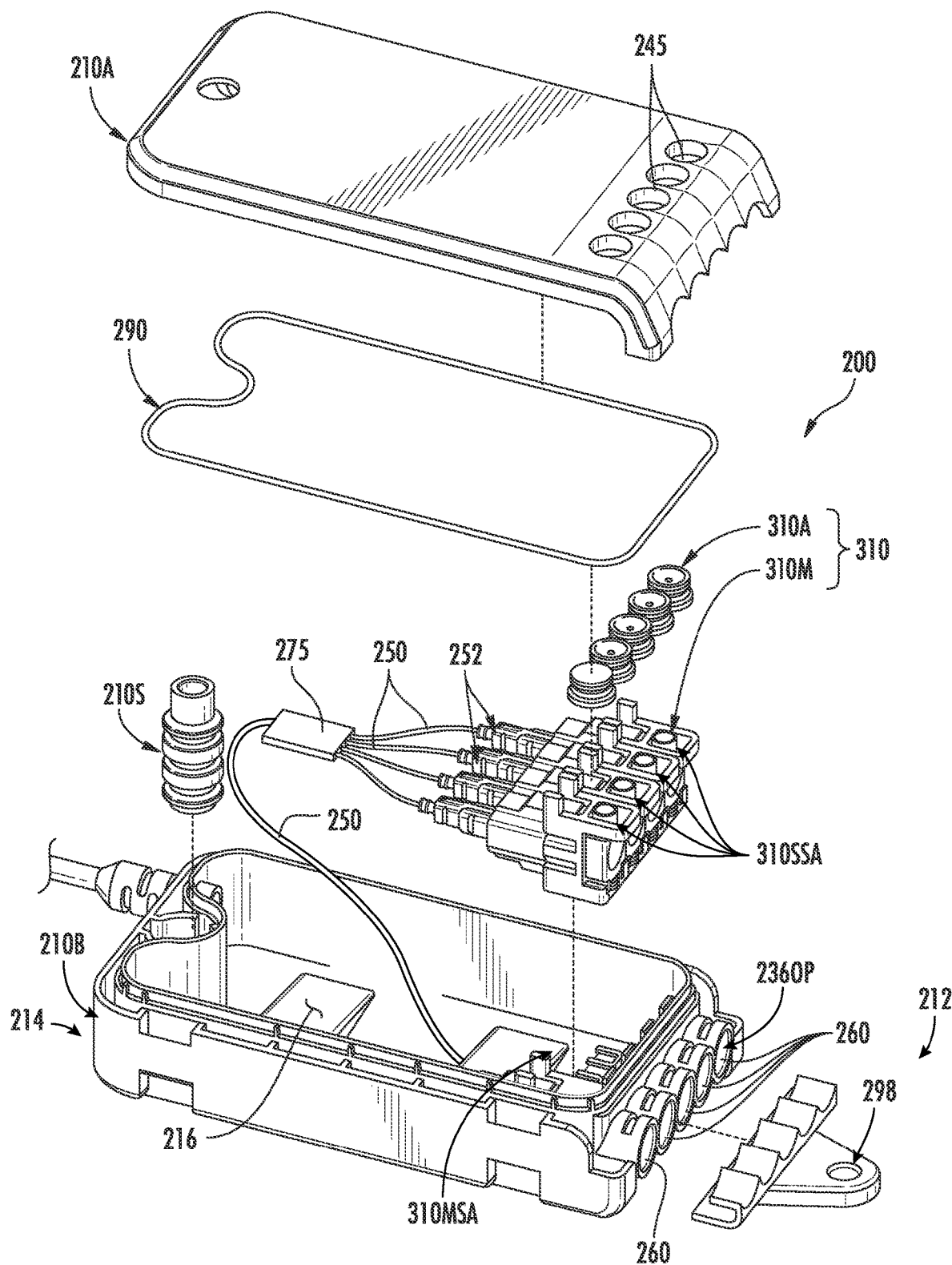
FIG. 2 is a partial exploded view of the terminal of FIG. 1 showing the multi-fiber modular adapter sub-assembly positioned with the shell and the single-fiber modular adapter sub-assemblies exploded from the shell along with the routing of the optical fibers.

FIGS. 1 and 2 respectively depict a top perspective view and an exploded view of explanatory terminals 200 comprising at least one first connection port such as single-fiber connection port 236 and at least one second connection port such as multi-fiber connection port 260 of terminals 200. Generally speaking, the first connection port or single-fiber connection port(s) 236 comprise an optical connector opening 2360P extending toward a cavity 216 of the terminal 200 and defining a first connection port passageway such as a single-fiber connection port passageway 236P configured for receiving a first connector such as a single-fiber plug connector for optical connection. The at least one second connection port such as multi-fiber connection port 260 comprises an optical connector opening 2600P extending toward the cavity 216 of the terminal 200 and defining a second connection port passageway such as a multi-fiber connection port passageway 260P configured for receiving a second connector such as a multi-fiber plug connector for optical connection. The multi-fiber connection port 260 inhibits the damaging insertion of the single-fiber plug connector intended for the at least one single-fiber connection port 236 into the at least one multi-fiber connection port 260. The single-fiber connection ports 236 and multi-fiber connection port 260 are configured for receiving and retaining suitable external fiber optic connectors for making optical connections with the different connection ports of the terminal 200 (i.e., the external connectors have different connector mating footprints for the respective first and second connection ports). The connection ports 236,260 of terminal 200 may comprise a portion of any suitable structure such as a shell 210 or the connection ports 236,260 may be independent of the shell or closure if desired.

FIG. 2 depicts a partially exploded view showing one or more optical fibers 250 that provide optical communication from the second connection port(s) such as the multi-fiber connection port 260 to the first connection port(s) such as respective single-fiber connection ports 236 inside terminal 200. Terminal 200 may use one or more optical splitters, couplers, or wavelength multiplexers 275 as depicted or not as desired. The one or more optical fibers 250 may attach to an internal ferrule, connector or the like at the second connection port such as the multi-fiber connection port 260 as an input port and provide optical communication via an internal ferrule, connector or the like at the respective first connection port(s) such as single-fiber connection ports 236 as outputs port for the terminal 200. However, other suitable arrangements are possible for terminal 200 such as no splitters, couplers or the like, multiple splitters, pass-through connection ports, or express connection ports having one or more optical connections for providing the desired optical connectivity. Although, the term "multi-fiber connection port" is used it may only use a single-fiber in a multi-fiber ferrule, connector or the like if desired and represents a second connection port that is different than the first connection port(s). In this embodiment, the multi-fiber connection port comprises a multi-fiber ferrule such as an MT ferrule associated with the connection port and may terminate any suitable number of optical fibers such as one or more optical fibers.

For the sake of simplicity in the description, the explanatory terminals 200 with respect to "single-fiber connection port" representing the "first connection port" and "multi-fiber connection port" representing the "second connection port" for the concepts disclosed. The first connection port or single-fiber connection port and the second connection port or multi-fiber connection port cooperate with different external connector mating footprints for making an optical connection.

By way of further explanation, one or more optical fibers 250 are routed from the at least one multiple-fiber connection port 260 toward one or more single-fiber connection ports 236 for optical communication within and among the connections ports of the terminal 200. For instance, one or more optical fibers from the at least one multifiber connection port 260 are terminated at a ferrule of connection port 260 and then optical fibers 250 are routed so they are in optical communication with the respective single-fiber connection ports 236 such as terminated at respective ferrules of the connection ports 236. This optical wiring inside the cavity 216 of the terminal 200 among the connection ports may take several different configurations and support unidirectional or bi-direction traffic as desired.

By way of explanation, the multi-fiber input connection port 260 terminates one or more optical fibers and then routes the optical signals as desired such as passing the optical signal(s) through 1:1 distribution, routing through an optical splitter 1:N, and/or passing some of the optical fibers through the terminal. For instance, terminal 200 may comprise a device 275 such as a splitter 275 that allows a single optical signal to be split into multiple signals such as 1×N split, but other splitter arrangements are possible such as a 2×N split or multiple splitters 275 within the cavity 216 as desired. By way of example, a single optical fiber may feed the multi-fiber connection port 260 and use a 1×8 splitter within the terminal 200 to allow eight single-fiber connector ports 236 for outputs on the terminal 200.

As an alternative having multiple splitters 275 inside terminal 200, the optical wiring may comprise a first splitter such as a 1:2 splitter with a first optical fiber 250 of the first splitter being routed to a downstream output port of terminal 200 for feeding optical signals deeper into the optical network and a second optical fiber 250 of the first splitter feeding a second 1:M splitter for routing toward a plurality of output ports for feeding optical signals to subscribers. For the sake of simplicity and clarity in the drawings a simple splitting arrangement is shown. Moreover, all of the optical fiber wiring may not be illustrated or portions of the optical wiring inside the terminal 200 may be removed in the FIGS. for the sake of simplicity in disclosing the concepts.

As shown in FIG. 1, the single-fiber connection ports 236 or multi-fiber connection port 260 may comprise a marking indicia such as an embossed number or text for identification to the technician, but other marking indicia are also possible. For instance, the marking indicia may be on the securing feature 310 such as text or a visible portion of the securing features may be color-coded to indicate fiber count, position, power-level or other relevant information for the technician.

In this embodiment, the single-fiber connection ports 236 and the multi-fiber connection port 260 each comprises a respective optical connector opening 2360P,2600P extending from an outer surface 234 of the terminal 200 into a cavity 216 of the terminal 200 and defining a portion of respective a connection port passageway 236P,260P. By way of explanation, portions of the connection ports are 236,260 are molded as a portion of shell 210, but other constructions are possible with the concepts disclosed.

Although one advantageous structure is illustrated and explained for attaching the external connectors to the terminal 200 using modular adapter sub-assemblies, the concepts disclosed herein may use any suitable structure for attaching the external connectors to the respective connection ports of the terminal 200 such as threads, bayonets or the like.

As shown in FIG. 2, the explanatory terminals 200 may use one or more second modular adapter sub-assemblies such as multi-fiber modular adapter sub-assemblies 310MSA such as shown in FIGS. 4, 4A or FIGS. 28-32) or one or more first modular adapter sub-assemblies such as single-fiber modular adapter sub-assemblies 310SSA (FIGS. 16 and 17) disposed within a shell 210. Still other configurations are possible for the multi-fiber modular adapter sub-assemblies 310MSA or the single-fiber modular adapter sub-assemblies 310SSA as desired.

The second or multi-fiber modular adapter sub-assemblies 310MSA and first or single-fiber modular adapter sub-assemblies 310SSA have some different components such as different adapter bodies and/or adapters for implementing the disclosed concepts with distinctly different first and second connection ports 236,260 of the terminal 200 that cooperate with different external connector mating footprints. However, the first and second modular adapter sub-assemblies may use some of the same components such as using the same securing member 310M, securing actuator 310A or securing feature resilient member 310RM for biasing the securing feature toward a retain position as desired.

Again for the sake of simplicity in the description, the explanatory terminals 200 with respect to "single-fiber modular adapter sub-assembly" represents a "first modular adapter sub-assembly" and "multi-fiber modular adapter sub-assembly" represents the "second modular adapter sub-assembly" for the concepts disclosed, which cooperate with different external connector mating footprints (e.g., connector interfaces).

The use of multi-fiber modular adapter sub-assemblies 310MSA or single-fiber modular adapter sub-assemblies 310SSA advantageously provide a scalable form-factor for manufacturing terminals with different port counts along with other advantages such as quick and easy assembly of terminals in a scalable and efficient manner The multi-fiber modular adapter sub-assemblies 310MSA or single-fiber modular adapter sub-assemblies 310SSA may comprise a portion of respective securing feature(s) 310 associated with the respective connection ports for providing quick and easy optical connectivity with a robust and reliable design that is intuitive to use. Moreover, the sub-assemblies may provide the second connection port such as the multi-fiber optical connection port 260 the benefit of inhibiting the damaging insertion of non-compatible first external connector such as the single-fiber connectors intended for the first connection port from being mistakenly inserted and damaging the second optical connection port such as the multi-fiber optical connection port of the terminal 200. However, the concepts disclosed may similarly be used with terminals having only a plurality of multi-fiber optical connection ports that inhibit non-compliant external connectors from damaging the respective multi-fiber optical connection ports of the terminal. By way of explanation, all of the same types of multi-fiber modular adapter sub-assemblies 310MSA may be placed into a shell 210 of the terminal 200 while still inhibiting insertion damage from a non-compliant external connector.

The multi-fiber modular sub-assemblies 310MSA and/or single-fiber modular adapter sub-assemblies 310MSA advantageously allow the mating components (i.e., the adapters 260A, 230A) corresponding to each connection port 236,260 to move or "float" independently of other the other modular adapter sub-assemblies 310MSA, 310SSA relative to the shell 210 for preserving optical performance. In other words, the individual adapters are not coupled together so they are required to move as a group, which would restrict movement among the adapters and could cause mating or optical attenuation concerns.

Figure 33:
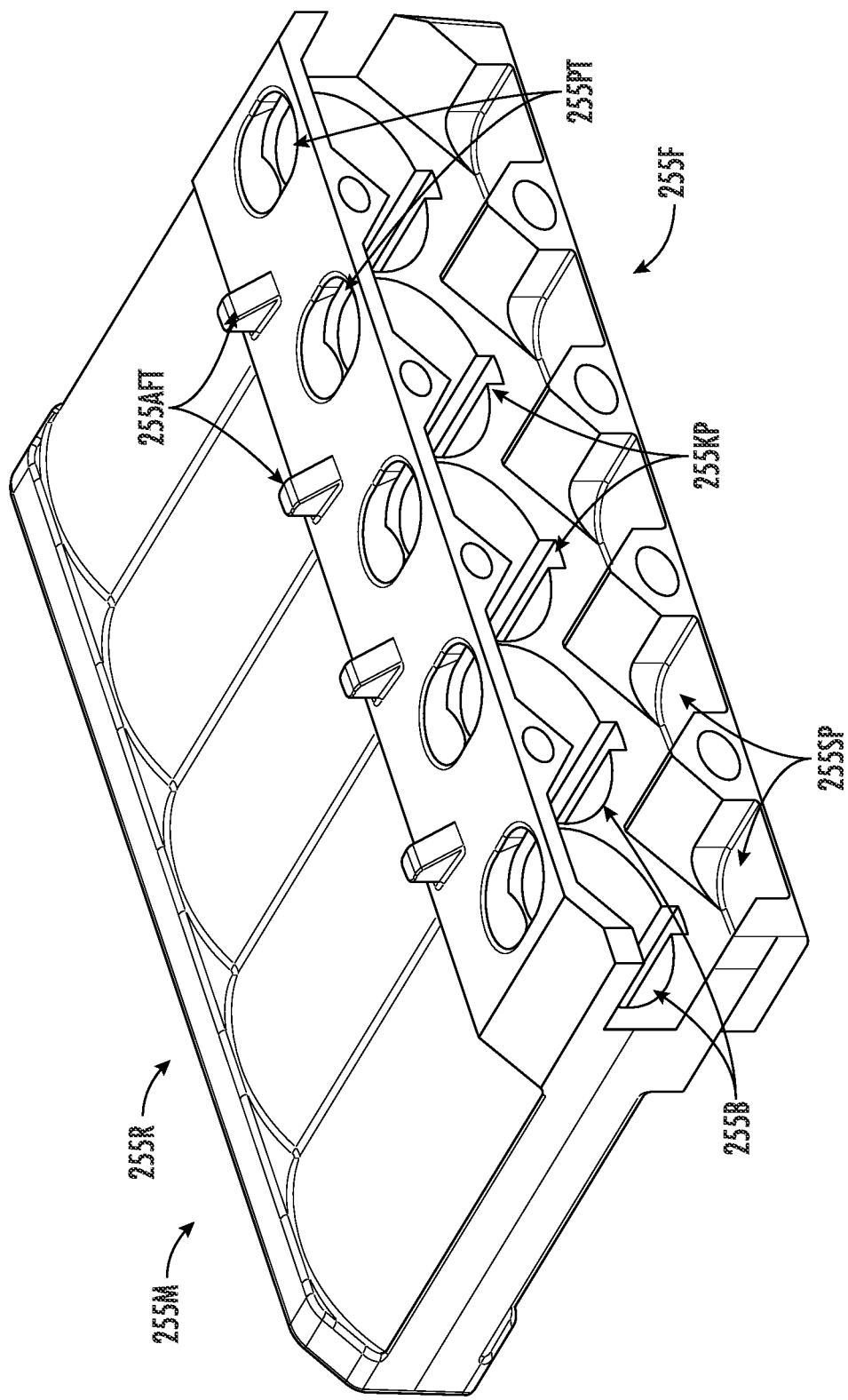
FIG. 33 is perspective view of another adapter body that has multiple sleeves ganged together in a common component for assembling supporting a plurality of connection ports with multi-fiber modular sub-assemblies.

However, the concepts disclosed may be used with a common body configured for supporting a plurality adapters for the respective connection ports such as shown in FIG. 33. Supporting the adapters with the common body does not allow the independent movement like independent bodies for the connection ports of the terminal.

Generally speaking, the first and second connection ports 236,260 may be configured for the specific external connector intended to be received in the respective connection ports 236,260. Likewise, the first and second connection ports 236,260 should be configured for receiving the specific internal rear connector for mating and making an optical connection with the desired first and second external connector.

Figure 27:
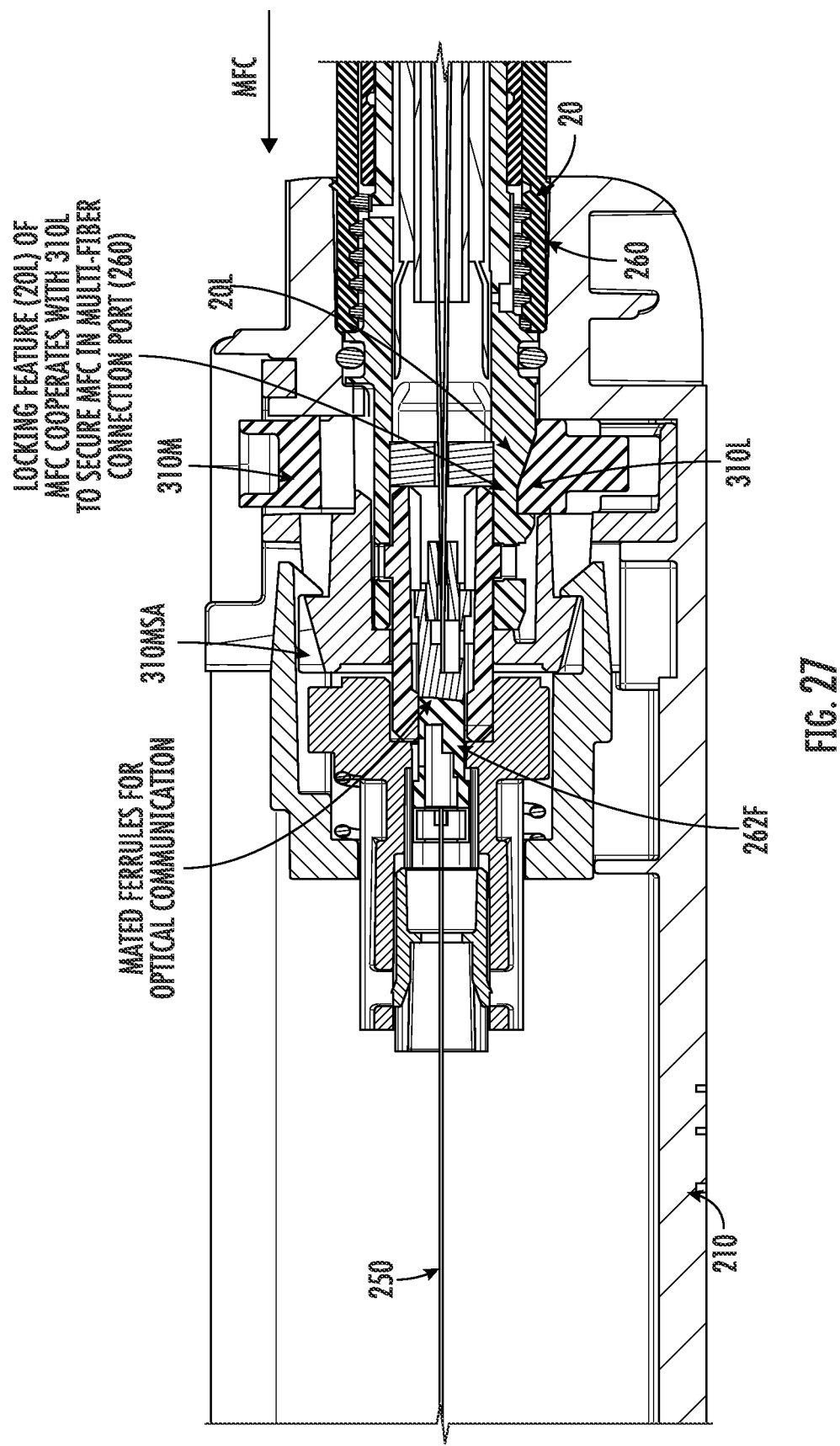
FIG. 27 is a partial sectional view showing the external multi-fiber connector retained in multi-fiber connector port with the cooperation between the locking feature of the external multi-fiber connector and the locking feature (310L) of the securing member (310M).

Optical connections to the terminals 200 are made by inserting one or more suitable external fiber optic connectors into respective connection port passageways 236P,260P as desired. Specifically, the single-fiber connection port passageway 236P is configured for receiving a suitable external single-fiber optic connector of a fiber optic cable assembly (hereinafter cable assembly). Single-fiber connection port passageway 236P is associated with its respective securing feature 310 for retaining (e.g., securing) the single-fiber connector in the terminal 200 for making an optical connection. Likewise, the multi-fiber connection port passageway 260P is configured for receiving a suitable external multi-fiber optic connector (MFC) as shown in FIG. 27. The multi-fiber connection port passageway 260P is associated with its respective securing feature 310 for retaining (e.g., securing) the multi-fiber connector (MFC) in the terminal 200 for making an optical connection. The respective securing features 310 advantageously allow the user to make a quick and easy optical connection at the respective connection ports 236,260 of terminal 200. The securing feature 310 may also operate for providing a connector release feature when actuated.

As depicted, terminal 200 comprises one securing feature 310 associated with each of the respective single-fiber connection ports 236 for cooperating with suitable external single-fiber optic connector. Likewise, one securing feature 310 is associated with the respective multi-fiber connection port 260 for cooperating with suitable external multi-fiber optic plug connector. The securing feature 310 may translate for securing or releasing the respective external fiber optic connectors. The concepts disclosed may also use a securing feature resilient member 310RIVI for biasing a portion of the securing feature 310 as discussed herein.

Specifically, the respective suitable external connector may be retained within the respective connection port 236, 260 of the terminal 200 by pushing and fully-seating the external connector within the respective connection port 236,260 such as shown in FIG. 27. To release the external connector from the respective connection port 236,260, the securing feature 310 is actuated by pushing inward and releasing the securing feature 310 from the locking feature 20L on the connector housing 20 of the respective external connector and allowing the connector to be removed from the respective connection port 236,260. Stated another way, the at least one securing feature 310 is capable of releasing the connector when a portion of the securing feature 310 translates within a portion of a securing feature passageway 245. The full insertion and automatic retention of the external connector may advantageously allow one-handed installation of the connector by merely pushing the suitable connector into the connection port 236,260. The terminals 200 disclosed accomplish this connector retention feature upon full-insertion by biasing the securing feature to a retain position. However, other modes of operation for retaining and releasing the external connector are possible according to the concepts disclosed. For instance, the securing feature 310 may be designed to require actuation for inserting the connector; however, this may require a two-handed operation.

Securing feature 310 may be designed for holding a minimum pull-out force for the connector. In some embodiments, the pull-out force may be selected to release the connector before damage is done to the terminal or the connector. By way of example, the securing feature 310 associated with the connection port 236 may require a pull-out force of about 50 pounds (about 220N) before the connector would release. Likewise, the securing feature 310 may provide a side pull-out force for connector for inhibiting damage as well. By way of example, the securing feature 310 associated with the connection ports 236,260 may provide a side pull-out force of about 25 pounds (about 110N) before the connector would release. Of course, other pull-out forces such as 75 pounds (about 330N) or 100 (about 440N) pounds are possible along with other side pull-out forces.

Figure 3:
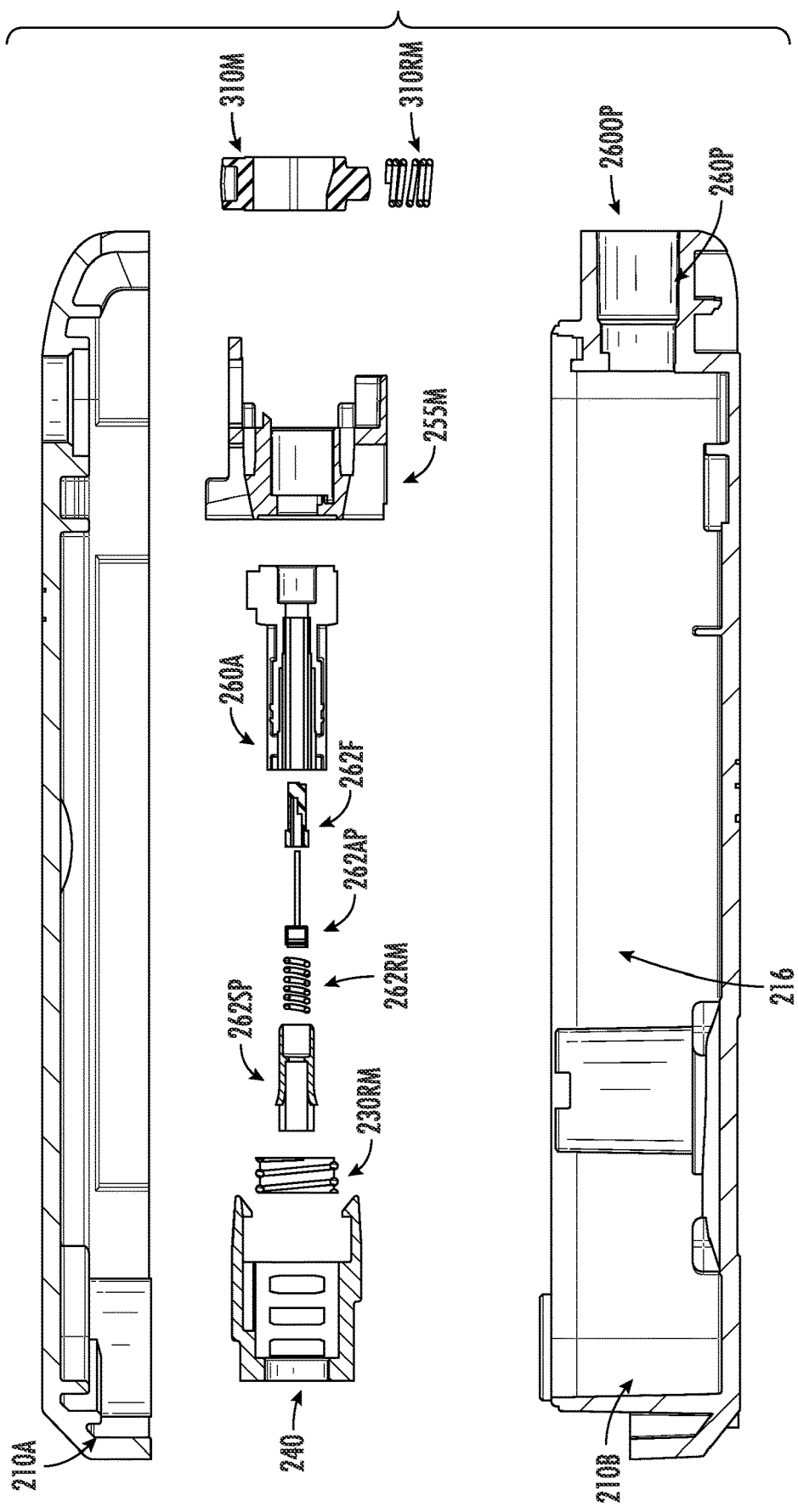
FIG. 3 is an exploded and sectional view of the shell with a portion of the multi-fiber modular adapter sub-assembly of the terminal of FIG. 1.
Figure 28:
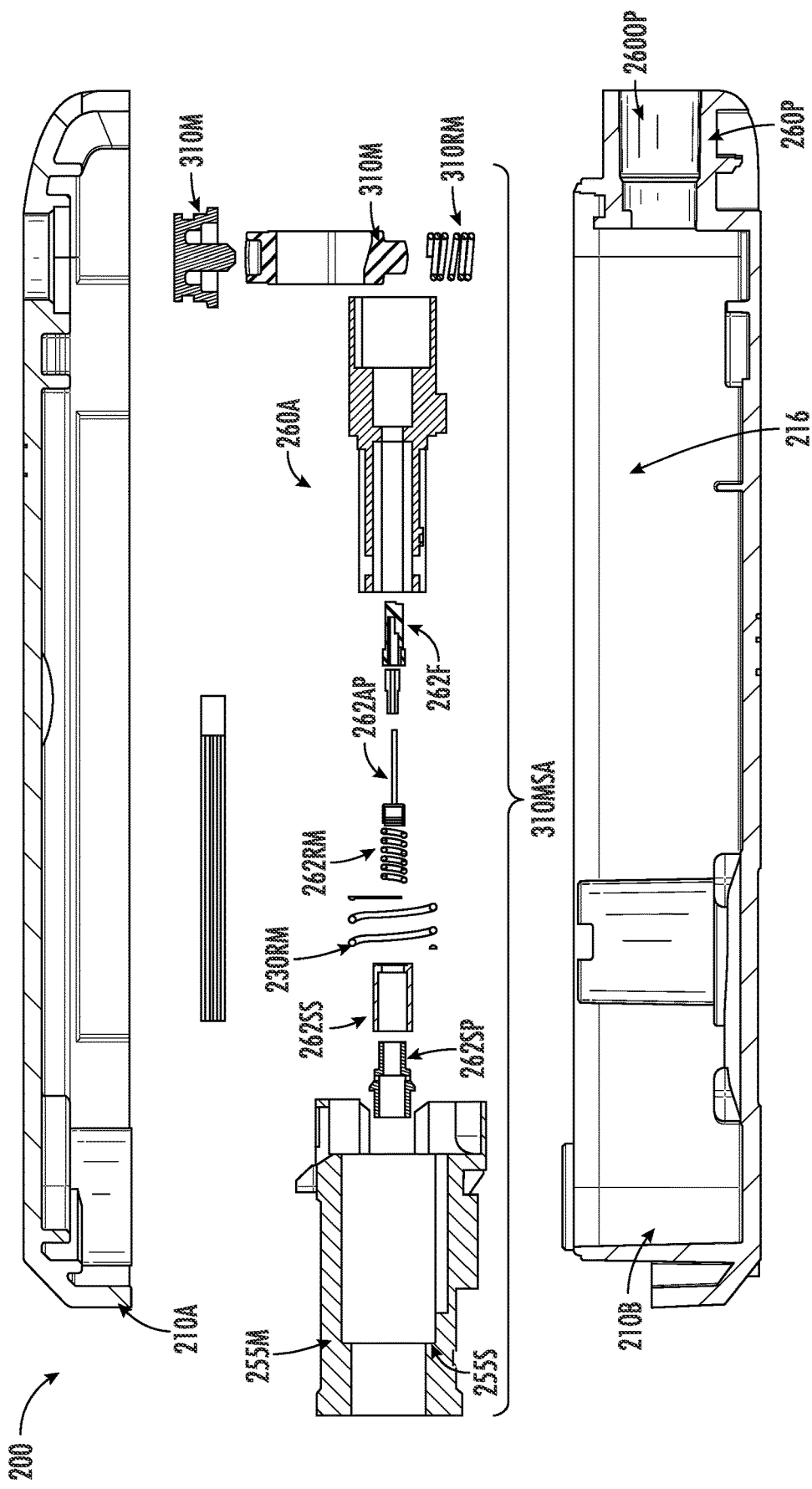
FIGS. 28-32 depict an exploded and sectional view of the shell with another multi-fiber modular adapter sub-assembly for use with terminals such as shown in FIGS. 1 and 2.

FIG. 3 is an explanatory exploded, and sectional view of a first multi-fiber modular adapter sub-assembly 310MSA along with shell 210 formed by a first portion 210A and a second portion 210B. Likewise, FIG. 28 is an explanatory exploded, and sectional view of another multi-fiber modular adapter sub-assembly 310MSA along with shell 210 formed by a first portion 210A and a second portion 210B. The multi-fiber modular adapter sub-assemblies 310MSA disclosed herein have similar constructions and differences will be discussed for the sake of brevity. Other components of the terminal 200 are not shown for the purposes of clarity in FIGS. 3 and 28.

Figure 4:
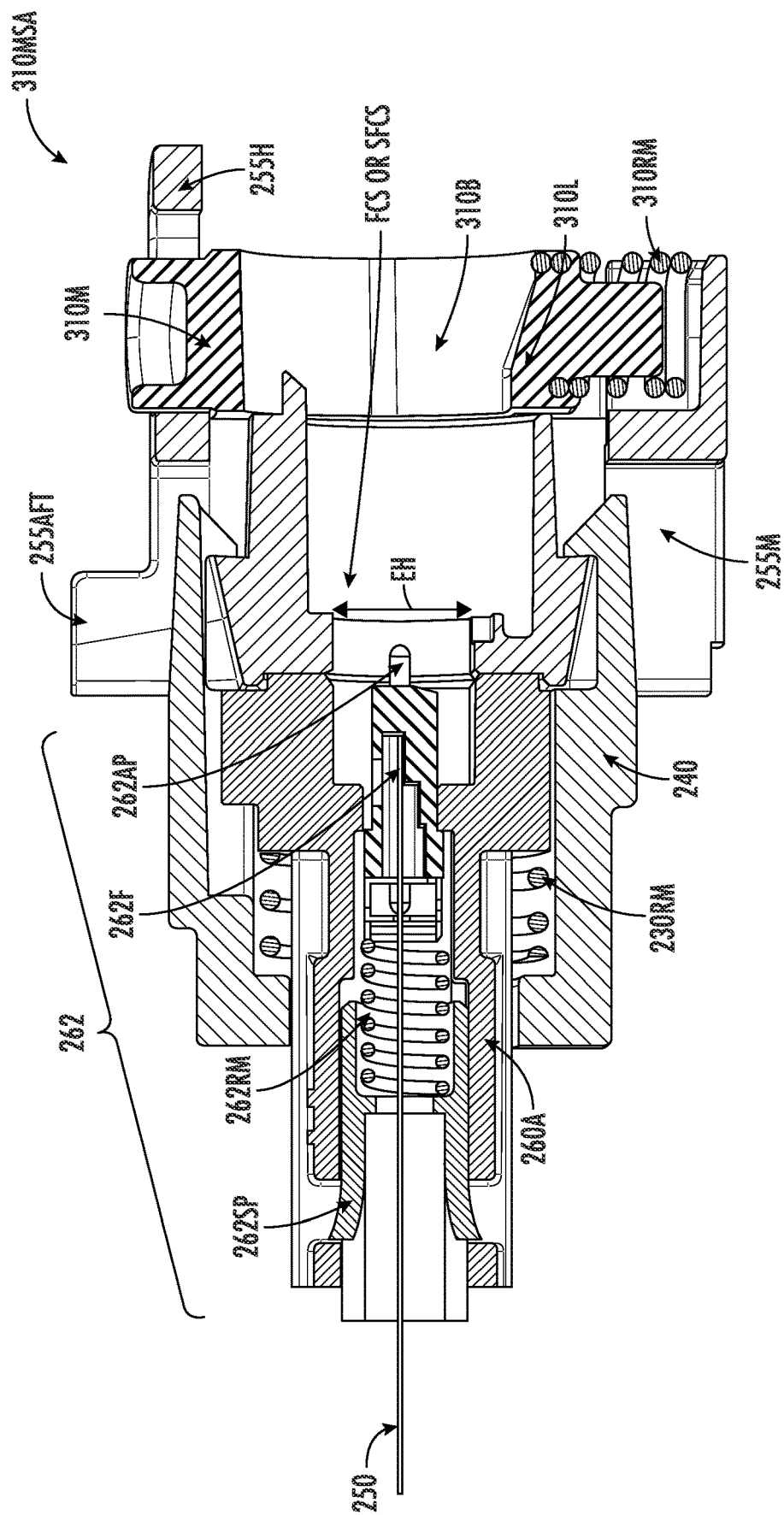
FIG. 4 is a sectional assembled view of a first multi-fiber modular adapter sub-assembly with the internal multi-fiber connector inserted into and attached to the multi-fiber modular adapter sub-assembly for mating with a complimentary external connector.
Figure 5:
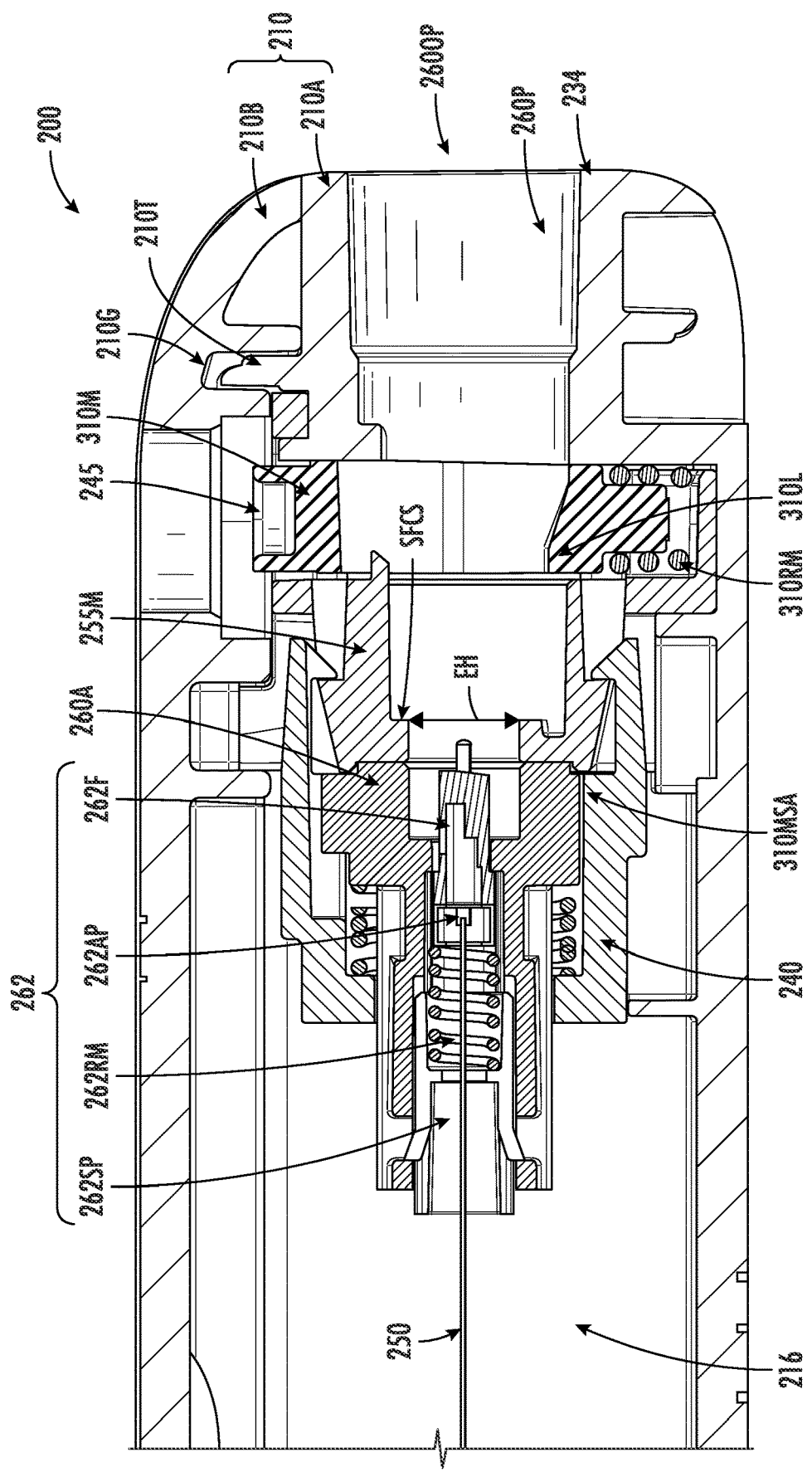
FIG. 5 is a close-up sectional view of the first multi-fiber modular adapter sub-assembly installed into the shell of the terminal.
Figure 29:
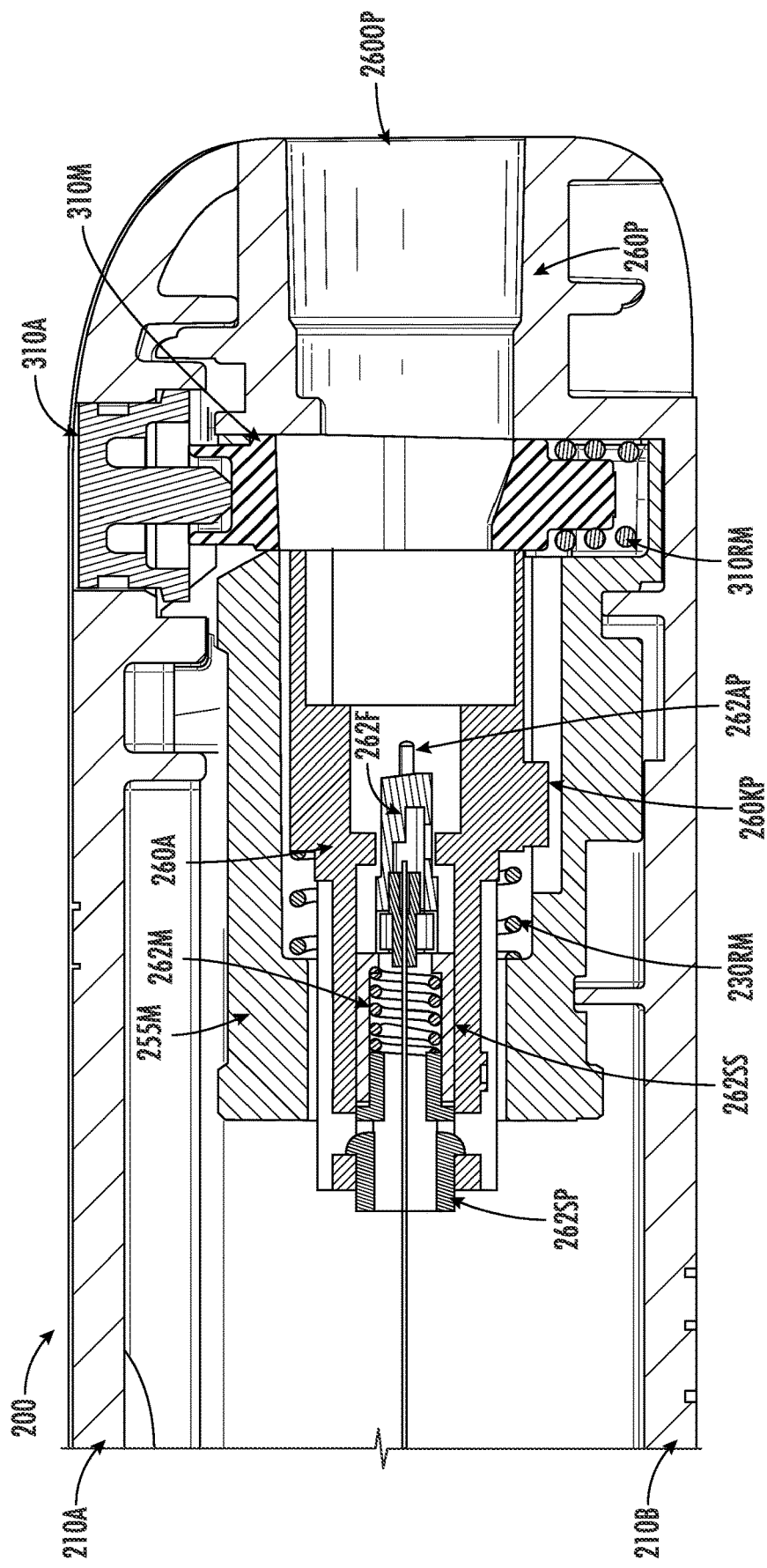
Figure 30:
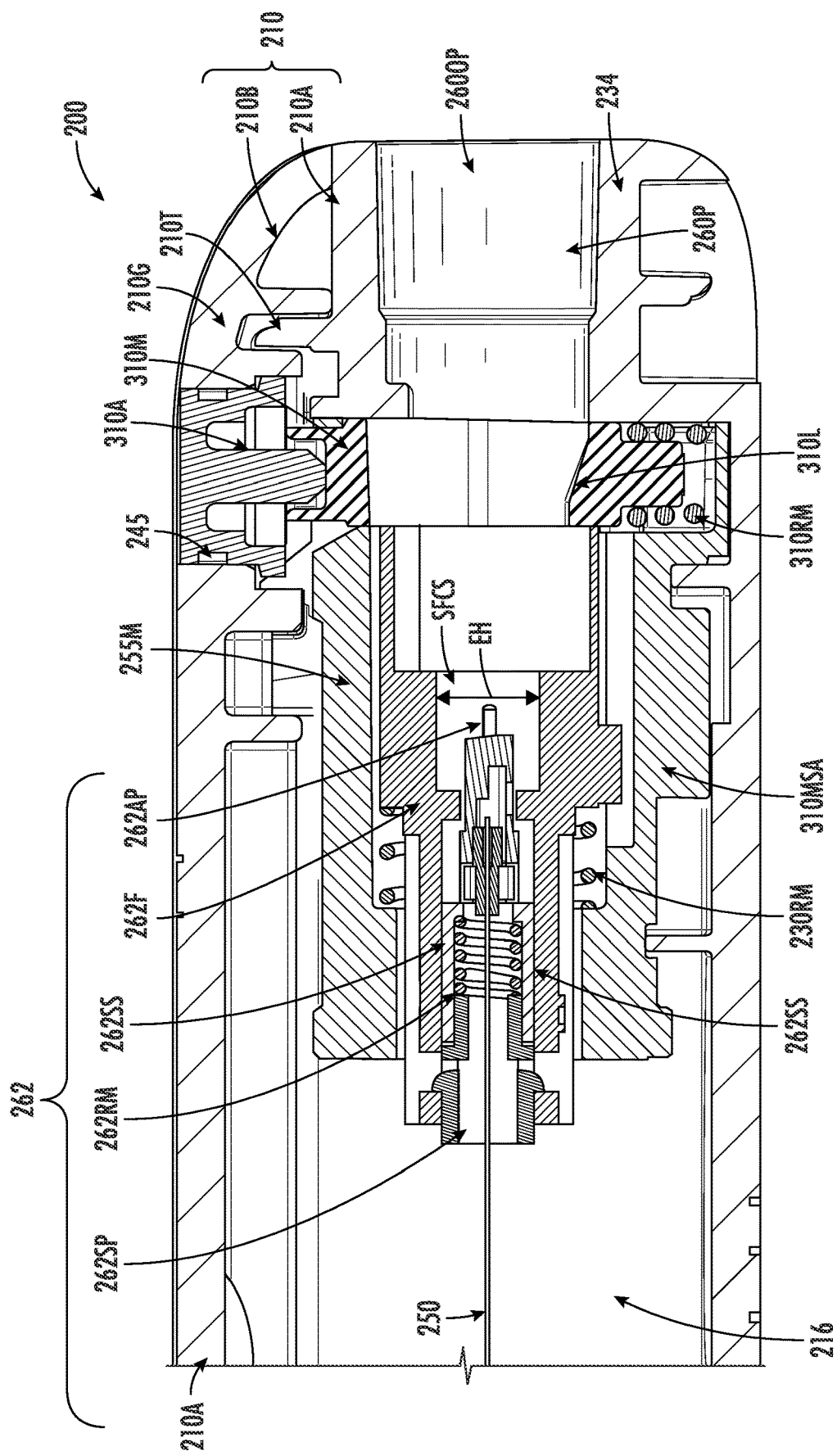
Figure 31:
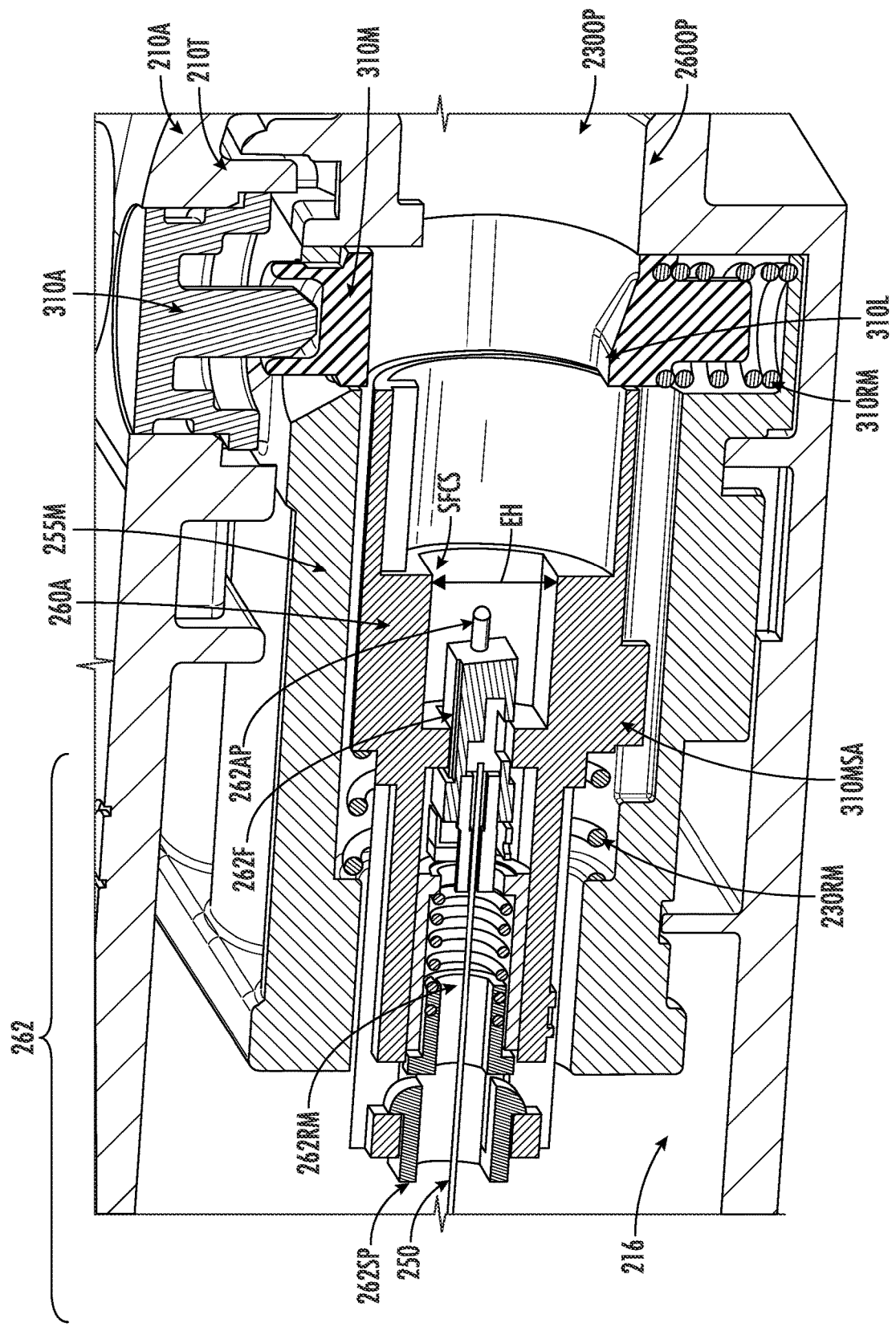

FIG. 4 is a cross-sectional view of the assembled second or multi-fiber modular adapter sub-assembly 310MSA of FIG. 3 with the optical fibers removed for clarity, and FIG. 5 is cross-sectional view of the second or multi-fiber modular adapter sub-assembly 310MSA of FIG. 3 disposed within the shell 210 taken through the multi-fiber connection port passageway 2600P depicting the construction. Likewise, FIGS. 29-31 are cross-sectional assembled views of another second or multi-fiber modular adapter sub-assembly 310MSA depicted in FIG. 28. The construction of the multi-fiber modular adapter sub-assembly 310MSA of FIG. 3 and FIG. 28 differ in how the adapter cooperates with the adapter body of the sub-assembly. Still other constructions are possible for the second or multi-fiber modular adapter sub-assembly 310MSA or shell 210 using the concepts disclosed as well.

FIGS. 3 and 4 show that the multi-fiber modular adapter sub-assembly 310MSA (e.g., the second modular adapter sub-assembly) comprises a multi-fiber adapter body 255M (e.g., the second adapter body) with a passageway therethrough for receiving a portion of the suitable external connector for optical communication and leads to the passageway of adapter 260A. FIGS. 28 and 29 shows another multi-fiber modular adapter sub-assembly 310MSA comprising a multi-fiber adapter body 255M with a passageway therethrough, for receiving a portion of the adapter that is configured as an inner barrel for receiving the external connector.

Figure 25:
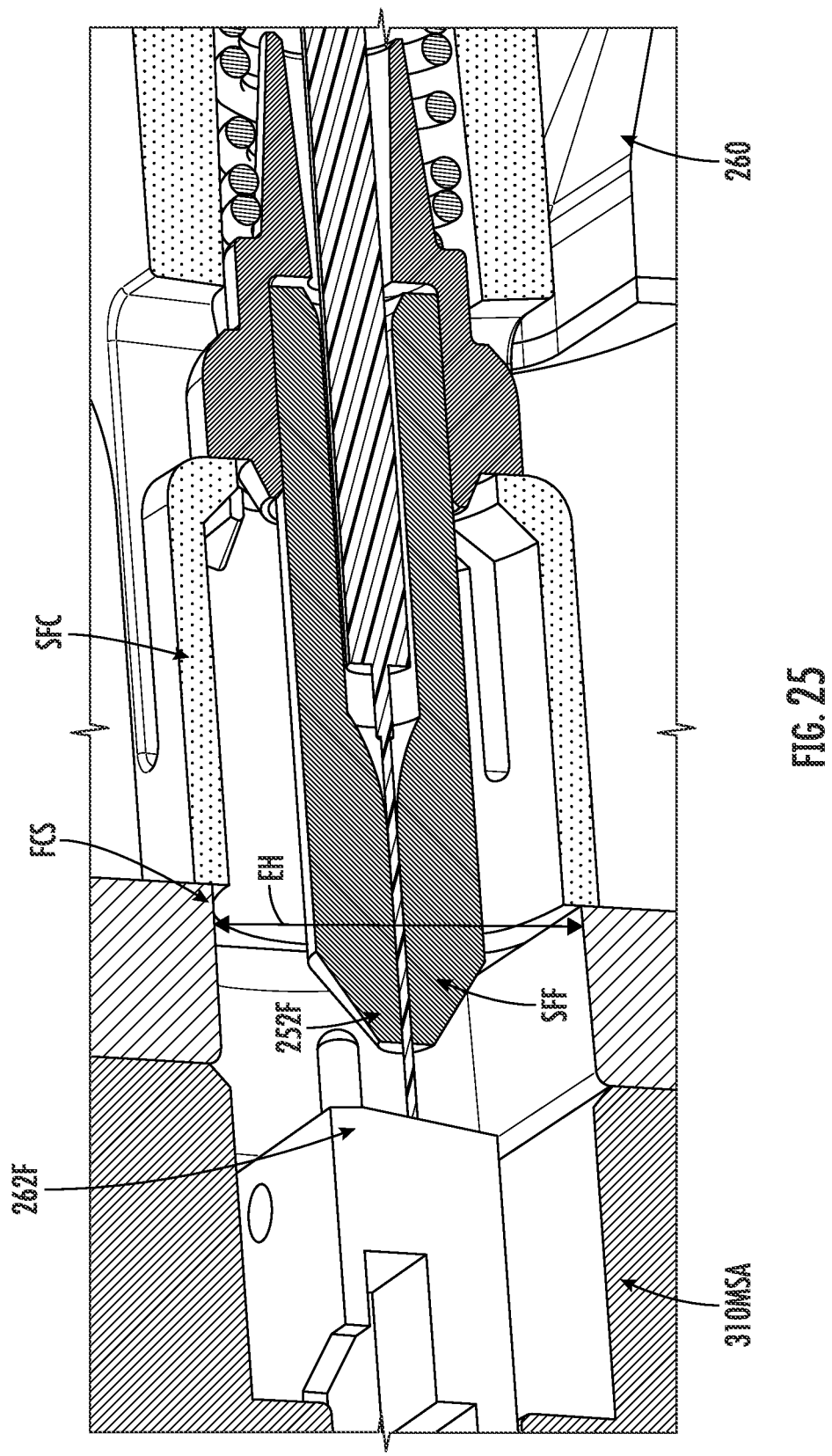
FIG. 25 is a partial close-up sectional view showing the multi-fiber connection port inhibiting the damaging insertion of the external single-fiber connector therein.

One or more components of the second modular adapter sub-assembly 310MSA may comprise a first connector stop (FCS) as desired. By way of example, multi-fiber adapter body 255M may comprises a first connector stop (FCS) for inhibiting the damaging insertion of non-compatible external connector suitable for the first connection port 236 from being mistakenly inserted and damaging the second optical connection port 260 of the terminal. For instance, multi-fiber adapter body 255M may comprises a single-fiber connector stop (SFCS). The single-fiber connector stop (SFCS) is sized for inhibiting the insertion of the single-fiber plug connector (SFC) into the at least one multi-fiber connection port 260 and causing damage if mistakenly attempted (FIG. 25). The multi-fiber adapter body 255M may use any suitable geometry for inhibiting the damaging insertion of the non-compliant external connector suitable for the first connection port 236.

Figure 4A:
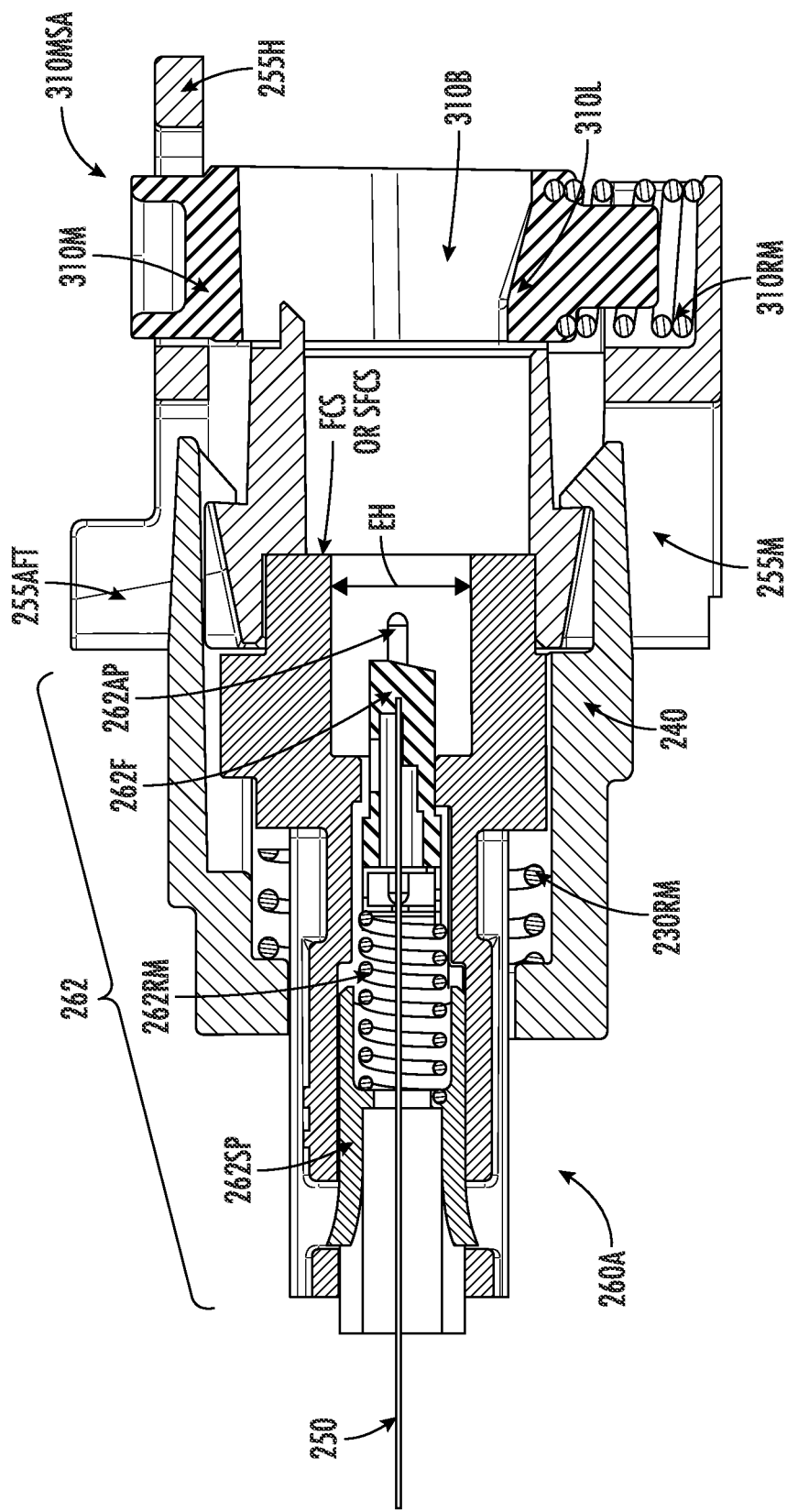
FIG. 4A is a sectional assembled view of a second multi-fiber modular adapter sub-assembly with the internal multi-fiber connector inserted into and attached to the multi-fiber modular adapter sub-assembly for mating with a complimentary external connector.
Figure 5A:
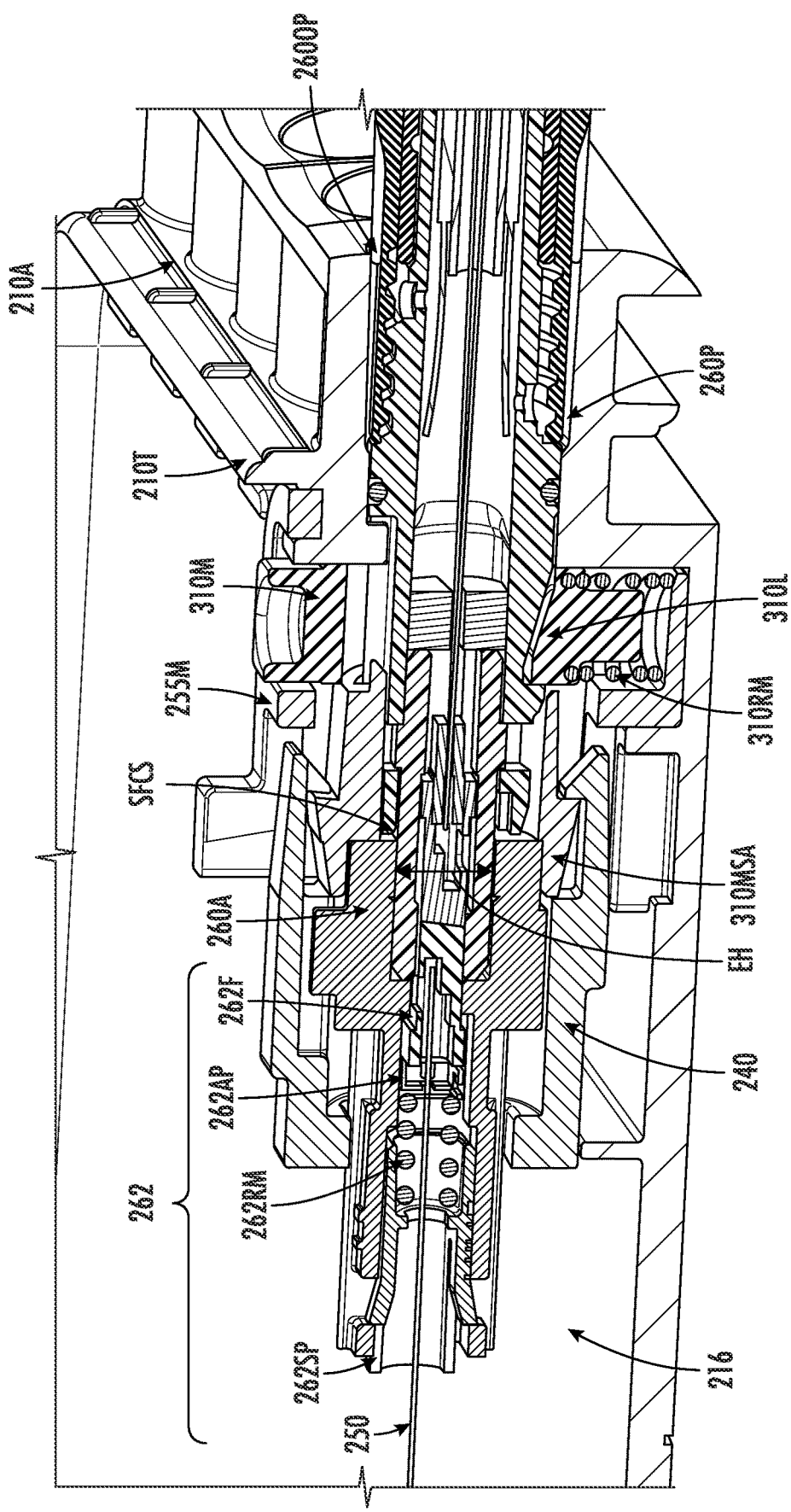
FIG. 5A is a close-up sectional view of the second multi-fiber modular adapter sub-assembly installed into the shell of the terminal.

Alternatively FIGS. 4A and 5A show another variation of the second or multi-fiber modular adapter sub-assembly 310MSA according to the concepts disclosed. This second modular adapter sub-assembly 310MSA uses still another adapter 260A. With this second modular adapter sub-assembly 310MSA, the adapter 260A comprises the first connector stop (FCS) or single-fiber connector stop (SFCS) for inhibiting the damaging insertion of non-compatible external connector suitable for the first connection port 236 from being mistakenly inserted and damaging the second optical connection port 260 of the terminal.

For instance, adapter 260A of FIGS. 4A and 5A comprises a single-fiber connector stop (SFCS). The fiber connection stop (FCS) or single-fiber connector stop (SFCS) is sized for inhibiting the insertion of the single-fiber plug connector (SFC) into the at least one multi-fiber connection port 260 and causing damage if mistakenly attempted. Adapters 260A may use any suitable geometry for inhibiting the damaging insertion of the non-compliant external connector such as geometry tailored for inhibiting the damaging insertion of the external connector suitable for the first connection port 236. In other embodiments, the first connector stop (FCS) may be formed by a combination of components such as the adapter 260A and multi-fiber adapter body 255M if desired.

The one or more components that comprise the first connector stop may use an exclusion height (EH) tailored to inhibit damaging insertion of the first connector into the second connection port. The exclusion height provides a maximum height dimension for a connector for insertion of an external connector to approach the mating interface. For instance, if the exclusion height was 6 millimeters or less, then only connectors having a height of 6 millimeters or less may pass beyond the exclusion height for approaching the ferrule for the connection port of the terminal.

The use of the exclusion height (EH) inhibits the first external connector suitable for the first connection port from having its ferrule contact (e.g., crash) and damage the ferrule associated with the second connection port. Thus, if the technician mistakenly attempts to insert the first external connector intended for the first connection port 236 into the second connection port 260, then the first external connector will not crash the non-compliant external connector in the port, thereby inhibiting damage to the mating face of the ferrule or mating face associated with the second connection port. One or more components of the multi-fiber modular adapter assembly 310MSA may comprise an exclusion height (EH) for inhibiting the damaging insertion of the first connector into the second connection port 260.

In the explanatory embodiments shown, a multi-fiber adapter body 255M or adapter 230A has a passageway that comprises the exclusion height (EH) of 5.5 millimeters or less for inhibiting the damaging insertion of the first connector that is configured as single-fiber connector with a SC-type front portion into the second connection port 260. In other embodiments, the exclusion height (EH) may comprises a range of between 5.5 millimeters and 2.5 millimeters, thereby inhibiting the damaging insertion of a first connector into the second connection port 260, but allowing a proper second connector to make optical communication with the second connection port 260.

Second or multi-fiber adapter sub-assembly 310MSA may also comprise securing member 310M, securing feature resilient member 310RM, an adapter 260A, a retainer 240, a resilient member 230RM in addition to multi-fiber adapter body 255M. A second or multi-fiber ferrule 262F is also associated with the second or multi-fiber connection port 260. Ferrule 262F may be a portion of a standard fiber optic connector package that plugs into adapter 260A from the rear or the ferrule 262 may be held in the adapter 260A by other suitable structure without using a standard fiber optic connector package.

Figure 26:
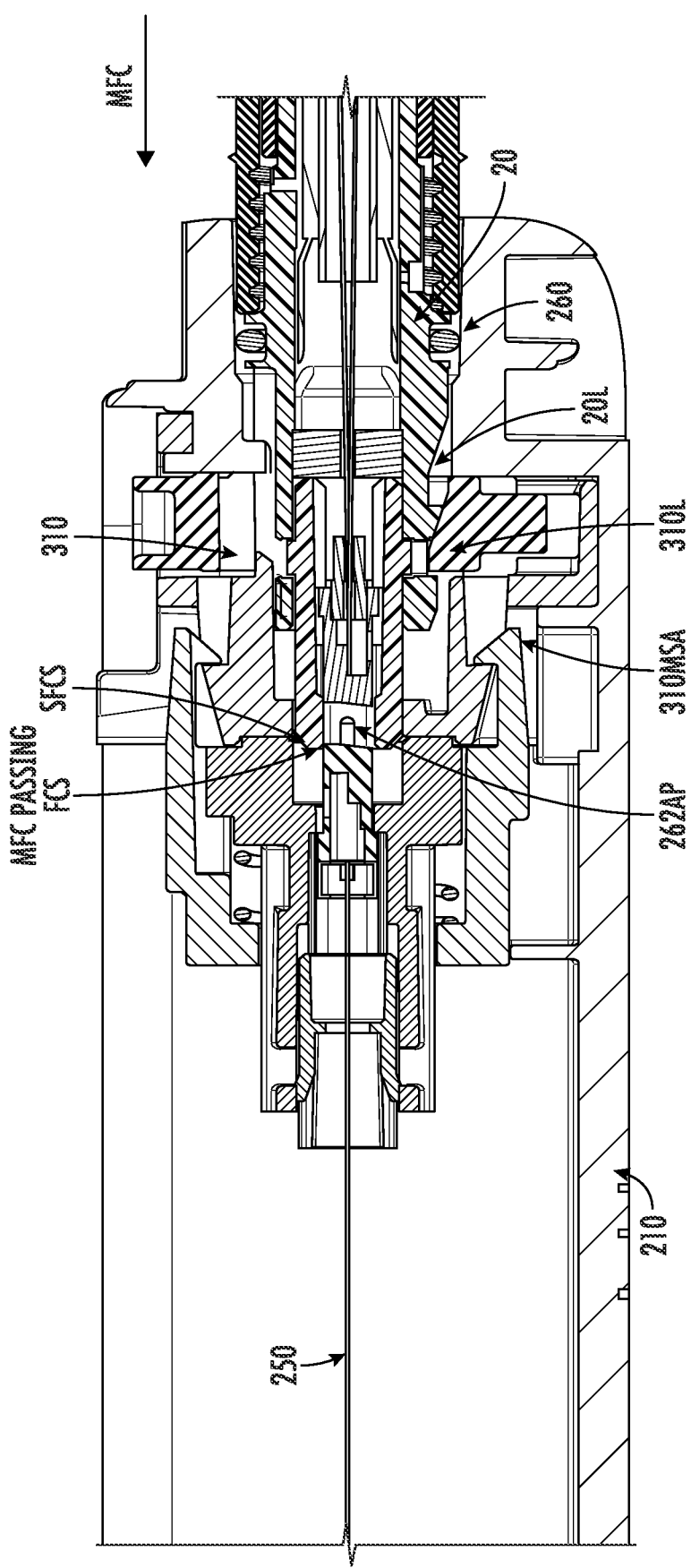
FIG. 26 is a partial sectional view showing the multi-fiber connection port receiving the external multi-fiber connector into the multi-fiber connection port.

In this embodiment, second ferrule 262F is an MT or MTP ferrule using alignment pins 262AP for mating with a complementary ferrule of the external multi-fiber connector (MCF) such as depicted in FIG. 26. The second ferrule 262F may be received and aligned using adapter 260A suitable for the ferrule. The second ferrule 262F may be a portion of a second rear connector 262 such as an MT connector like an MTP® connector, but other connectors are possible. In this embodiment, second rear connector 262 further comprises a resilient member 262RM and a spring push 262SP. As shown in FIG. 4, this ferrule 262F is held in place using spring push 262SP and biased to a forward position by resilient member 262RM.

To assemble the second rear connector 262 to the multi-fiber adapter sub-assembly 310MSA the optical fibers 250 are attached and finished within the ferrule 262F, and then the alignment pins 262AP may be attached to the ferrule. Next the ferrule 262F with the alignment pins 262AP may be inserted into the adapter 260A and the resilient member 262RM and spring push 262SP are threaded onto the optical fibers an inserted into a rear end of the adapter 260A, and the spring push 262SP is attached to the adapter 260 to bias the ferrule 262F to a forward position within the adapter 260A. Then the resilient member 230RM and retainer 240 are positioned about the adapter 260A so that the retainer 240 may be attached to the second or multi-fiber adapter body 255M such as shown in FIG. 4. Securing member 310M and securing feature resilient member 310RM may be positioned in the second adapter body 255M as shown.

Figure 16:
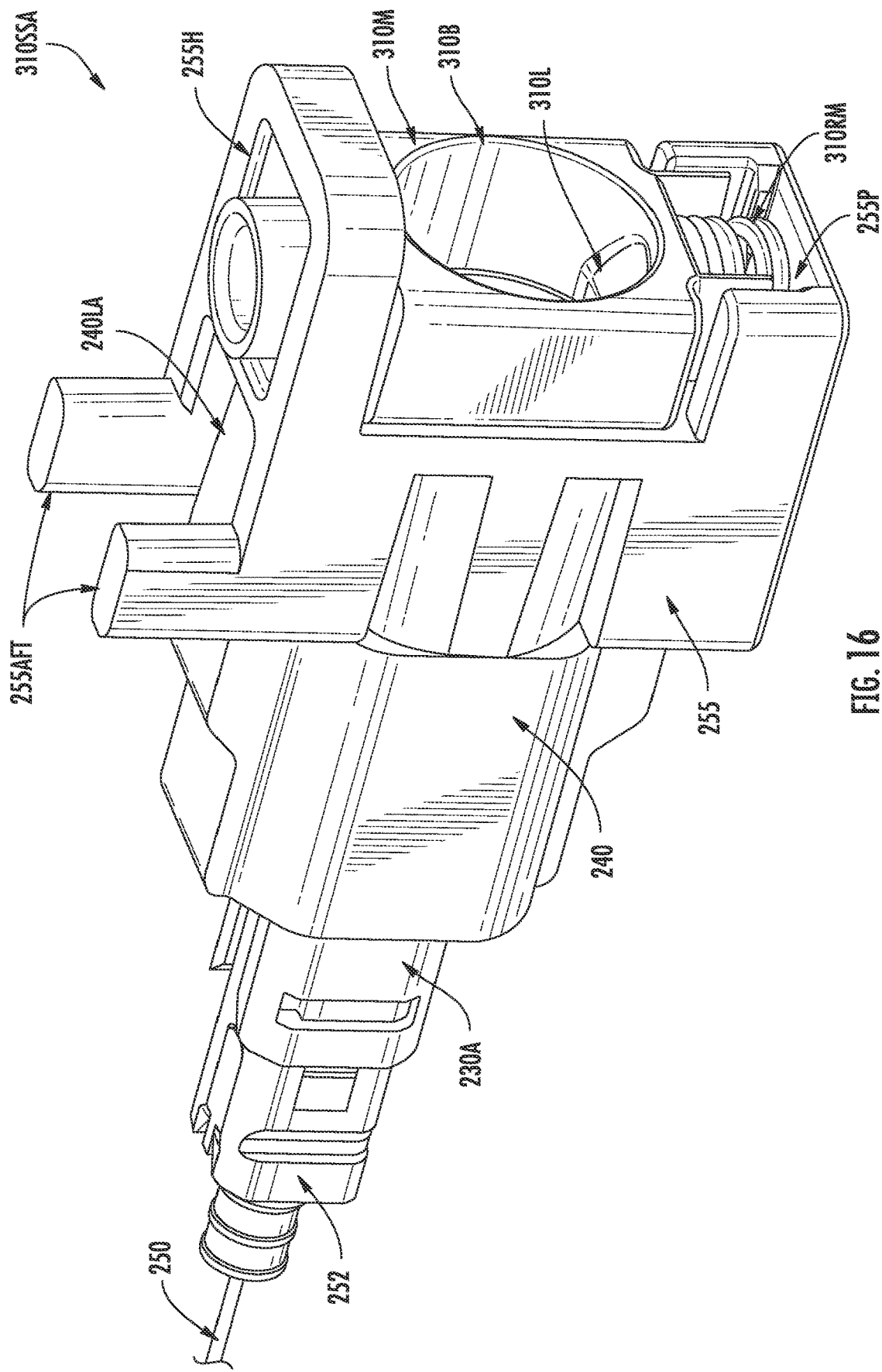
FIG. 16 is an assembled perspective view of the single-fiber modular adapter sub-assembly with the internal single-fiber connector inserted into and attached to the single-fiber modular adapter sub-assembly for mating with a complimentary external connector.

The securing features 310 disclosed herein may take many different constructions or configurations as desired such as being formed as a single component or a plurality of components. Securing features 310 may be biased by a resilient member 230 RM. Furthermore, the securing features 310 or portions of securing features 310 may be constructed as a portion of the multi-fiber modular adapter sub-assemblies 310MSA as shown in FIG. 4 or the single-fiber modular adapter sub-assemblies 310SSA as shown in FIG. 16 for easy assembly of the terminal 200.

Moreover, the modular sub-assemblies 310SSA, 310MSA advantageously allow the mating components for each connection port 236, 260 to move or "float" independently of other mating components relative to the shell 210 for the other connection ports for preserving optical performance. "Float" means that the respective adapters 260A, 230A can have slight movement in the X-Y plane for alignment, and may be inhibited from over-traveling in the Z-direction along the axis of connector insertion so that suitable alignment may be made between mating connectors, which may include a biasing spring for allowing some displacement of the adapter 230A with a suitable restoring force provided by the spring.

As best shown in FIG. 5, securing feature 310 is biased to a retain position relative to the external connector. Specifically, the securing feature 310 is biased in an upward direction using a securing feature resilient member 310RM. More specifically, securing feature resilient member 310RM is disposed beneath securing feature 310 for biasing to a normally retain position for the securing feature 310 where the locking feature 310L is disposed in the multi-fiber connection port passageway 260P.

When assembled, a portion of actuator 310A is disposed within a portion of the securing feature passageway 245 (FIG. 22) and cooperates with the securing member 310M of the respective securing feature. Consequently, a portion of securing feature 310 (i.e., the actuator 310A) is capable of translating within a portion of the securing feature passageway 245. Specifically, the actuator 310A translates in a vertical direction that is in-line with the translation of the securing member 310M in the vertical direction; however, the actuator 310A could be configured to rotate or slide for translating the securing member 310M if desired. In this embodiment, the securing feature 310 is formed from a separate and distinct actuator 310A and securing member 310M as shown, but the actuator 310A and securing member 310M may be formed as a single component.

FIG. 5 depicts the terminal 200 comprising at least one multi-fiber connection port 260 extending from an outer surface 234 of the terminal 200 into a cavity 216 of the terminal 200 and defining a portion of the multi-fiber connection port passageway 260P. Terminal 200 may also comprise at least one securing feature 310 associated with the multi-fiber connection port passageway 260P for securing a suitable external connector. Terminal 200 also comprises at least one securing feature passageway 245 associated with the respective connection port 236,260 for receiving a portion of the securing feature 310. As depicted, the securing feature passageways 245 extends from the outer surface 234 of terminal 200 to cooperate with the respective multi-fiber connection port passageways 260P. For the sake of clarity, the actuator 310A is not shown in the sectional view of FIG. 5. The single-fiber connection ports 236 may also have a similar construction.

Terminal 200 comprises a shell 210 having a portion of the at least one multi-fiber connection port 260 that is associated with multi-fiber modular adapter sub-assembly 310MSA. FIG. 5 also depicts a detailed sectional view of the interlocking features between the first portion 210A and the second portion 210B of the shell 210. Specifically, portions of the terminal may have a tongue 210T and groove 210G construction for alignment or sealing of the device.

Any of the terminals 200 disclosed herein may optionally be weatherproof by appropriately sealing seams of the shell 210 using any suitable means such as gaskets, O-rings, adhesive, sealant, welding, overmolding or the like. To this end, terminal 200 or devices may also comprise a sealing element 290 disposed between the first portion 210A and the second portion 210B of the shell 210. The sealing element 290 may cooperate with shell 210 geometry such as respective grooves 210G or tongues 210T in the shell 210. Grooves or tongue may extend about the perimeter of the shell 210. By way of explanation, grooves 210G may receive one or more appropriately sized O-rings or gaskets 290 (FIG. 2) for weatherproofing terminal 200, but an adhesive or other material may be used in the groove 210G. By way of example, the O-rings are suitably sized for creating a seal between the portions of the shell 210. By way of example, suitable O-rings may be a compression O-ring for maintaining a weatherproof seal. Other embodiments may use an adhesive or suitable welding of the materials for sealing the device. If welding such as ultra-sonic or induction welding of the shell is used a special sealing element 290 may be used and then processed to weld the portions together as known in the art. If the terminal 200 is intended for indoor applications, then the weatherproofing may not be required.

The second portion 210B of shell 210 may also have other structure of features for receiving or aligning components for assembly. By way of explanation, shell 210 may include alignment protrusions on the lower portion of the front end 212 of second portion 210B of shell 210. Alignment protrusions (not numbered) may cooperate with mounting tab 298 depicted in FIG. 2 if used in the terminal 200 for aligning and attaching the same to the shell 210 of the terminal 200. In other embodiments, the mounting tab 298 could be integrally formed with the shell 210 if desired, but that requires a more complex molding process.

Figure 6:
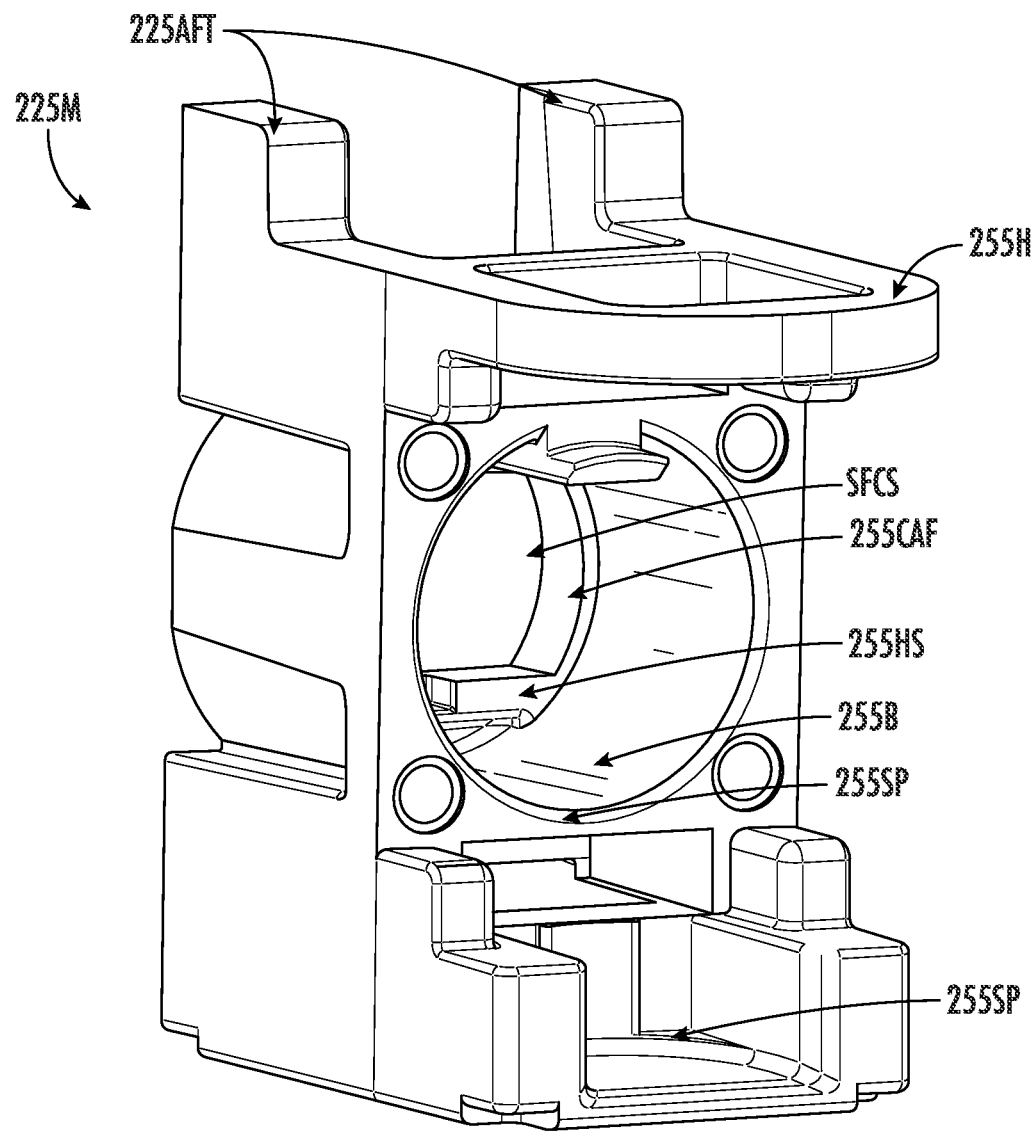
FIG. 6 is a front perspective view of the multi-fiber adapter body from the external connector insertion side.
Figure 7:
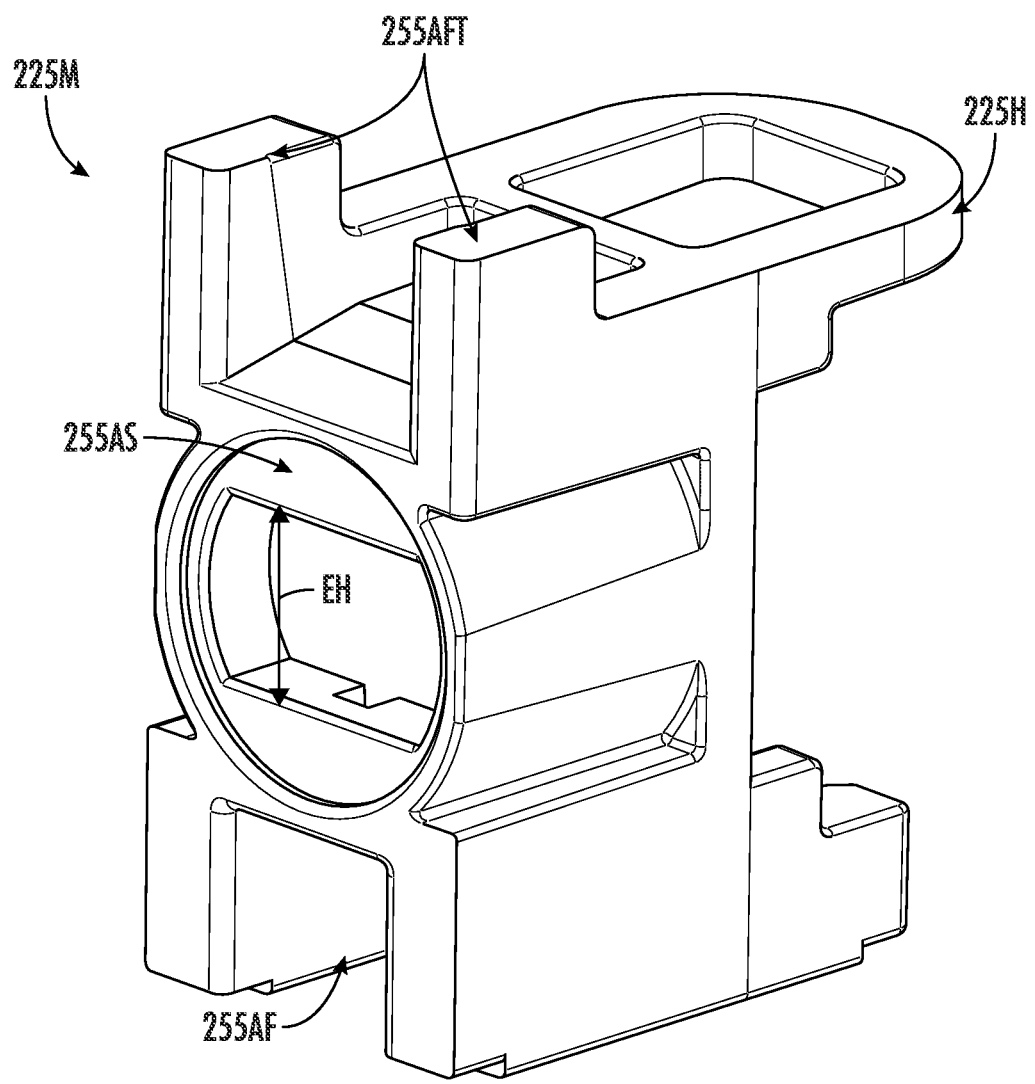
FIG. 7 is a rear perspective view of the multi-fiber adapter body from the internal terminal connector insertion side.

FIGS. 6 and 7 are front and rear perspective views showing the details of the multi-fiber adapter body 255M of FIG. 4 (i.e., second adapter body for inhibiting damaging insertion of first external connector suitable for mating in the first adapter body 255 of the first connection port). FIG. 6 is a perspective view of the multi-fiber adapter body 255M from the connection insertion side, and FIG. 7 is a perspective view of the adapter body 255M from the rear. Adapter body 255M is associated with the multi-fiber modular adapter sub-assembly 310MSA and supports optical connectivity with the suitable external second connector footprint. The front end 255F of the adapter body 255M is the side that receives the external connector as it is inserted into the connection port and the rear side 255R of the adapter body receives the rear connector disposed inside the cavity of the shell 210. The other adapter bodies 255M of the multi-fiber modular adapter sub-assembly 310MSA disclosed are similar in construction.

Adapter body 255M comprises an adapter body bore 255B that comprises a portion of the multi-fiber connection port passageway 2600P when assembled for this configuration. Other configurations of adapter body 255M for multi-fiber modular adapter sub-assembly 310MSA may use the adapter body bore 255B for receiving the adapter 260A as an inner barrel as a portion of the multi-fiber connection port passageway 2600P such as shown in FIG. 28.

As shown in FIG. 7, adapter body 255M comprises alignment features 255AF on the bottom of adapter body 255 that cooperate with the shell 210 to align and seat the same in the shell 210. Adapter body 255M also comprises hoop 255H. Hoop 255H captures the ring 255R at the top of the securing member 310M when assembled, and also seats the adapter body 255M in the second portion 210B of shell 210 during assembly. Adapter body 255M also comprises alignment features 255AFT on the top of adapter body 255M for securing the same in the first portion 210A of the shell 210 when the terminal 200 is assembled. Adapter body 255M may also comprise resilient member pocket 255SP at the bottom of the adapter body 255 for capturing the securing feature resilient member 310RM as depicted in FIG. 4.

Many of the features of adapter body 255M for the second connection port 260 are similar to the features of adapter body 255 for the first connection port 236. The main differences between adapter body 255M and adapter body 255 are in the adapter body bore and other structure related to the respective adapter, 260A for supporting the mating with different external connector mating footprints. Another difference is that the adapter body 255 cooperates with an adapter 230A that is configured for mating a standard fiber optic connector such as a SC connector for a single-fiber optical connection using a precision alignment sleeve for aligning mating ferrules. Whereas adapter body 255M of multi-fiber modular adapter sub-assembly 310MSA cooperates with multi-fiber ferrule 262F that is secured to the adapter body 255M using spring push 262SP and biased to a forward position by resilient member 262RM and uses alignment pins for mating with a complimentary multi-fiber ferrule.

Adapter body 255M may have other differences in addition to the first connector stop (FCS) or exclusion height EH as discussed above for inhibiting the damaging insertion of non-compatible external connector suitable for the first connection port 236. By way of explanation, the adapter body bore 255B of adapter body 255M may comprise a hard stop 255HS and connector alignment feature 255CAF as shown in FIG. 6 that are tailored for mating with the intended second external fiber connector.

FIG. 7 depicts adapter stop 255AS that provides a surface for abutting the second adapter 260A for assembly along with the exclusion height EH for adapter body 255M for inhibiting the damaging insertion of the non-compatible first external connector intended for the first connection port. In this embodiment, the exclusion height EH is selected to inhibit the damaging insertion of a first external connector having a front portion with an SC-like footprint, while allowing mating for a second external connector having a front portion with an MT-like footprint. However, the second adapter body 255M may be configured for inhibiting the damaging insertion of other types or styles of first external connectors as desired for protecting the optical mating interface of the second connection port.

Figure 8:
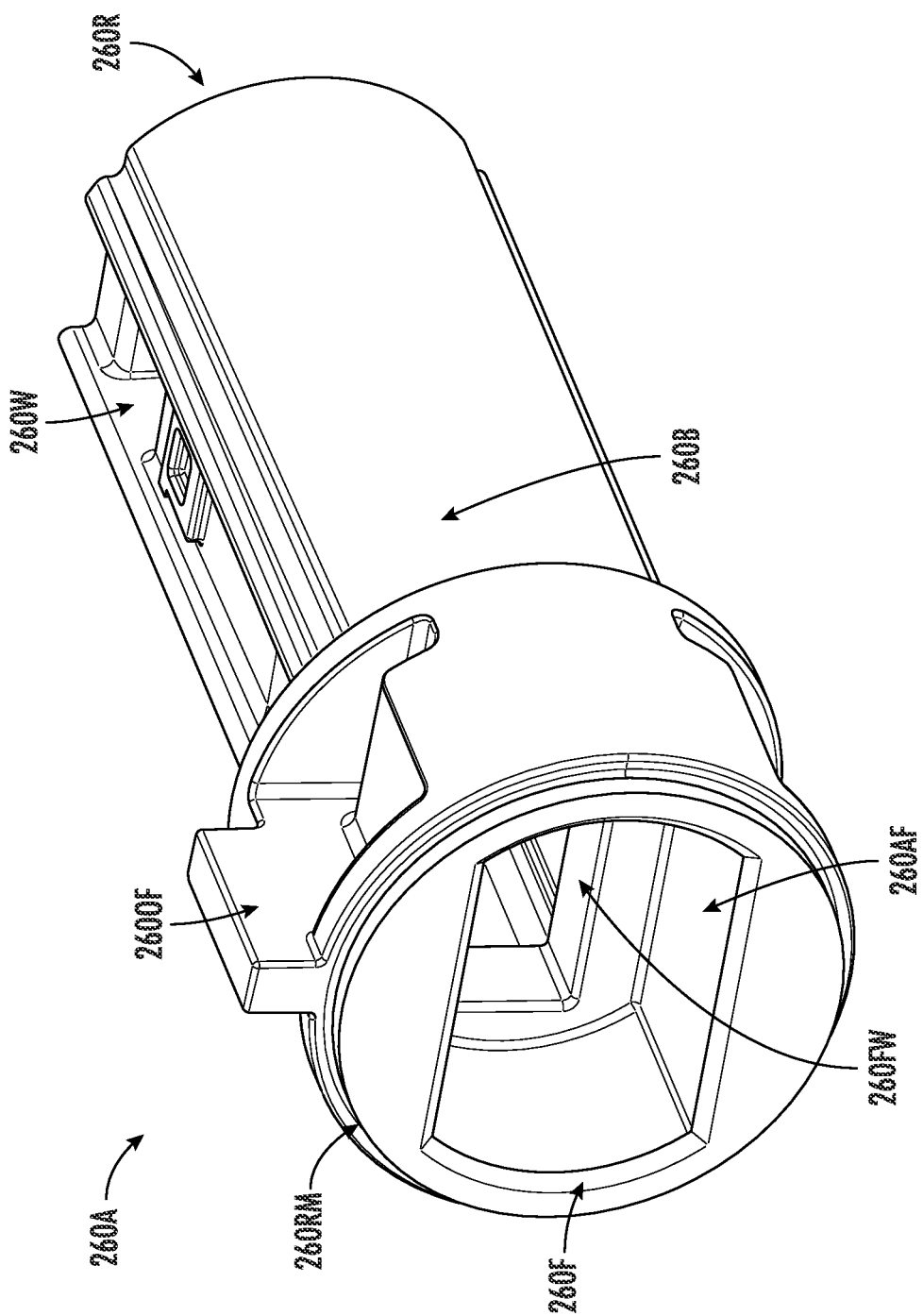
FIG. 8 is front perspective view of the multi-fiber connector adapter of the multi-fiber modular adapter sub-assembly.
Figure 9:
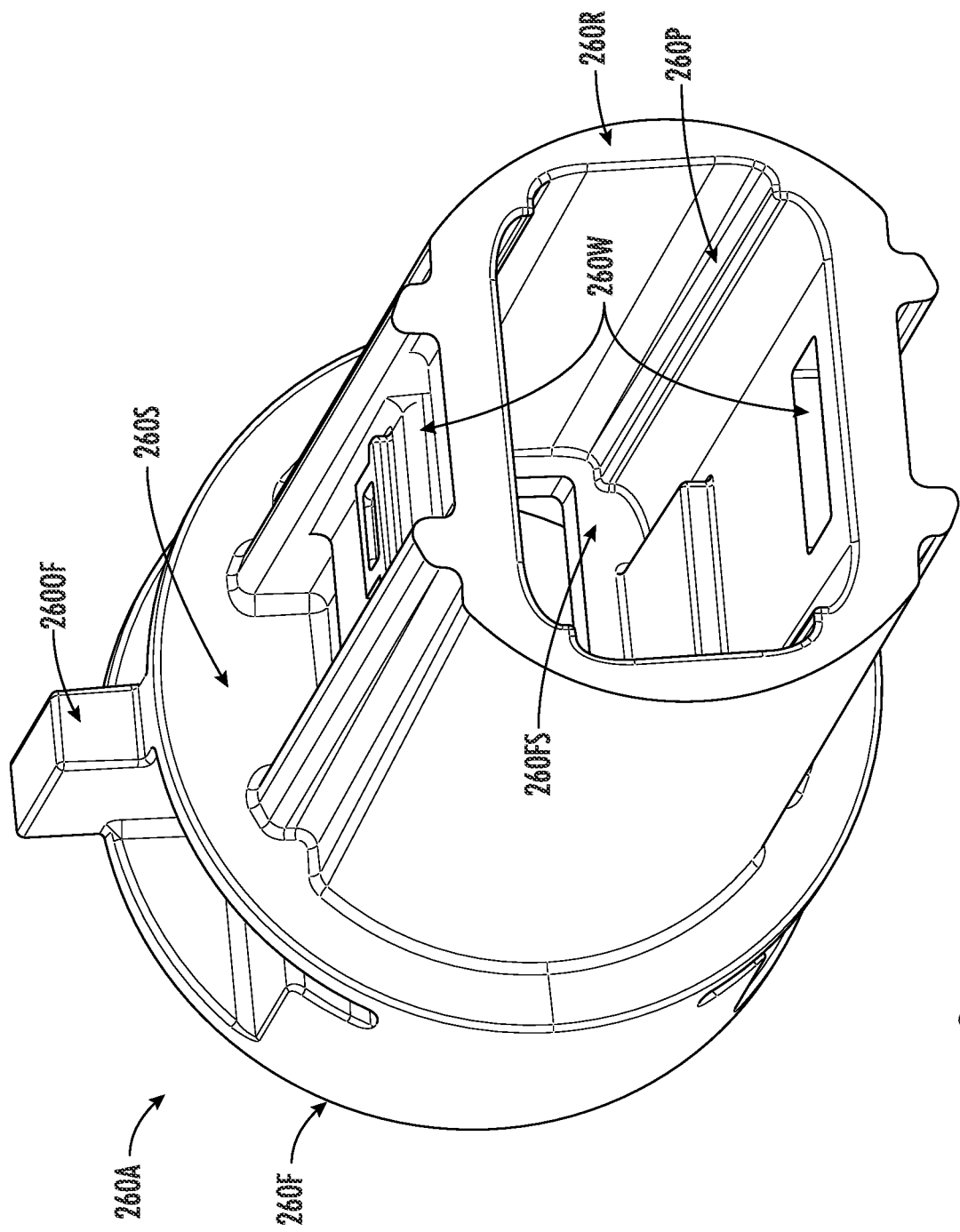
FIG. 9 is rear perspective view of the multi-fiber connector adapter of the multi-fiber modular adapter sub-assembly.

FIG. 8 is front perspective view of the second connector adapter 260A of the second modular adapter sub-assembly 310MSA configured as a multi-fiber modular adapter sub-assembly, and FIG. 9 is rear perspective view of the second connector adapter 260A. As depicted, adapter 260A comprises a passageway 260P from a front end 260F to a rear end 260R. This configuration of adapter 260A seats to the rear of adapter body 255M at surface 255AS (FIG. 7) as shown in FIGS. 4 and 4A.

As shown in FIG. 9, adapter 260A comprises a ferrule stop 260FS within the passageway 260P acting as a forward stop for the ferrule 262F as depicted in FIG. 5. Resilient member 262RM biases the ferrule 262F to the ferrule stop 260FS. Ferrule stop 260FS limits travel of the ferrule 262F to the front, but the ferrule 262F is allowed to move rearward during mating as needed subject to the restoring forward-force of the resilient member 260RM.

Adapter 260A may also include one or more windows 260W (or other feature) for cooperating with retaining features on the spring push 262P for retaining the ferrule 260A and resilient member in the adapter 260A. Ferrule stop 260FS also defines a ferrule window 260FW for coarse alignment of the ferrule 262F within the adapter 260A. In this embodiment, the ferrule window 260FW is a rectangular opening sized for an MT ferrule, but other shapes or sized may be used depending on the type of connector supported by the second connector port 260.

Figure 23:
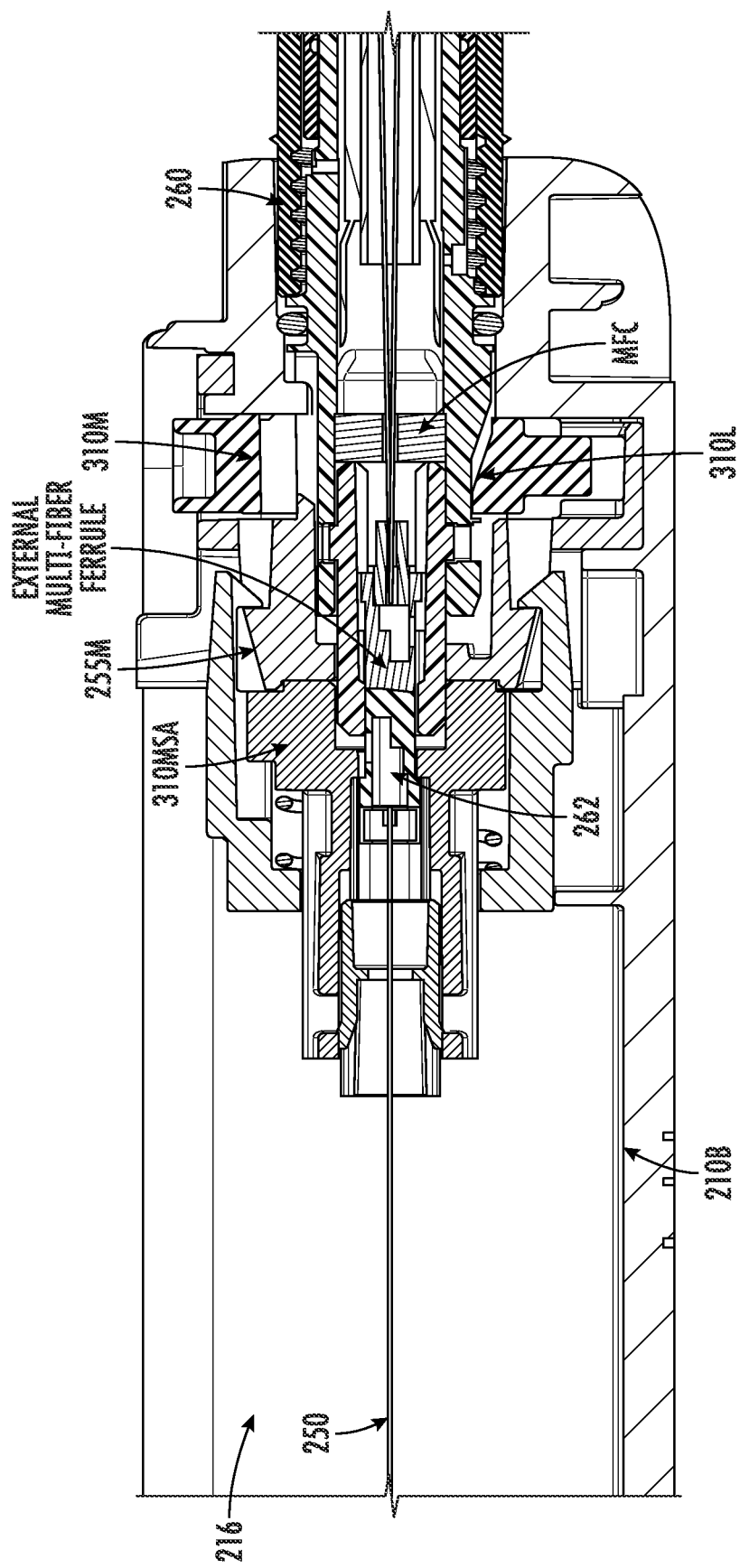
FIG. 23 is a partial sectional view of an external multi-fiber connector being inserted into the multi-fiber connection port for optical communication so that the mating face and optical fibers of the internal multi-fiber ferrule may come into optical communication with the optical fibers of the multi-fiber ferrule of the external multi-fiber connector.

The front portion of passageway 260P may also comprise a connector housing alignment feature 260AF. Connector housing alignment feature 260AF is sized and shaped for cooperating receiving a front portion of the housing of the second external connector intended to be received within second connector port 260 as shown in FIG. 23, which also aids in alignment of multi-fiber ferrules so that alignment pins 262AP may properly align and engage during mating. Adapter 260A may also include a stepped or profiled rim 260RM that cooperates with a seat on the adapter body 255M for properly aligning and seating the adapter 260A in place before being secured in position. Adapter 260 may also comprise an orientation feature 260OF for aligning with the retainer 240 and may only allow assembly in one orientation if desired.

Figure 10:
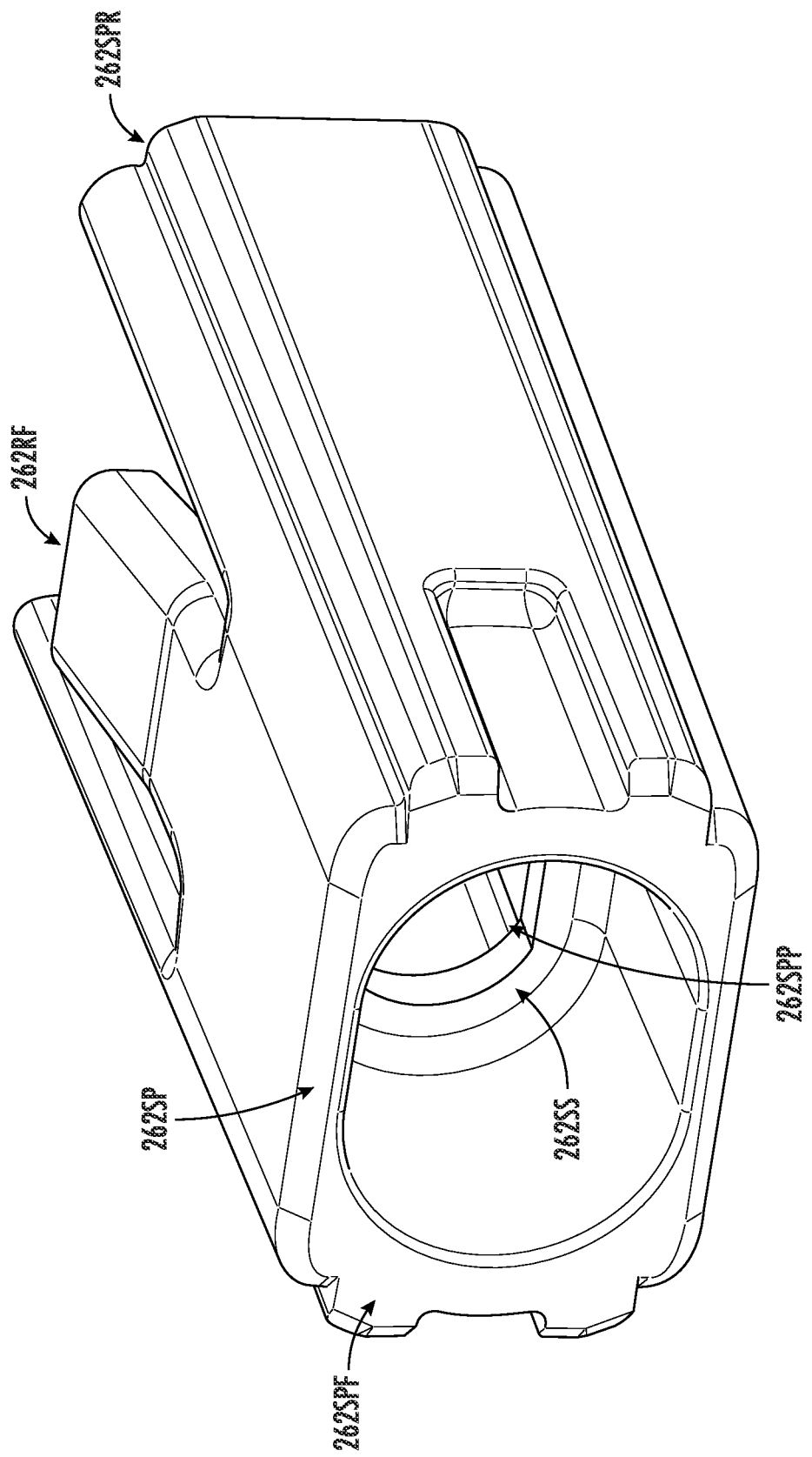
FIG. 10 is front perspective view of the spring push of the multi-fiber modular adapter sub-assembly.

FIG. 10 is front perspective view of the spring push 262P of the second modular adapter sub-assembly 310MSA. Spring push 262P comprises a passageway 262SPP from a front end 260SPF to a rear end 260SPR. A spring seat 262SS is disposed within the passageway 260P and acts a rear stop for trapping the resilient member 262RM for biasing the ferrule 262F with the sub-assembly as depicted in FIG. 5. Spring push 262P also comprises one or more retention features 262RF such as flanges for engaging with the one or more windows 260W of the spring push 262P. During assembly, the ferrule 262F with alignment pins 262F is inserted into the adapter 260A from the rear end followed by the resilient member 262RM, then the spring push 262P may be inserted into the rear end of the passageway 260P of the adapter 260A and pushed forward until the retention features 262RF engage with the windows 260W of the adapter 260A such as a snap-fitting together of the components.

Figure 11:
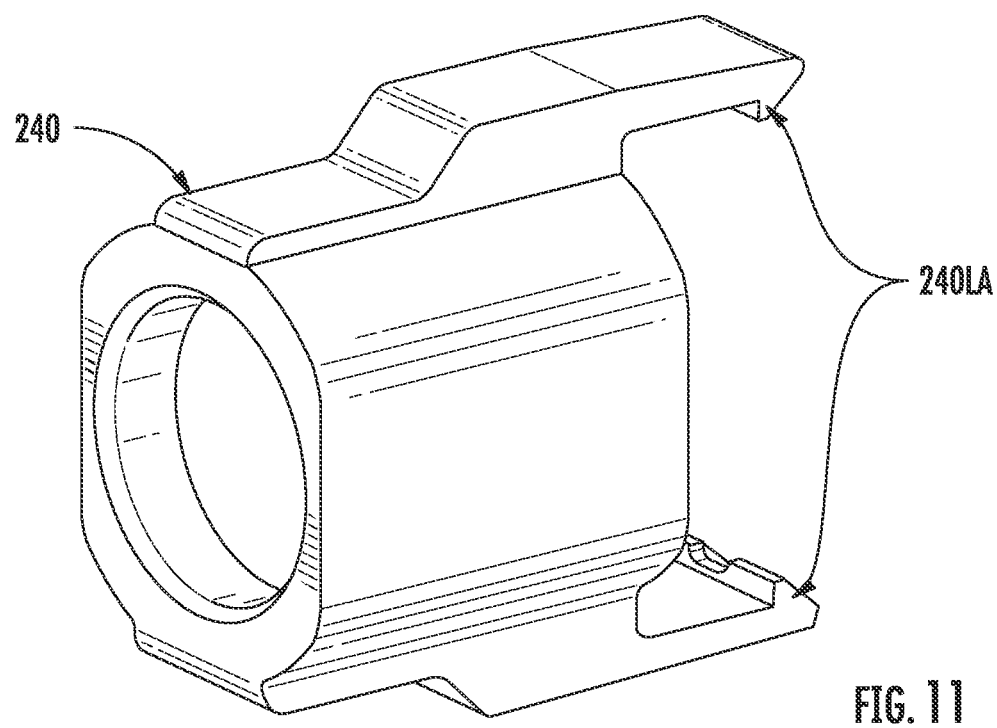
FIGS. 11 and 12 are perspective views of the retainer of the multi-fiber modular adapter sub-assembly.
Figure 12:
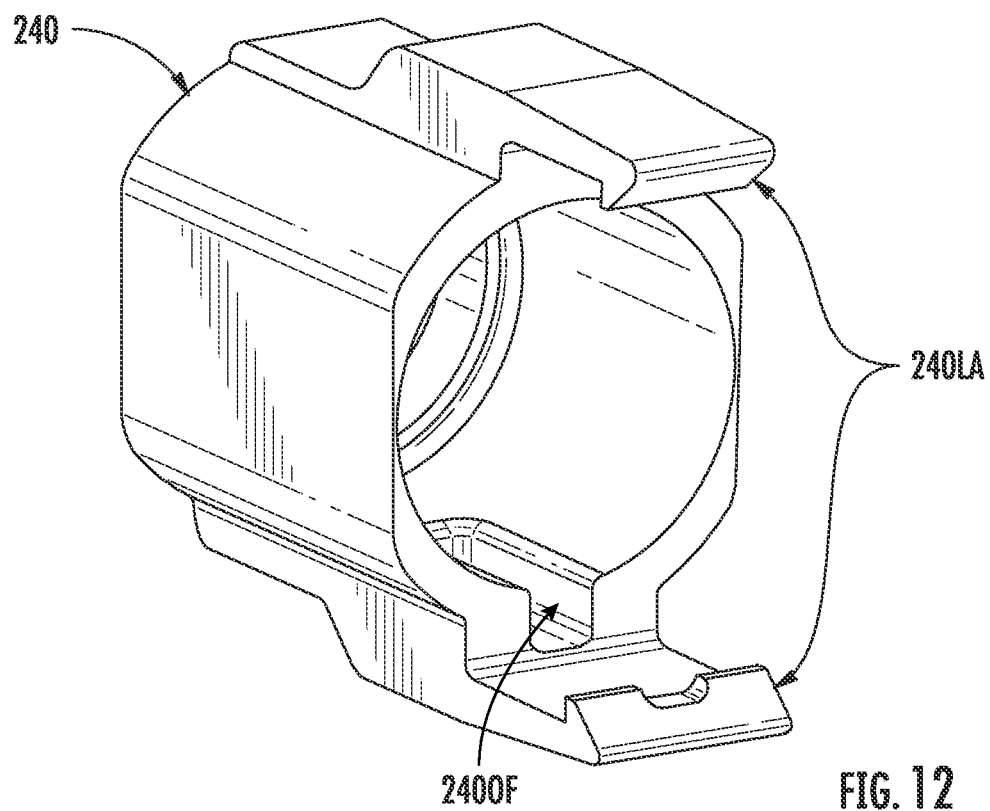

FIGS. 11 and 12 show detailed views of retainer 240 that is used with both the first modular adapter sub-assembly 310SSA configured as multi-fiber modular adapter sub-assembly and the second modular adapter sub-assembly 310MSA configured as multi-fiber modular adapter sub-assembly. Retainer 240 is used for securing the adapter 230A, 260A to the adapter body 255, 255M. Other modular adapter sub-assemblies may have a construction that does not need retainer 240.

If used, retainer 240 comprises one or more latch arms 240LA for cooperating with the respective adapter body 255,255M for securing the adapter 230A,260A and resilient member 230RM,260RM of the respective modular adapter sub-assembly 310SSA,310MSA. Retainer 240 may also include an orientation feature 240OF for cooperating with the respective orientation feature on each adapter 230A, 260A for the correct positioning of the adapter with respect to respective first and second alignment bodies 255,255M.

Figure 15:
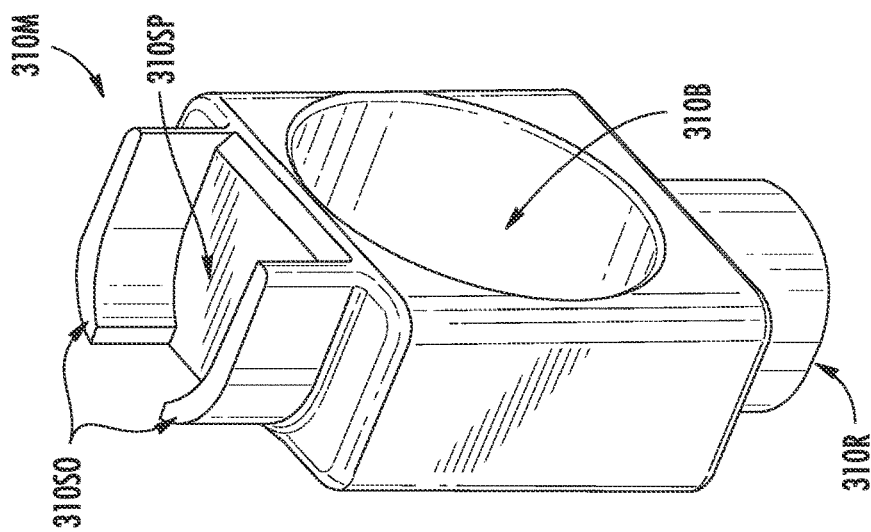
FIGS. 13-15 are various perspective views showing the details of the securing member of the securing feature used with the multi-fiber modular adapter sub-assembly and the single-fiber modular adapter sub-assemblies of the terminal.
Figure 14:
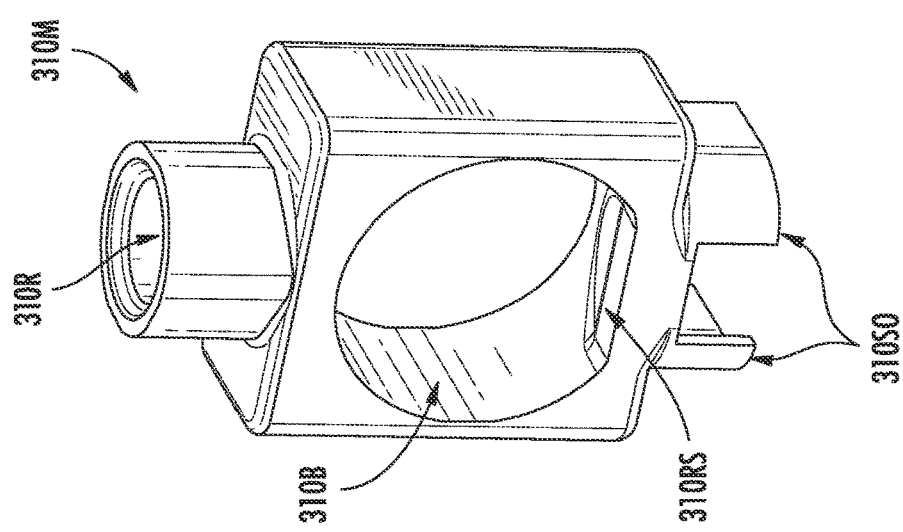
Figure 13:
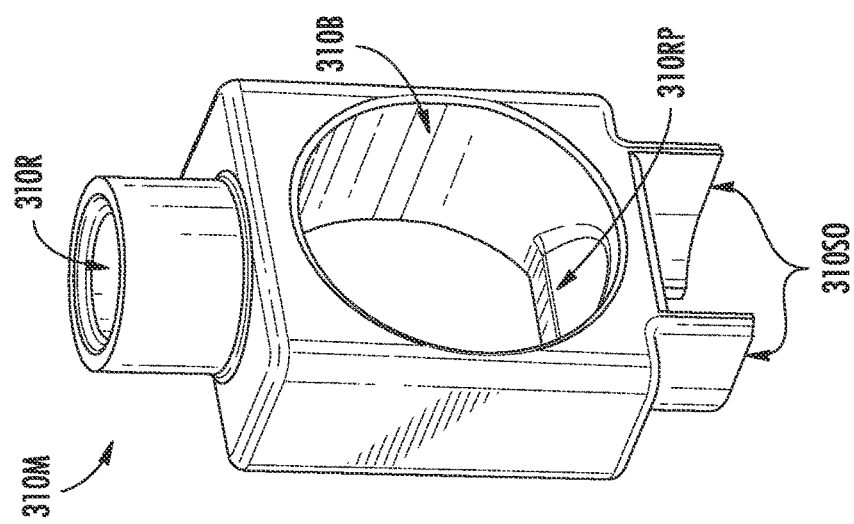

FIGS. 13-15 depict perspective view of securing member 310M that forms a portion of securing feature 310. In the explanatory embodiment, securing member 310M is used with the multi-fiber modular adapter sub-assembly 310MSA and the single-fiber modular adapter sub-assembly 310SSA, but other variations of securing members are possible using concepts disclosed.

Securing member 310M comprises a locking feature 310L as shown in FIGS. 13 and 14. Locking feature 310L is configured for engaging with a suitable locking portion 20L on the housing 20 of a proper external connector when fully inserted. In this embodiment, securing feature 310 comprise a bore 310B that is respectively aligned with the respective connector port passageway 233 as shown in FIG. 4 when assembled. Illustratively, the bore 310B is sized for receiving a portion of an external connector such as multi-fiber connector (MFC) therethrough as shown in FIG. 27 or the external single-fiber connector. As shown, the bore 310B has a closed perimeter.

In this embodiment, the locking feature 310L is disposed within bore 310B of securing member 310M. As shown, locking feature 310L is configured as ramp 310RP that runs to a short flat portion, then to a ledge for creating the retention surface 310RS for engaging and retaining the connector 10 once it is fully-inserted into the connector port passageway 233 of the connection port 236. Other geometry is possible with the securing feature if desired. Consequently, the securing feature 310 is capable of moving to an open position (OP) when inserting a suitable connector 10 into the connector port passageway 233 since the connector housing 20 engages the ramp 310RP pushing the securing feature downward during insertion.

Locking feature 310L cooperates with a portion of the external connector when it is fully-inserted into the respective connection port 236,260 for securing the proper external connector inserted into the connection port. As best shown in FIG. 27, the connector housing 20 of the external connector such as multi-fiber connector MFC may have a cooperating geometry that engages the locking feature 310L of securing feature 310. In this embodiment, locking feature 310L comprises a ramp 310RP. The ramp is integrally formed at a portion of the bore 310B with the ramp angling up when looking into the connection port 236. The ramp allows the connector to push and translate the securing feature 310 downward against the securing feature resilient member 310RM as the connector is inserted in the connection port 236 as shown. Ramp may have any suitable geometry. Other suitable geometry may also be used as the locking feature such as a pin or the like if desired. Once the locking feature 310L of the securing feature 310 is aligned with the cooperating geometry of the locking feature 20L of connector, then a portion of the securing feature 310 translates so that the locking feature 310L engages the locking feature of connector. For instance, the cooperating feature on the external connector may be a ramp-like cut-out integrally formed in the connector housing of the external connector that generally matches the profile of the locking feature 310L on securing member 310M.

Locking feature 310L may also comprise a retention surface 310RS. In this embodiment, the back-side of the ramp of locking feature 310L forms a ledge that cooperates with complimentary geometry on the connector housing of connector. However, retention surface 310RS may have different surfaces or edges that cooperate for securing connector for creating the desired mechanical retention. For instance, the retention surface 310RS may be canted or have a vertical wall for tailoring the pull-out force for the connection port 236. However, other geometries are possible for the retention surface 310RS.

Securing member 310M may also comprises standoffs 310SO as best shown in FIG. 15. Standoffs 310SO cooperate with the resilient member pocket 255SP of the adapter body 255 for keeping the bore 310B in the proper rotational orientation within the respective to the adapter body 255. Specifically, standoffs 310SO have curved shapes that only allow the securing member 310M to fully-seat into the adapter body 255 when oriented in the proper orientation. Standoffs 310SO also provide a pocket below the bore 310B for an optional resilient member for biasing the securing member 310M to the retain position.

In this embodiment, the securing feature 310 comprises a bore 310B that is aligned with the respective connection port passageway 236P,260P when assembled as best shown in FIG. 5. Bore 310B is sized for receiving a suitable connector therethrough for securing the same for optical connectivity. Bores or openings through the securing feature 310 may have any suitable shape or geometry for cooperating with its respective connector. As used herein, the bore may have any suitable shape desired including features on the surface of the bore for engaging with a connector. Bore 310B is disposed on the securing member 310M in this embodiment, and the locking feature 310L is integrally formed within the bore, but other constructions may be possible.

In some embodiments, a portion of the securing feature 310 is capable of moving to an open position when inserting a suitable connector into the respective connection port passageway 236P,260P. When the suitable connector is fully-inserted into the respective connector port passageway 236P,260P, the securing feature 310 such as the securing member 310M is capable of moving to the retain position automatically. Consequently, the proper external connector is secured within the connection port 236,260 by securing feature 310 without turning a coupling nut or a bayonet like the prior art terminals. Stated another way, the securing feature 310 translates from the retain position to an open position as a suitable connector is inserted into the connection port 236,260. Although, the securing feature passageway 245 is arranged transversely to a longitudinal axis LA of the terminal 200 other arrangements are possible. Other securing features may operate in a similar manner, but use an opening instead of a bore that receives the connector therethrough.

Figure 17:
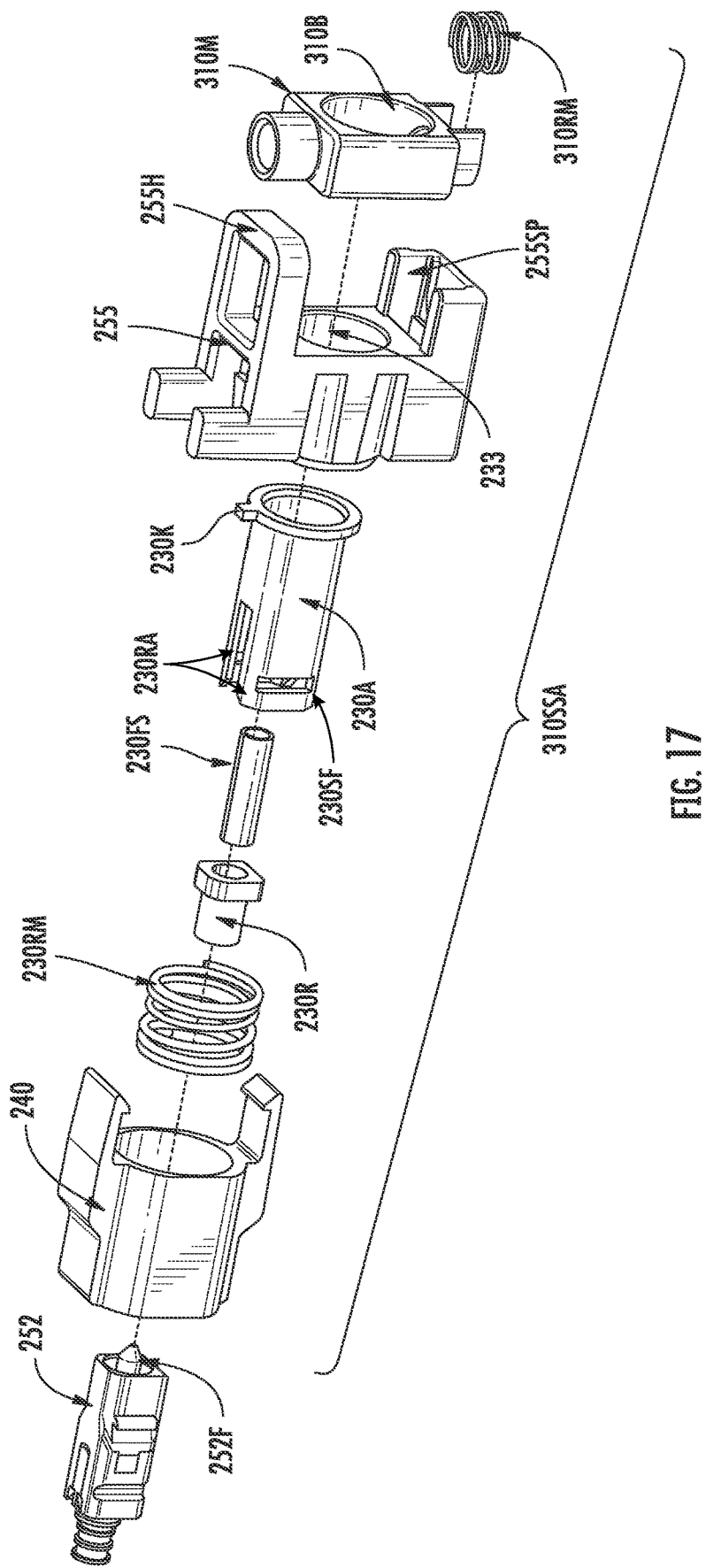
FIG. 17 is an exploded view of the single-fiber modular adapter sub-assembly of FIG. 16 shown with the internal single-fiber connector.

FIGS. 16 and 17 respectively show front assembled and exploded perspective views of single-fiber modular adapter sub-assemblies 310SSA with a first rear connector 252 attached to the adapter 230A in the assembled view. FIG. 17 depicts an exploded view of the modular adapter sub-assemblies 310SSA and shows that the rear connector 252 is not a portion of modular adapter sub-assembly 310SSA. Single-fiber modular adapter sub-assemblies 310SSA comprises adapter 230A aligned with the respective single-fiber connection port 236 when assembled. Adapter 230A may be biased by a resilient member 230RM. The adapter 230A may be secured to the adapter body 255 using retainer 240 like adapter body 255M. Adapter 230A has a similar construction as adapter 260, but is configured for the first connector (SC based connector), whereas adapter 260A is configured for the second connector (MT based connector).

The single-fiber modular adapter subassembly 310SSA may use one or more of the same or similar components as the multi-fiber modular adapter subassembly 310MSA for ease of manufacturing and simplicity. By way of explanation, the single-fiber modular adapter subassembly 310SSA and the multi-fiber modular adapter subassembly 310MSA may both use the same design for securing member 310M and resilient member 310RM. Additionally, the single-fiber adapter body 255 for the single-fiber modular adapter subassembly 310SSA may be similar to multi-fiber adapter body 255M for the multi-fiber modular adapter subassembly 310MSA with some important differences. More specifically, the outer features or profile of the single-fiber adapter body 255 is similar to the multi-fiber adapter body 255M so that cooperation with the shell 210 is uniform, and the internal features or profiles are different between the adapter bodies. Likewise, the assembly of the first and second modular adapter sub-assemblies are similar. Of course, other variations for the modular adapter sub-assemblies are possible such as variations in how the modular adapter sub-assemblies are aligned and held within the shell of the terminal.

As best shown in FIG. 16, single-fiber modular adapter sub-assembly 310SSA comprises a portion of securing feature 310 and a securing feature resilient member 310RM. Specifically, modular adapter sub-assembly 310SA comprises securing member 310M. Securing member 310M is inserted into a front end of an adapter body 255 along with securing feature resilient member 310RM. Specifically, the rim 310R of securing member 310M is inserted into a hoop 255H of adapter body 255 and standoffs 310SO are disposed in a portion of the resilient member pocket 255SP at the bottom of the adapter body 255. Securing feature resilient member 310RM is disposed in the resilient member pocket 255SP for biasing the securing member 310M to a retain position as shown in FIG. 16. This construction advantageously keeps the assembly intact using the securing feature resilient member 310RM. Standoffs 310SO of adapter body 255 may also act as stops to limit the translation of the securing member 310.

In this embodiment, single-fiber modular adapter sub-assembly 310SSA may comprises an adapter body 255, securing member 310M, securing feature resilient member 310RM, a ferrule sleeve 230FS, a ferrule sleeve retainer 230R, resilient member 230RM, a retainer along with the adapter 230A. Adapter body 255 has a portion of the connection port passageway 236P disposed therein.

As best depicted in FIG. 17, the is resilient member 230RM is disposed over a barrel of adapter 230A and seated on the flange of adapter 230A as depicted, then retainer 240 can be attached to adapter body 255 using latch arms 240LA to secure the same. Ferrule sleeve retainer 230R and ferrule sleeve 230FS are aligned for assembly into the adapter 230A for assembly as shown and seated using the ferrule sleeve retainer 230R. Of course, other variations of the modular adapter sub-assembly 310SA are possible.

Like the second modular adapter sub-assembly 310MSA, the first modular adapter sub-assembly 310SSA also comprises at least one first adapter 230A aligned with the respective the first or single-fiber connection port 236 for alignment and optical connection with the suitable external connector. Adapter 230A and other components are a portion of the modular sub-assembly 310SA as depicted in FIGS. 16 and 17. Adapter 230A is suitable for securing a first rear connector 252 thereto for aligning the first rear connector 252 with the connection port 236. One or more optical fibers 250 may be routed from the second or multi-fiber connection port 260 toward the first or single-fiber connection port 236 for optical communication within the terminal 200 as discussed herein. For instance, the first rear connector 252 may terminate the optical fiber 250 for optical connection at connection port 236 and route the optical fiber 250 for optical communication with the second or multi-fiber connection port 260.

A plurality of first rear connectors 252 are aligned with the respective first or single-fiber connector port passageways 236P within the cavity 216 of the terminal 200. The first rear connectors 252 are associated with one or more of the plurality of optical fibers 250. Each of the respective first rear connectors 252 aligns and attaches to a structure such as the adapter 230A or other structure related to the first or single-fiber connection port passageway 236P in a suitable matter. The plurality of rear connectors 252 may comprise a suitable rear connector ferrule 252F as desired and rear connectors 252 may take any suitable form from a simple ferrule to a standard connector type such as an SC or LC connector inserted into adapter 230A such as depicted in FIG. 16. Rear connectors 252 may comprise a resilient member for biasing the rear connector ferrule 252F or not. Additionally, first rear connectors 252 may further comprise a keying feature.

The rear connectors 252 shown in FIGS. 16 and 17 have a SC footprint for mating with the first external connector that has a front portion with an SC-like footprint, but other connectors are possible. If SC connectors are used as the first rear connector 252 they have a keying feature that cooperates with the keying feature of adapter 230A for proper orientation.

Adapters 230A are secured to the first or single-fiber adapter body 255 using retainer 240. Adapters 230A may be biased using a resilient member 230RM as shown in FIG. 17. First rear connectors 252 may take any suitable form and be aligned for mating with the connector secured with the connection ports 236 in any suitable manner. Adapters 230A may comprise latch arms 230RA for securing respective rear connectors therein if desired.

First rear connector 252 may be different than the second rear connector 262. By way of example, the first rear connector 252 may be a SC connector, and the second rear connector 262 may be an MT connector, but other arrangements are possible for rear connections such as using ferrules secured within the sub-assembly. for the first and second rear connectors disposed within the cavity 216 of the terminal 200. Other variations are possible such as all of the optical connection ports of the terminal 200 having the same multi-fiber rear connector such as a MT ferrule secured within the adapter using a spring push as depicted.

Figure 18:
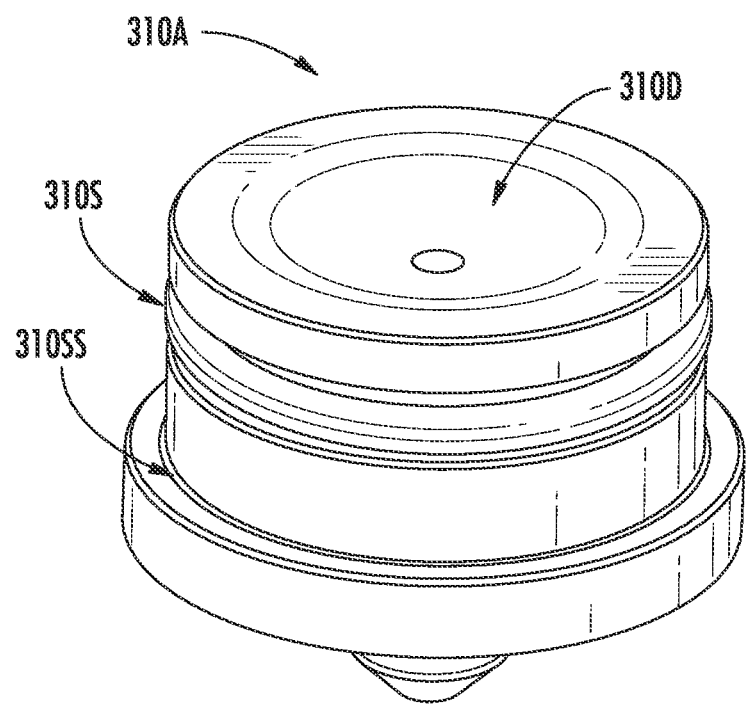
FIGS. 18 and 19 depict perspective views showing the actuator of the securing feature of the terminal of FIG. 1 that cooperates with the securing member of FIGS. 13-15.
Figure 19:
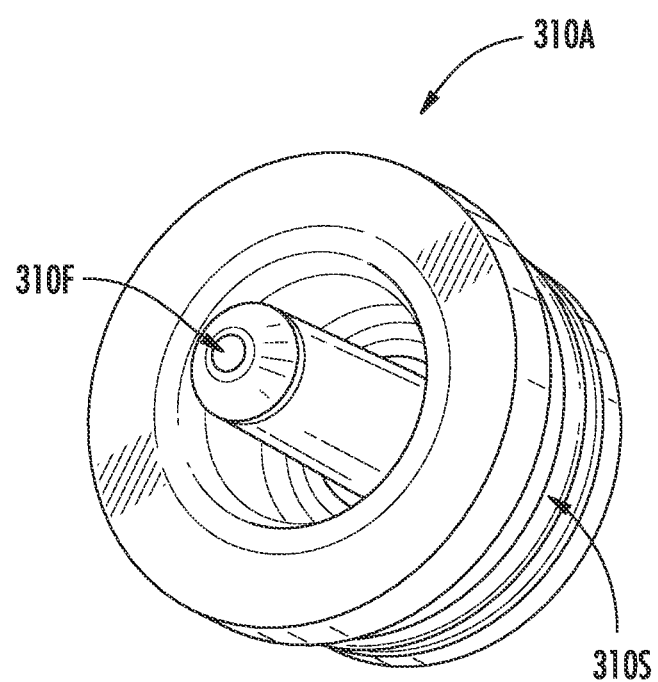

FIGS. 18 and 19 depicted detailed view of actuator 310A that cooperates with securing member 310M. Actuator 310A comprises a finger 310F for seating within a rim 310R of securing member 310M for transferring forces to the same. As depicted, a sealing feature 310S is disposed on the securing feature 310. Sealing feature 310S provides a seal between a portion of the securing feature 310 and the securing feature passageway 245 to inhibit dirt, dust and debris from entering the device. As shown, the sealing feature 310S is disposed within a groove of actuator 310A. Actuator 310A may also have a stop surface 31 OSS that acts to keep the actuator intact with the terminal 200. Actuator 310A may also include a dimple 310D or other feature for inhibiting inadvertent activation/translation of the securing feature 310 or allowing a tactical feel for the user.

Actuator 310A may also be a different color or have a marking indicia for identifying the port type. For instance, the actuator 310A may be colored red for connection ports 236 and the actuator 310A for the input connection port 260 may be colored black. Other color or marking indicia schemes may be used for pass-through ports, multi-fiber ports or ports for split signals. The concepts disclosed may be used with other actuators as desired. For instance, the actuators may laterally slide or rotate for translating the securing member 310M if desired, instead of having a vertical translation.

Figure 20:
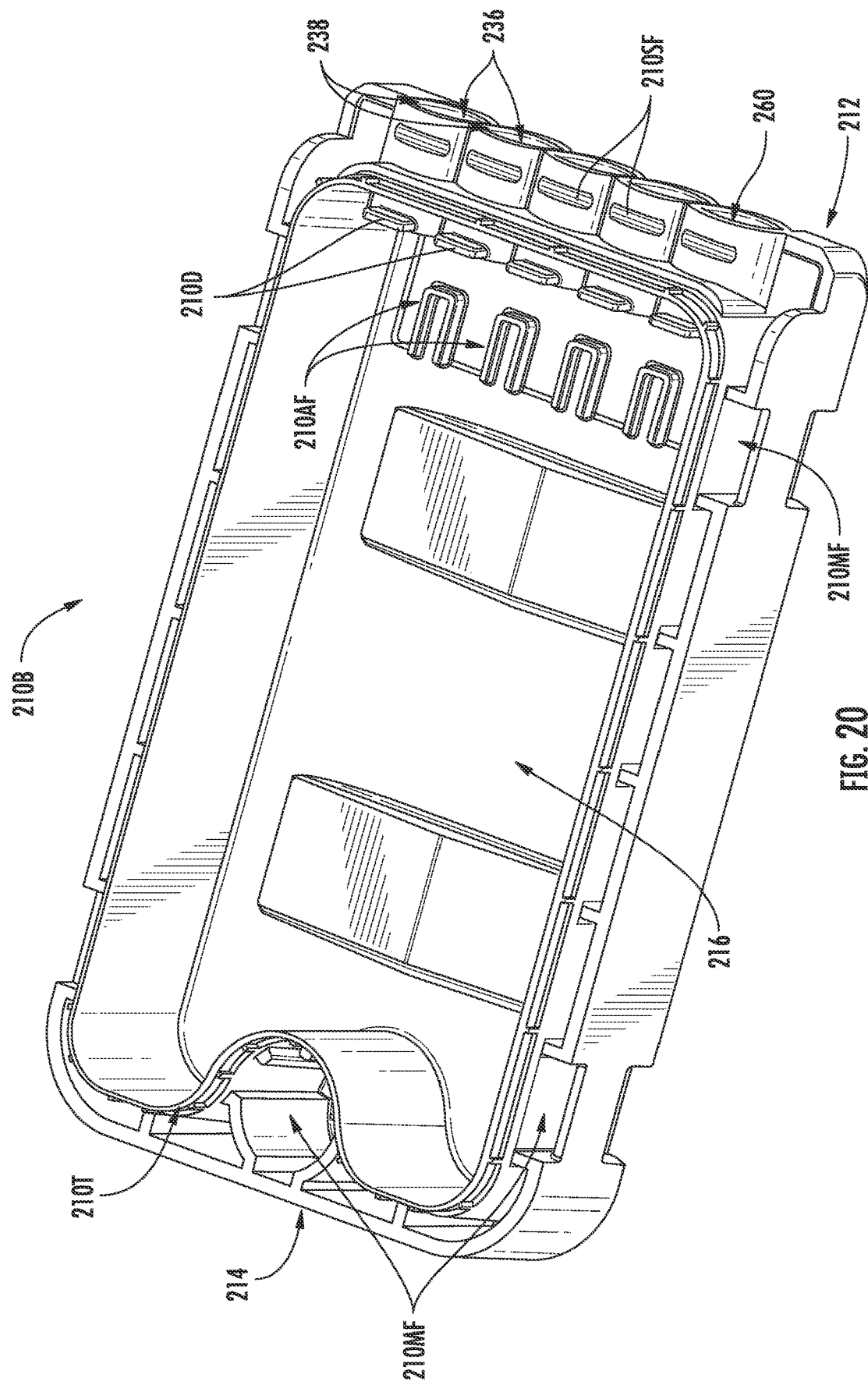
FIG. 20 is a top perspective view showing a portion of the shell.

FIG. 20 depicts the second portion 210B of shell 210 with the internal components removed for showing the internal construction. Shells 210 may have any suitable shape, design or configuration as desired. Second portion 210B cooperates with first portion 210A to form shell 210. Second portion 210B comprises at least one single-fiber connection port 236 and at least one multi-fiber connection port 260. Second portion 210B provides a portion of cavity 216 of terminal 200, and the internal bottom surface of second portion 210B comprises a plurality of alignment features 210AF for aligning the single-fiber modular adapter sub-assembly 310SSA with the respective single-fiber connection ports 236. Likewise, the internal bottom surface of second portion 210B comprises alignment features 210AF for aligning the multi-fiber modular adapter sub-assembly 310MSA with the respective multi-fiber connection ports 260. Alignment features 210AF may have a U-shape and cooperate with the alignment features 255AF on the bottom of adapter body 255, but other structures are possible such as pins and holes. Alignment features may allow small movement for assembly and alignment. Second portion 210B also includes a plurality of studs 210D on top of the respective connection ports 236 within cavity 216 for seating the hoop 255H of the adapter body 255 for assembly. Second portion 210B may also include a plurality of guide features 210SF for aligning the first portion 210A with the second portion 210B of the shell 210.

Single-fiber connection ports 236 or multi-fiber connection port 260 may also have a keying portion as desired. By way of explanation, the keying portion may be an additive keying portion to the primitive geometric round shape of the connection port passageway 233 such as a male key that is disposed forward of the securing feature in the single-fiber connection port passageway 236P or multi-fiber connection port 260P. However, the concepts for the connection ports of terminals may be modified for different connector designs. For instance, the keying portion may be defined as a walled-portion across part of the connection port passageway. Thus, the connection port with keying portion would be able to properly receive an external fiber optic connector having a portion with a proper D-shaped portion. Either way the keying portion on the connection port provides further features for inhibiting the damaging insertion on non-compliant external connectors.

Figure 21:
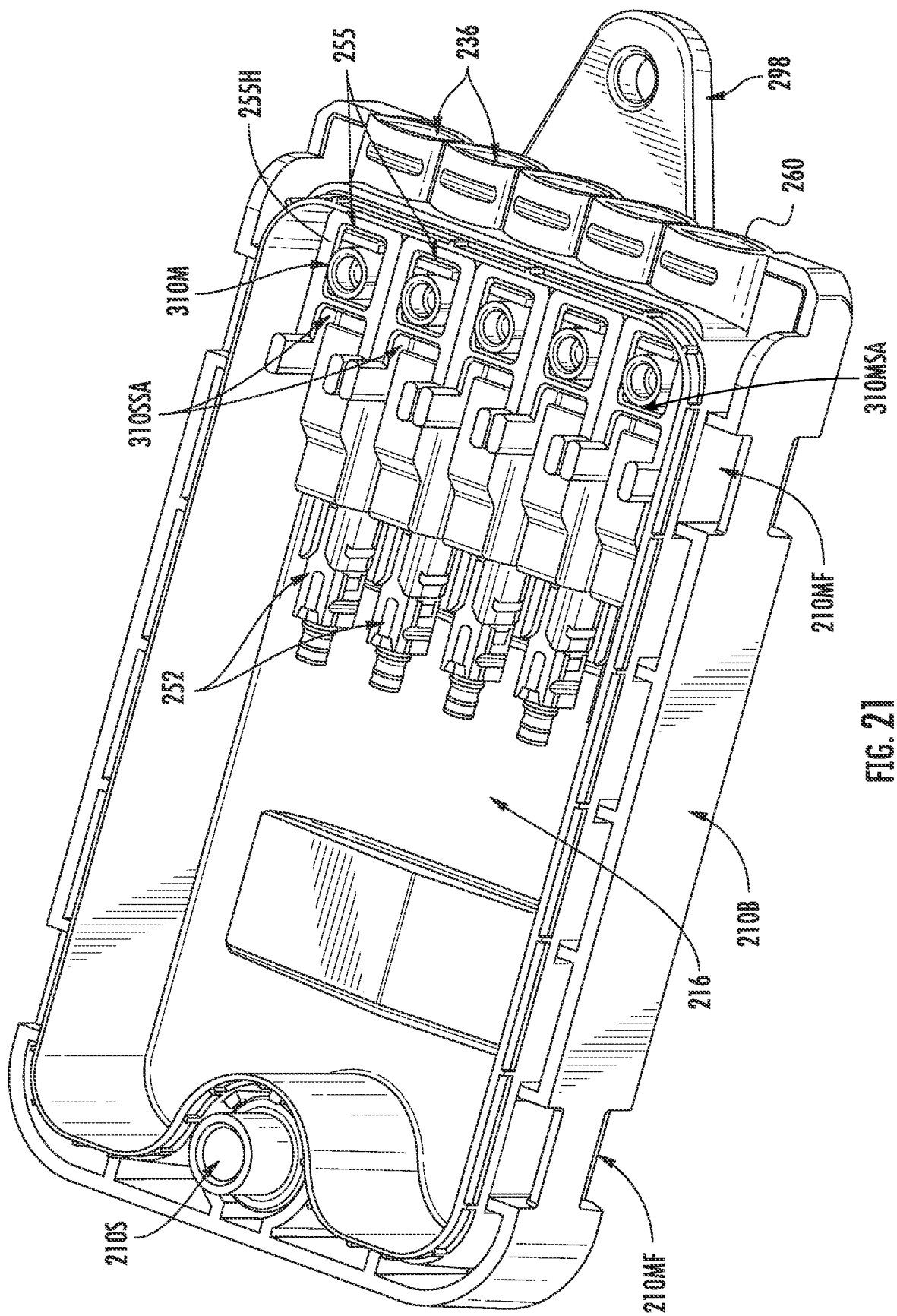
FIG. 21 is a top perspective view showing the multi-fiber modular adapter sub-assembly of FIG. 4 aligned with the multi-fiber connection port and a plurality of single-fiber modular adapter sub-assemblies of FIG. 16 aligned with respective single-fiber connection ports.

FIG. 21 depicts the assembly of four of single-fiber modular sub-assemblies 310SSA and one multi-fiber modular sub-assemblies 310MSA into the second portion 210B of shell 200. As shown, the four single-fiber modular adapter sub-assemblies 310SSA and one multi-fiber modular sub-assemblies 310MSA are aligned and installed onto the U-shaped alignment features 210AF of the second portion 210B of shell 210 as discussed. FIG. 21 also shows the hoops 255H of the single-fiber adapter bodies 255 and multi-fiber adapter body 255M disposed about the plurality of respective studs 210D on top of the respective single-fiber connection ports 236 or multi-fiber connection port 260 within cavity 216 for aligning the respective modular adapter sub-assemblies 310SSA, 310MSA within the second portion 210B of shell 210 for aligning the connection port passageways of the adapter bodies 255, 255M with the connection port passageways 236P3,260P of the shell 210. Thus, terminal 200 has respective adapter(s) 260A associated with each second connection port 260 for receiving respective internal rear second connectors 262 in alignment with the respective second or multi-fiber connection ports 260 for making the optical connection with the suitable external fiber optic connector. Likewise, terminal 200 has one or more adapter(s) 230A for receiving associated with each first connection port 236 for receiving respective internal first rear connectors 252 in alignment with the respective first or single-fiber connection ports 236 for making the optical connection with the suitable external fiber optic connector.

Adapter 230A may comprise a plurality of resilient arms 230RA comprising securing features (not numbered). Adapter 230A also comprises an adapter key 230K for orientating the adapter 230A with the adapter body 255. Securing features 230SF cooperate with protrusions on the housing of rear connector 252 for retaining the rear connector 252 to the adapter 230A. The ferrule 252F of rear connector 252 is disposed within the ferrule sleeve 230FS when assembled. Ferrule sleeves 230FS are used for precision alignment of mating ferrules between rear connectors 252 and external single-fiber plug connector received in the single-fiber connection port 236. Terminals may use alternative rear connectors if desired and can have different structures for supporting different rear connectors.

As depicted in FIG. 21, terminal 200 may also comprise a support 210S configured as a support insert that fits into shell 210. The support 210S or fiber guide may provide crush support for the terminal 200 and resulting in a more robust structure. As shown in this embodiment, support 210S is placed into the respective bore of the second portion 210B of the shell. As depicted, support 210S is located outside of the sealing interface of the second portion 210B of shell 210. Support 210S inhibits crushing forces from an over-tightened fastener from damaging the terminal 200 when securing to a façade or the like. Support 210S has a bore therethrough and may act as a mounting feature for the use to a fastener to mount the terminal 200, and may have a height slightly larger than the terminal height if desired. Consequently, the support 210S may carry the majority of any crushing forces that may be applied by the fastener and inhibits damage to the shell 210. Support 210S may also be located and attached to the shell at a location outside of the sealing interface between the first portion 210A and the second portion 210B of shell 210 if desired.

Figure 22:
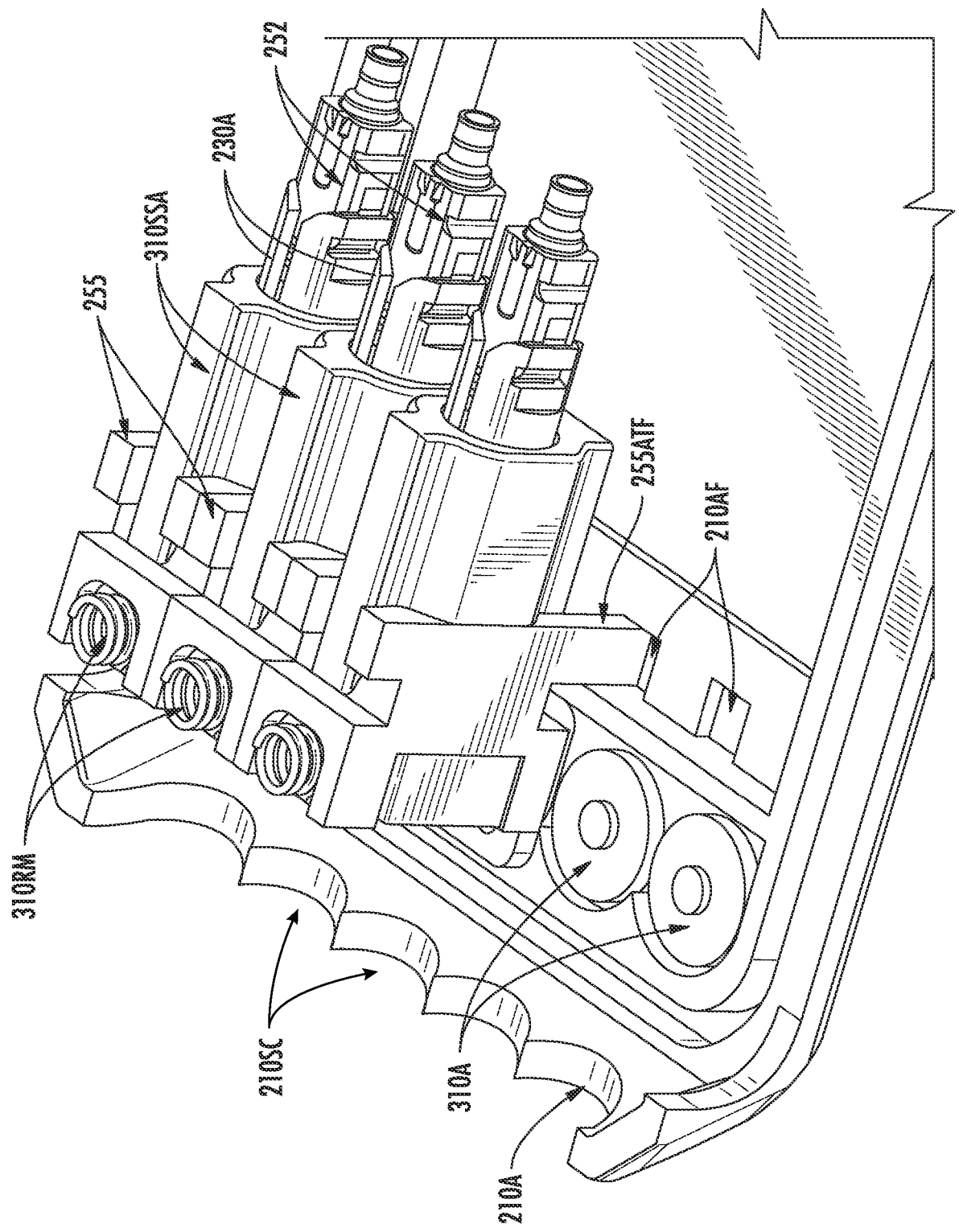
FIG. 22 is perspective view showing a plurality of single-fiber modular adapter sub-assemblies cooperating with the top portion of the shell.

FIG. 22 depicts an inside surface of the first portion 210A of shell 200. As shown, first portion 210A comprises a profile that conforms to the profile of the second portion 210B of shell 210. By way of explanation, first portion 210A comprises a plurality of scallops 210SC for cooperating with the respective profiles of the connection ports 236, 260 on the second portion 210B of shell 210. First portion 210A also comprise a sealing perimeter that cooperates with the sealing perimeter of the second portion 210B of shell 210. First portion 210A also comprises alignment features 210AF sized and shaped for cooperating with the alignment features 255AFT on the top of adapter bodies 255,255M for securing the same when the terminal is assembled. The respective alignment features 210AF,255AF only allow assembly of the modular adapter sub-assemblies 310SSA,310MSA into the shell 210 in one orientation for the correct orientation of the locking feature 310L with respect to the connection ports 236,260.

FIGS. 23-27 depict partial cross-sectional views of the second connector port 260 with various external connectors being inserted therein to illustrate the concepts disclosed. FIG. 23 depicts a proper second external connector (i.e., multi-fiber connector MFC) being inserted into the second connector port 260 right before being captured by the securing feature 310. As depicted, the connector housing 20 of the second external connector is translating the securing member 310M downwards as it is being inserted. Also shown are the alignment pins 262AP inserted into the multi-fiber ferrule of the multi-fiber connector MFC for aligning the mating end faces of ferrule 262F and the multi-fiber ferrule of the external connector. Once the external multi-fiber connector is fully inserted into the second connection port 260, then the securing member 310M is biased upward so that the locking feature 310L engages the locking feature 20L integrally formed on the housing 20 of the external fiber optic connector as shown in FIG. 27.

Other than the alignment pins 262AP for the second connector ferrules, the first external connectors engage in a similar manner to retain the external first connector in the first connection port 236. Instead of the alignment pins 262F, the first connector ferrules are precisely aligned within ferrule sleeve 230FS for aligning the mating end faces of ferrule 252F and the single-fiber ferrule of the external connector.

Figure 24:
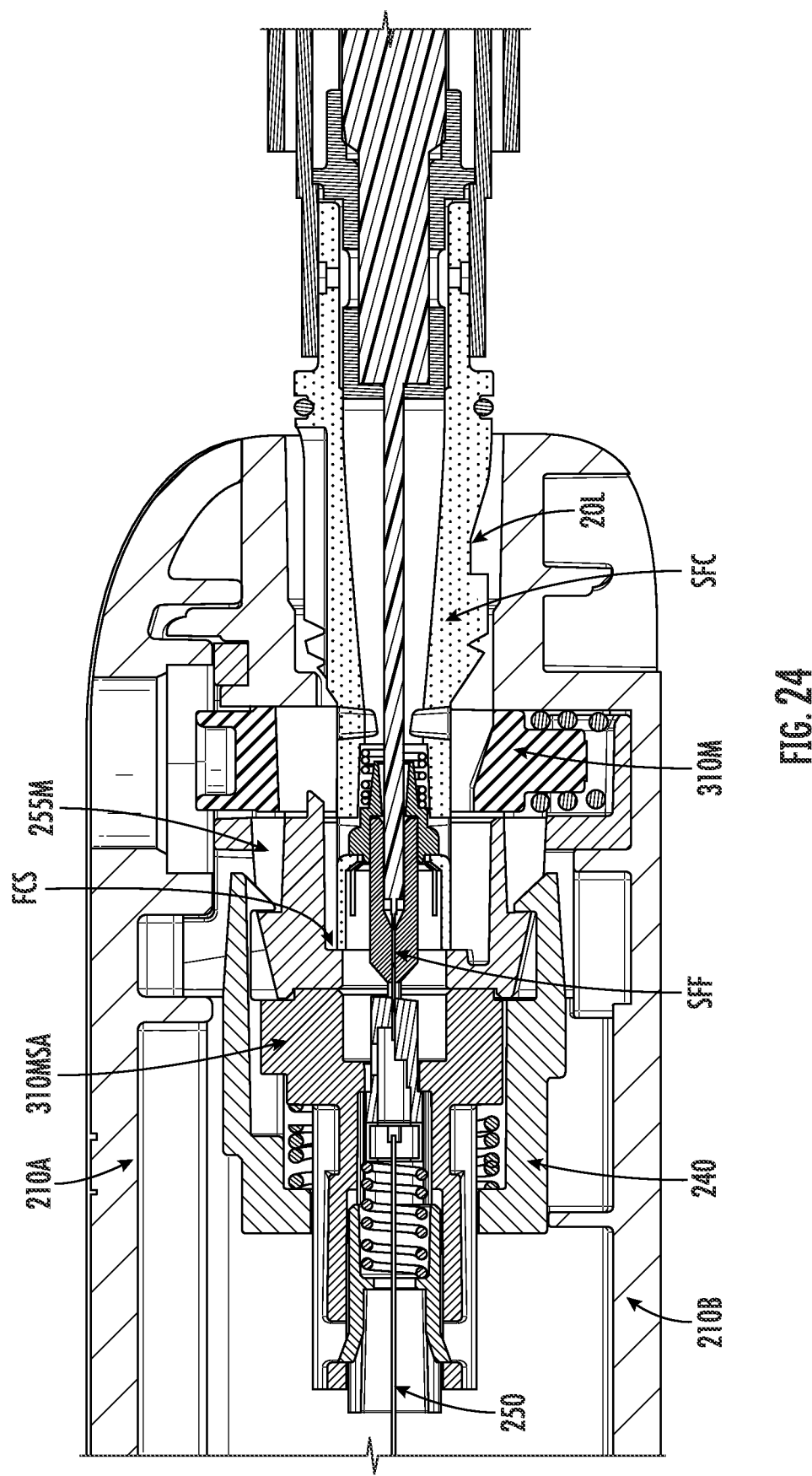
FIG. 24 is a partial sectional view showing the multi-fiber connection port inhibiting the damaging insertion of the external single-fiber connector intended for insertion into the single-fiber connection port of the terminal.

FIGS. 24 and 25 illustrate the condition if the technician mistakenly attempts to insert a first external connector into the second connection port 260. Specifically, FIGS. 24 and 25 show second connection port 260 inhibiting the damaging insertion of a fiber external connector such as a single fiber connector SFC into the second connection port 260. As depicted the single fiber ferrule SFF is inhibited from making contact with ferrule 262F of the second connection port 260. More specifically, the housing of the external first connector crashes on the first connector stop (FCS) or exclusion height EH as discussed herein as best shown in FIG. 25. Consequently, unintended damage to terminal 200 is inhibited and the technician will realize that the wrong external connector was inserted into the second connection port 260 since it will not latch or be retained in the second connection port 260.

FIGS. 26 and 27 illustrate the proper second external connector being inserted into the second connection port 260. As shown, multi-fiber connector (MFC) is inserted into second connection port 260 so that the front housing of the MFC passes beyond the single-fiber connection stop as shown. As discussed, the connector housing 20 of the second external connector (MFC) is translating the securing member 310M downwards as it is being inserted in FIG. 26. The gross alignment of the mating ferrules begins as ferrule 262F enters the front housing of the MFC before the alignment pins 262AP are inserted into the multi-fiber ferrule of the multi-fiber connector MFC for precision alignment of the mating end faces of ferrule 262F and the multi-fiber ferrule of the proper external connector. FIG. 27 shows the external multi-fiber connector fully inserted into the second connection port 260 with the securing member 310M biased upward by securing member resilient member 310RM so that the locking feature 310L of the securing member 310M engages the locking feature 20L integrally formed on the housing 20 of the external fiber optic connector.

FIGS. 28-32 show terminal 200 using another multi-fiber modular adapter sub-assembly 310MSA, which is similar to the multi-fiber modular adapter sub-assembly 310MSA of FIG. 3. This multi-fiber modular adapter sub-assembly 310MSA comprises a multi-fiber adapter body 255M with the adapter body bore 255B receiving the adapter 260A as an inner barrel. Adapter body 255M may also comprises a keying portion 255KP for rotationally orientating the adapter 260A with the adapter body 255M. For instance, adapter body 255M may have a keyway and the adapter 260A may have a key for cooperating with the keyway, or vice versa.

In this configuration, the adapter 260A is longer and provides an inner barrel within the adapter body 255M for the mated optical connection of the connection port as shown in FIG. 29. As shown, the adapter 260A overlaps with the adapter body 255M for a majority of its length. Further, the adapter body 255M configured as an inner barrel comprises a first connector stop (FCS) as desired for inhibiting the damaging insertion of non-compliant external connectors. As shown in FIG. 28, the adapter 260A is assembled into the adapter body bore 255B from the front side of the adapter body 255M. Adapter 260A may be biased to the forward position by resilient member 230RM as depicted in FIG. 29. No retainer is needed for this construction of the multi-fiber modular adapter sub-assembly. However, the multi-fiber modular adapter sub-assembly 310MSA may include a spring sleeve 262SS for the resilient member 262RM that biases the ferrule 262F forward. This adapter body 255M may also include an internal shoulder 255S that acts as a stop for the adapter resilient member 230RM.

As discussed, the multifiber modular adapter sub-assembly 310MSA shown comprises the first connector stop (FCS) or single-fiber connector stop (SFCS) for inhibiting the damaging insertion of non-compatible external connector into the optical connection port 260 of the terminal 200. The one or more components that comprise the first connector stop may use an exclusion height (EH) tailored to inhibit damaging insertion of a non-compliant connector into the connection port 260. The use of the exclusion height (EH) inhibits the non-compliant external connector from damaging the ferrule associated with connection port 260. Thus, if the technician mistakenly attempts to insert the non-compliant external connector into connection port 260, then the non-compliant external connector is inhibited from damaging the mating face of the ferrule 262F of connection port 260. The exclusion height (EH) may have any suitable size such as 5.5 millimeters or less for inhibiting the damaging insertion of the first connector that is configured as single-fiber connector with a SC-type front portion into the second connection port 260. In other embodiments, the exclusion height (EH) may comprises a range of between 5.5 millimeters and 2.5 millimeters, thereby inhibiting the damaging insertion of the non-compliant external connector into the connection port 260, but allowing a proper external connector to make optical communication at the second connection port 260.

Multi-fiber adapter sub-assembly 310MSA of FIG. 28 may also comprise securing member 310M, securing feature resilient member 310RM, an adapter 260A, a resilient member 230RM in addition to multi-fiber adapter body 255M. A second or multi-fiber ferrule 262F is also associated with the second or multi-fiber connection port 260. In this embodiment, second ferrule 262F is an MT or MTP ferrule using alignment pins 262AP for mating with a complementary ferrule of the external multi-fiber connector. The second ferrule 262F may be received and aligned using adapter 260A suitable for the ferrule. As shown this rear connector 262 further comprises a resilient member 262RM and a spring push 262SP that cooperates with the adapter 260A and is assembled in a similar manner as discussed.

After the adapter 260A is assembled into the adapter body bore 255B from the front side of the adapter body 255M, the securing member 310M and securing feature resilient member 310RM may be positioned in the adapter body 255M as shown.

Figure 32:
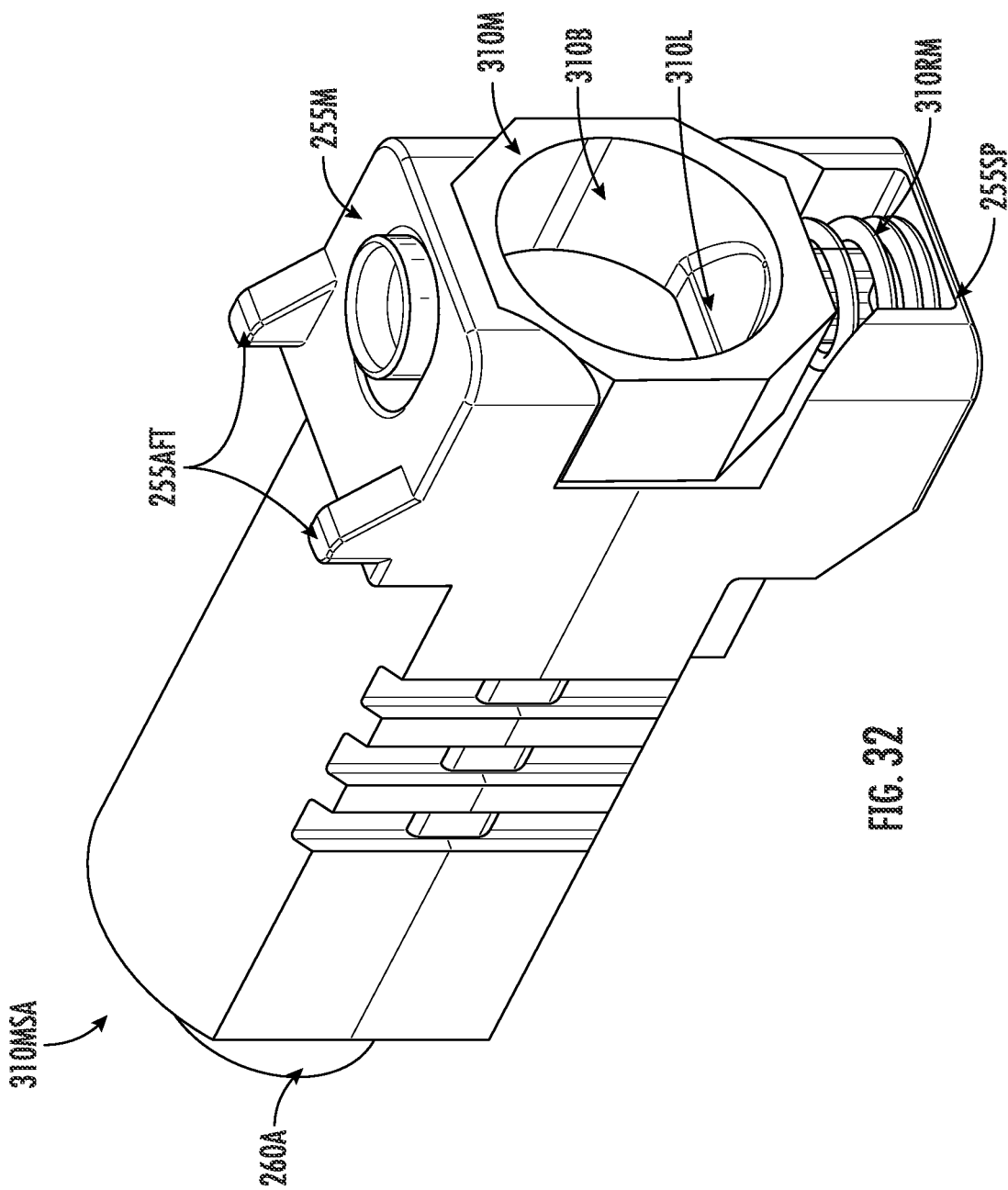

As best depicted in FIG. 32, adapter body 255M used in the multi-fiber adapter assembly 310MSA of FIGS. 28-32 has a different geometry for cooperating with the shell 210 of terminal 200. As depicted, adapter body 255M has one or more alignment features 255AFT disposed at the top of the adapter body 255M that cooperate with the first portion 210A of shell 210 when assembled as best shown in FIG. 29. Likewise, bottom of the adapter body 255M may cooperate with the second portion 210B of shell 210 when assembled.

Additionally, the adapter body 255M has securing member 310M used in the multi-fiber adapter assembly 310MSA of FIGS. 28-32 also has a different geometry as shown, but has many similarities and functions in a similar manner to the securing member 310M depicted in FIGS. 13-15. Specifically, securing member 310M comprises bore 310B aligned with the connection port when assembled and may comprise a locking feature 310L disposed with the in the bore 310B as discussed herein.

FIG. 33 is perspective view of another adapter body 255M having multiple sleeves ganged together in a common component for assembling a plurality multi-fiber modular sub-assemblies with the adapter body 255M before assembly within the terminal 200. Adapter body 255M of FIG. 33 receives a plurality of adapters 260A within respective adapter body bores 255B from the front end 255F. This adapter body 255M also includes a plurality of pass-throughs 255PT for receiving a portion of the securing member 310M. The pass-throughs 255PT also aid in holding securing member 310M in the sub-assembly during assembly. Adapter body 255M may also comprise spring pocket 255SP at the bottom for capturing resilient member 310RM.

Besides the advantages discussed above, the concepts disclosed allow relatively small terminals 200 having a relatively high-density of connections along with an organized arrangement for the connection ports 236,260 and external connectors attached to the terminals 200. Shells have a given height H, width W and length L that define a volume for the terminal as depicted in FIG. 1. By way of example, shells 210 of terminal 200 may define a volume of 800 cubic centimeters or less, other embodiments of shells 210 may define the volume of 400 cubic centimeters or less, other embodiments of shells 210 may define the volume of 100 cubic centimeters or less as desired. Embodiments of terminals 200 comprise a port width density of at least one single-fiber connection port 236 per each 25 millimeters of width W of the terminal 200. Other port width densities are possible such as at least one single-fiber connection port 236 per each 20 millimeters of W of terminal 200 or at least one single-fiber connection port 236 per each 15 millimeters of width W of the terminal. Likewise, embodiments of terminals 200 may comprise a given density per volume of the shell 210 as desired.

The concepts disclosed allow relatively small form-factors for terminals as shown in Table 1. Table 1 below compares representative dimensions, volumes, and normalized volume ratios with respect to the prior art of the shells (i.e., the housings) for terminals having 4, 8 and 12 ports as examples of how compact the terminals of the present application are with respect to convention prior art terminals. Specifically, Table 1 compares examples of the conventional prior art multiport terminals such as available from Corning Optical Communications of Charlotte, NC with terminals using the concepts disclosed herein having a linear array of ports such as shown by FIG. 1. As shown in Table 1, the respective volumes of the conventional prior art multiport terminals with the same port count are on the order of ten times larger than terminals with the same port count as terminals such as disclosed in FIG. 1. By way of example and not limitation, the terminals disclosed herein may define a volume of 400 cubic centimeters or less for 12-ports, or even if double the size could define a volume of 800 cubic centimeters or less for 12-ports. Terminals with smaller port counts such as 4-ports could be even smaller such as the shell or terminal defining a volume of 200 cubic centimeters or less for 4-ports, or even if double the size could define a volume of 200 cubic centimeters or less for 4-ports. Terminals with sizes that are different will have different volumes form the explanatory examples in Table 1 and these other variations are within the scope of the disclosure. Consequently, it is apparent the size (e.g., volume) of terminals of the present application are much smaller than the conventional prior art terminals. In addition to being significantly smaller, the terminals of the present application do not have the issues of the conventional prior art terminals. Of course, the examples of Table 1 are for comparison purposes and other sizes and variations of terminals may use the concepts disclosed herein as desired.

One of the reasons that the size of the terminals may be reduced in size with the concepts disclosed herein is that the connectors that cooperate with the terminals have locking features that are integrated into the housing 20 of the external connectors received in connection ports 236,260. In other words, the locking features for securing connector are integrally formed in the housing of the external connector, instead of being a distinct and separate component like a coupling nut of a conventional hardened connector used with conventional multiport terminals. Conventional connectors for terminals have threaded connections that require finger access for connection and disconnecting. By eliminating the threaded coupling nut (which is a separate component that must rotate about the connector) the spacing between conventional connectors may be reduced. Also eliminating the dedicated coupling nut from the conventional connectors also allows the footprint of the connectors to be smaller, which also aids in reducing the size of the terminals disclosed herein.

TABLE 1

Comparison of Conventional MultiportTerminals with Terminals of Present Application such as shown in FIG. 1

| Terminal Type | Port Count | Dimension L × W × H (mm) | Volume ($cm^3$) | Normalized Volume Ratio |
|---|---|---|---|---|
| Prior Art Multiports | 4 | 274 × 66 × 73 | 1320 | 1.0 |
| | 8 | 312 × 76 × 86 | 2039 | 1.0 |
| | 12 | 381 × 101 × 147 | 5657 | 1.0 |
| Terminals w/Linear Array | 4 | 76 × 59 × 30 | 134 | 0.10 |
| | 8 | 123 × 109 × 30 | 402 | 0.20 |
| | 12 | 159 × 159 × 30 | 758 | 0.14 |

Terminals may have other constructions, features or components using the concepts disclosed. For instance, terminals may also have one or more dust plugs for protecting the single-fiber connection port 236 or multi-fiber connection ports 260 from dust, dirt or debris entering the terminal or interfering with the optical performance. Thus, when the user wishes to make an optical connection to the terminal, the appropriate dust plug is removed from the connector port and then external connector of desired cable assembly may be inserted into the respective connection port for making an optical connection to the terminal 200. Dust plugs may use similar release and retain features as the external connectors. By way of explanation, when securing feature 310 is pushed inward or down, the dust plug is released and may be removed. Moreover, the interface between the connection ports and the dust plug or external connector may be sealed using appropriate geometry and/or a sealing element such as an O-ring or gasket.

Terminal 200 or devices may comprise mounting features that are integrally formed in the shell 210 or that are separate components attached to shell 210 for mounting the device. By way of example, shell 210 depicts mounting features 210MF disposed near first and second ends 212, 214 of shell 210. Mounting feature 210MF adjacent the first end 212 of terminal 200 is a mounting tab 298 attached to shell 210, and the mounting feature 210MF adjacent the second end 214 is a through hole with a support 210S. However, mounting features 210MF may be disposed at any suitable location on the shell 210 as desired. For instance, terminal 200 also depicts a plurality of mounting features 210MF integrally-formed on shell 210 and configured as passageways disposed on the lateral sides. Thus, the user may simply use a fastener such as a zip-tie threaded thru these lateral passageways for mounting the terminal 200 to a wall or pole as desired.

Terminal may include a fiber tray or fiber guide/supports that are discrete components that may attach to the shell 210; however, fiber guides may be integrated with the shell if desired. Shell may also 210 comprise one or more fiber guides for organizing and routing optical fibers 250. The fiber tray inhibits damage to optical fibers and may also provide a location for the mounting of other components such as splitters, electronics or the like if desired. Fiber guides may also act as support 210S for providing crush strength to the shell 210 if they have a suitable length.

Terminal 200 may have the first or second connection ports 236,260 disposed in any suitable location. By way of explanation, terminal 200 may have the multi-fiber connection port 260 disposed in an outboard position of the array of single-fiber connection ports 236, on another side of the terminal, or disposed in a medial portion of array of single-fiber connection ports 236 as desired. Of course, other variations are possible according to the concepts disclosed.

Terminals disclosed may have other active or passive components as desired. For instance, the concepts disclosed may be used with wireless devices having a similar construction to the concepts disclosed herein and comprising at least one single-fiber connector port 236 and at least one multi-fiber connection port 260 that inhibits the damaging insertion of the single-fiber plug connector intended for the single-fiber connection port 236. If the terminal is configured as a wireless device 500 the input port may include power and may have electronics 500E disposed with in the cavity (not visible) of the terminal. The terminal configured as the wireless device may have any of the other features disclosed herein and they will not be repeated for the sake of brevity.

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection ports may be configured as individual sleeves that are inserted into a passageway of a device, thereby allowing the selection of different configurations of connector ports for a device to tailor the device to the desired external connector(s). All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A terminal for making an optical connection, comprising:
    at least one single-fiber connection port disposed on the terminal comprising an optical connector opening extending toward a cavity of the terminal and defining a single-fiber connection port passageway configured for receiving a single-fiber plug connector for optical connection; and
    at least one multi-fiber connection port disposed on the terminal comprising an optical connector opening extending toward a cavity of the terminal and defining a multi-fiber connection port passageway configured for receiving a multi-fiber plug connector for optical connection, wherein the at least one multi-fiber connection port comprises a multi-fiber modular adapter sub-assembly, and the multi-fiber modular adapter sub-assembly comprises a multi-fiber adapter body having a single-fiber connector stop, wherein the single-fiber connector stop inhibits the damaging insertion of the single-fiber plug connector intended for the at least one single-fiber connection port into the at least one multi-fiber connection port; and
    wherein the at least one single-fiber connection port or the at least one multi-fiber connection port is associated with a securing feature, and the at least one securing feature is capable of translating for securing an external fiber optic connector.

2. The terminal of claim 1, wherein the multi-fiber adapter body or an adapter comprises a passageway, wherein a portion of the passageway comprises an exclusion height that is 5.5 millimeters or less.

3. The terminal of claim 1, further comprising a securing feature resilient member for biasing the securing feature toward a retain position.

4. A terminal for making an optical connection, comprising:
    at least one single-fiber connection port disposed on the terminal comprising an optical connector opening extending toward a cavity of the terminal and defining a single-fiber connection port passageway configured for receiving a single-fiber plug connector for optical connection;
    at least one multi-fiber connection port disposed on the terminal comprising an optical connector opening extending toward a cavity of the terminal and defining a multi-fiber connection port passageway configured for receiving a multi-fiber plug connector for optical connection, wherein the at least one multi-fiber connection port inhibits the damaging insertion of the single-fiber plug connector intended for the at least one single-fiber connection port into the at least one multi-fiber connection port, and the at least one multi-fiber connection port comprises a multi-fiber modular adapter sub-assembly comprising a multi-fiber adapter body;
    at least one securing feature being associated with the at least one multi-fiber connection port, wherein the at least one securing feature is capable of translating for securing an external fiber optic connector; and
    at least one securing feature resilient member for biasing a portion of the at least one securing feature.

5. The terminal of claim 4, wherein the multi-fiber adapter body or an adapter comprises a single-fiber connector stop, wherein the single-fiber connector stop is sized for inhibiting the damaging insertion of non-compatible single-fiber plug connector into the at least one multifiber connector port.

6. The terminal of claim 5, wherein the multi-fiber adapter body comprises a passageway, wherein a portion of the passageway comprises an exclusion height of 5.5 millimeters or less.

7. The terminal of claim 4, the at least one single-fiber connection port comprises a single-fiber modular adapter sub-assembly comprising a single-fiber adapter body.

8. The terminal of claim 4, wherein the multi-fiber adapter body receives an adapter comprising a single-fiber connector stop, and the adapter is configured as an inner barrel that is received from the front side of the multi-fiber adapter body.

9. The terminal of claim 4, wherein of the at least one securing feature is biased to a retain position.

10. A terminal for making optical connections, comprising:
    at least one single-fiber connection port disposed on the terminal comprising an optical connector opening extending toward a cavity of the terminal and defining a single-fiber connection port passageway configured for receiving a single-fiber plug connector for optical connection, and the at least one single-fiber connection port comprises a single-fiber modular adapter sub-assembly comprising a single-fiber adapter body;
    at least one multi-fiber connection port disposed on the terminal comprising an optical connector opening extending toward a cavity of the terminal and defining a multi-fiber connection port passageway configured for receiving a multi-fiber plug connector for optical connection, and wherein the at least one multi-fiber connection port inhibits the damaging insertion of the single-fiber plug connector intended for the at least one single-fiber connection port into the at least one multi-fiber connection port, and the at least one multi-fiber connection port comprises a multi-fiber modular adapter sub-assembly comprising a multi-fiber adapter body, and the multi-fiber adapter body or an adapter comprises a single-fiber connector stop, wherein the single-fiber connector stop is sized for inhibiting the damaging insertion of non-compatible single-fiber plug connector into the at least one multifiber connector port;
    at least one securing feature being associated with the at least one multi-fiber connection port, wherein the at least one securing feature is capable of translating from a retain position to an open position; and
    at least one securing feature resilient member for biasing a portion of the at least one securing feature.

11. The terminal of claim 10, wherein the at least one securing feature comprises a bore that is aligned with the at least one connection port passageway.

12. The terminal of claim 10, wherein the multi-fiber adapter body receives the adapter, and the adapter is configured as an inner barrel that is received from the front side of the multi-fiber adapter body.

13. A terminal for making optical connections, comprising:
    at least one single-fiber connection port disposed on the terminal comprising an optical connector opening extending into a cavity of the terminal and defining a single-fiber connection port passageway configured for receiving a single-fiber plug connector for optical connection, and the at least one single-fiber connection port comprises a single-fiber modular adapter sub-assembly comprising a single-fiber adapter body;

at least one multi-fiber connection port disposed on the terminal comprising an optical connector opening extending into a cavity of the terminal and defining a multi-fiber connection port passageway configured for receiving a multi-fiber plug connector for optical connection, and wherein the at least one multi-fiber connection port inhibits the damaging insertion of the single-fiber plug connector intended for the at least one single-fiber connection port into the at least one multi-fiber connection port, and the at least one multi-fiber connection port comprises a multi-fiber modular adapter sub-assembly comprising a multi-fiber adapter body, and the multi-fiber adapter body or an adapter comprises a single-fiber connector stop, wherein the single-fiber connector stop is sized for inhibiting the damaging insertion of non-compatible single-fiber plug connector into the at least one multifiber connector port;

at least one securing feature being associated with the at least one multi-fiber connection port, wherein the at least one securing feature is capable of translating for securing an external fiber optic connector; and at least one securing feature resilient member for biasing a portion of the at least one securing feature, and the at least one securing feature comprises a bore that is aligned with the at least one multi-fiber connection port passageway.

14. The terminal of claim 13, wherein the at least one securing feature translates from a retain position to an open position as a suitable fiber optic connector is inserted into the at least one connection port.

15. The terminal of claim 13, wherein the at least one securing feature is capable of releasing a secured fiber optic connector when translating to an open position.

16. The terminal of claim 13, wherein the at least one securing feature is capable of moving to a retain position automatically when a suitable fiber optic connector is fully-inserted.

17. The terminal of claim 13, wherein the at least one securing feature further comprises a locking feature.

18. The terminal of claim 17, wherein the locking feature comprises a ramp with a ledge.

19. A terminal for making optical connections, comprising:
at least one single-fiber connection port disposed on the terminal comprising an optical connector opening extending toward a cavity of the terminal and defining a single-fiber connection port passageway configured for receiving a single-fiber plug connector for optical connection, and the at least one single-fiber connection port comprises a single-fiber modular adapter sub-assembly comprising a single-fiber adapter body;

at least one multi-fiber connection port disposed on the terminal comprising an optical connector opening extending toward a cavity of the terminal and defining a multi-fiber connection port passageway configured for receiving a multi-fiber plug connector for optical connection, and wherein the at least one multi-fiber connection port inhibits the damaging insertion of the single-fiber plug connector intended for the at least one single-fiber connection port into the at least one multi-fiber connection port, and the at least one multi-fiber connection port comprises a multi-fiber modular adapter sub-assembly comprising a multi-fiber adapter body, and an adapter comprising a single-fiber connector stop, wherein the single-fiber connector stop is sized for inhibiting the damaging insertion of non-compatible single-fiber plug connector into the at least one multifiber connector port;

at least one securing feature being associated with the at least one multi-fiber connection port, wherein the at least one securing feature is capable of translating for securing an external fiber optic connector; and at least one securing feature resilient member for biasing a portion of the at least one securing feature, and the at least one securing feature comprises a bore that is aligned with the at least one multifiber connection port passageway, wherein the at least one securing feature translates from a retain position to an open position as a suitable fiber optic connector is inserted into the at least one multi-fiber connection port.

20. The terminal of claim 19, wherein the bore is sized for receiving a suitable fiber optic connector therethrough.

21. The terminal of claim 19, wherein the bore comprises a locking feature.

22. The terminal of claim 21, wherein the locking feature comprises a ramp with a ledge.

23. The terminal of claim 19, wherein the multi-fiber adapter body receives the adapter, and the adapter is configured as an inner barrel that is received from the front side of the multi-fiber adapter body.

24. The terminal of claim 19, wherein the securing feature comprises an actuator and a securing member.

25. A terminal for making optical connections, comprising:
at least one single-fiber connection port disposed on the terminal comprising an optical connector opening extending toward a cavity of the terminal and defining a single-fiber connection port passageway configured for receiving a single-fiber plug connector for optical connection, and the at least one single-fiber connection port comprises a single-fiber modular adapter sub-assembly comprising a single-fiber adapter body;

at least one multi-fiber connection port disposed on the terminal comprising an optical connector opening extending toward a cavity of the terminal and defining a multi-fiber connection port passageway configured for receiving a multi-fiber plug connector for optical connection, and wherein the at least one multi-fiber connection port inhibits the damaging insertion of the single-fiber plug connector intended for the at least one single-fiber connection port into the at least one multi-fiber connection port, and the at least one multi-fiber connection port comprises a multi-fiber modular adapter sub-assembly comprising a multi-fiber adapter body, and an adapter comprising a single-fiber connector stop, wherein the single-fiber connector stop is sized for inhibiting the damaging insertion of non-compatible single-fiber plug connector into the at least one multifiber connector port;

at least one securing feature being associated with the at least one multi-fiber connection port, and the at least one securing feature comprises a bore that is aligned with the at least one multifiber connection port passageway, and a locking feature comprising a ramp with a ledge, wherein the at least one securing feature is capable of translating for securing an external fiber optic connector; and at least one securing feature resilient member for biasing a portion of the at least one securing feature, and, wherein the at least one securing feature translates from a retain position to an open position as a suitable fiber optic connector is inserted into the at least one multi-fiber connection port.

26. The terminal of claim 25, wherein the locking feature comprises a retention surface.

27. The terminal of claim 25, wherein the multi-fiber adapter body receives the adapter, and the adapter is configured as an inner barrel that is received from the front side of the multi-fiber adapter body.

28. The terminal of claim 1, wherein the at least one multi-fiber connection port is a portion of a shell.

29. The terminal of claim 28, the shell comprises at least a first portion and a second portion.

30. The terminal of claim 1, further comprising at least one optical fiber routed from the at least one connection port toward an input connection port of the terminal.

31. The terminal of claim 1, the multi-fiber modular adapter sub-assembly comprising an adapter aligned with the at least one multi-fiber connection port.

32. The terminal of claim 31, the adapter biased by a resilient member.

33. The terminal of claim 1, the multi-fiber modular adapter sub-assembly is capable of floating relative to the at least one multi-fiber connection port passageway.

34. The terminal of claim 1, further comprising a sealing feature disposed on the at least one securing feature.

35. The terminal of claim 1, further comprising at least one rear connector comprising a rear connector ferrule.

36. The terminal of claim 35, the at least one rear connector further comprising a resilient member for biasing the rear connector ferrule.

37. The terminal of claim 35, further comprising at least one rear connector having a SC footprint.

38. The terminal of claim 1, wherein the terminal is weatherproof.

39. The terminal of claim 1, further comprising an optical splitter disposed within the cavity.

40. The terminal of claim 1, further comprising at least one mounting feature for the terminal.

41. The terminal of claim 1, single-fiber connection port passageway comprising a keying portion.

42. The terminal of claim 41, wherein the keying portion comprises a male key.

43. The terminal of claim 1, further comprising at least one fiber routing guide or support.

44. The terminal of claim 1, wherein the shell defines a volume of 800 cubic centimeters or less.

45. The terminal of claim 1, wherein the shell defines a volume of 400 cubic centimeters or less.

46. The terminal of claim 1, wherein the shell defines a volume of 100 cubic centimeters or less.

47. The terminal of claim 1, wherein the terminal has a port width density of at least one connection port per each 20 millimeters of width of terminal 200.

48. The terminal of claim 1, further comprising a sealing element.

49. The terminal of claim 1, further comprising a dust plug sized for cooperating with the optical connector opening of the at least one multi-fiber connector port.

50. The terminal of claim 1, wherein the terminal comprises a marking indicia for the at least one multi-fiber connector port.

51. A terminal for making an optical connection, comprising:

at least one first connection port disposed on the terminal comprising an optical connector opening extending toward a cavity of the terminal and defining a first connection port passageway configured for receiving a first fiber plug connector for optical connection; and at least one second connection port disposed on the terminal comprising an optical connector opening extending toward a cavity of the terminal and defining a second connection port passageway configured for receiving a second plug connector for optical connection, wherein the at least one second connection port inhibits the damaging insertion of the first fiber plug connector intended for the at least first connection port into the at least one second connection port, wherein the second plug connector comprises a different connector interface than the connector interface for the first plug connector; and wherein the at least one single-fiber connection port or the at least one multi-fiber connection port is associated with a securing feature, and the at least one securing feature is capable of translating for securing an external fiber optic connector.

52. A wireless device, comprising:

at least one single-fiber connection port disposed on the wireless device comprising an optical connector opening extending toward a cavity of the wireless device (500) and defining a single-fiber connection port passageway configured for receiving a single-fiber plug connector for optical connection; and at least one multi-fiber connection port disposed on the wireless device comprising an optical connector opening extending toward a cavity of the wireless device and defining a multi-fiber connection port passageway configured for receiving a multi-fiber plug connector for optical connection, wherein the at least one multi-fiber connection port inhibits the damaging insertion of the single-fiber plug connector intended for the at least one single-fiber connection port into the at least one multi-fiber connection port; and wherein the at least one single-fiber connection port or the at least one multi-fiber connection port is associated with a securing feature, and the at least one securing feature is capable of translating for securing an external fiber optic connector.

53. The wireless device of claim 52, the at least one multi-fiber connection port comprises a multi-fiber modular adapter sub-assembly, and the multi-fiber modular adapter sub-assembly comprises a multi-fiber adapter body.

54. The wireless device of claim 53, wherein the multi-fiber modular adapter sub-assembly comprises a single-fiber connector stop, wherein the single-fiber connector stop is sized for inhibiting the insertion of the single-fiber plug connector into the at least one multifiber connector port.

55. The wireless device of claim 54, wherein the multi-fiber modular adapter sub-assembly comprises a passageway, wherein a portion of the passageway comprises an exclusion height that is 5.5 millimeters or less.

56. The wireless device of claim 52, further comprising a securing feature resilient member for biasing the securing feature toward a retain position.

57. The wireless device of claim 52, wherein the multi-fiber adapter body receives the adapter comprising a single-fiber connector stop, and the adapter is configured as an inner barrel that is received from the front side of the multi-fiber adapter body.

* * * * *